US012424732B2

(12) United States Patent
Park et al.

(10) Patent No.: US 12,424,732 B2
(45) Date of Patent: Sep. 23, 2025

(54) ELECTRONIC DEVICE COMPRISING ANTENNA

(71) Applicant: Samsung Electronics Co., Ltd., Suwon-si (KR)

(72) Inventors: Seongjin Park, Suwon-si (KR); Hosaeng Kim, Suwon-si (KR); Sumin Yun, Suwon-si (KR); Chaejun Lee, Suwon-si (KR); Woomin Jang, Suwon-si (KR); Myunghun Jeong, Suwon-si (KR); Jehun Jong, Suwon-si (KR); Jaehoon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 18/074,952

(22) Filed: Dec. 5, 2022

(65) Prior Publication Data

US 2023/0094039 A1 Mar. 30, 2023

Related U.S. Application Data

(63) Continuation of application No. PCT/KR2021/007020, filed on Jun. 4, 2021.

(30) Foreign Application Priority Data

Jun. 5, 2020 (KR) ........................ 10-2020-0068649

(51) Int. Cl.
*H01Q 1/46* (2006.01)
*H01Q 1/24* (2006.01)
(Continued)

(52) U.S. Cl.
CPC ............... *H01Q 1/243* (2013.01); *H01Q 1/48* (2013.01); *H01Q 9/045* (2013.01); *H01Q 21/062* (2013.01); *H01Q 21/065* (2013.01)

(58) Field of Classification Search
CPC .......... H01Q 1/243; H01Q 1/48; H01Q 9/045; H01Q 21/062; H01Q 21/065; H01Q 1/523;
(Continued)

(56) References Cited

U.S. PATENT DOCUMENTS 4,827,271 A * 5/1989 Berneking ............. H01Q 5/378 343/846
5,003,318 A * 3/1991 Berneking ........... H01Q 9/0414 343/700 MS (Continued)

FOREIGN PATENT DOCUMENTS

JP 2014-014020 A 1/2014
JP 6361950 B2 7/2018

(Continued)

OTHER PUBLICATIONS

Extended European Search Report dated Nov. 2, 2023, issued in European Patent Application No. 21817063.7.

(Continued)

*Primary Examiner* — Dimary S Lopez Cruz
*Assistant Examiner* — Bamidele A Immanuel
(74) *Attorney, Agent, or Firm* — Jefferson IP Law, LLP

(57) ABSTRACT

An electronic device is provided. The electronic device includes a printed circuit board (PCB) including a plurality of layers, a communication circuit electrically coupled to the PCB, and at least one processor electrically coupled to the communication circuit. The PCB may include a first layer in which a plurality of patch antennas disposed, a first feeding path which feeds a first point of a first patch antenna so that the first patch antenna disposed to the first layer transmits and/or receives a first polarized signal, a second feeding path which feeds a second point of the first patch antenna so that the first patch antenna disposed to the first layer transmits (Continued)

and/or receives a second polarized signal orthogonal to the first polarized signal, a second layer including a ground, a first ground path, and a second ground.

20 Claims, 58 Drawing Sheets

(51) Int. Cl.
*H01Q 1/48* (2006.01)
*H01Q 9/04* (2006.01)
*H01Q 21/06* (2006.01)

(58) Field of Classification Search
CPC .......... H01Q 9/0407; H01Q 1/38; H01Q 5/40; H01Q 9/0414; H01Q 9/0435; H01Q 21/08; H01Q 1/46; H01Q 9/40
See application file for complete search history.

(56) References Cited

U.S. PATENT DOCUMENTS

| | | | | |
|---|---|---|---|---|
| 6,320,547 | B1 | 11/2001 | Fathy et al. | |
| 10,333,214 | B2 | 6/2019 | Kushta | |
| 11,303,021 | B2 | 4/2022 | Yun et al. | |
| 11,431,109 | B2 | 8/2022 | Yun et al. | |
| 2001/0048392 | A1* | 12/2001 | Kawahata | H01Q 1/243 343/700 MS |
| 2005/0190106 | A1 | 9/2005 | Anguera Pros et al. | |
| 2015/0130682 | A1 | 5/2015 | Jung et al. | |
| 2015/0155630 | A1 | 6/2015 | Jiang et al. | |
| 2019/0020110 | A1 | 1/2019 | Paulotto et al. | |
| 2019/0123443 | A1* | 4/2019 | Russell | H01Q 1/22 |
| 2019/0319364 | A1* | 10/2019 | Yang | H01Q 5/364 |
| 2019/0326674 | A1 | 10/2019 | Kang et al. | |
| 2020/0021026 | A1* | 1/2020 | Mitchell | H01Q 21/28 |
| 2020/0052390 | A1* | 2/2020 | Ahmadloo | H01Q 21/065 |
| 2020/0106192 | A1 | 4/2020 | Avser et al. | |
| 2020/0161749 | A1* | 5/2020 | Onaka | H01Q 21/24 |
| 2020/0266521 | A1* | 8/2020 | Jeong | H01Q 9/0407 |
| 2020/0295454 | A1* | 9/2020 | Yun | H01Q 1/2283 |
| 2020/0358203 | A1* | 11/2020 | Park | H01Q 1/243 |
| 2021/0151860 | A1* | 5/2021 | Park | H01Q 21/24 |
| 2022/0209416 | A1* | 6/2022 | Chou | H01Q 13/10 |

FOREIGN PATENT DOCUMENTS

| | | | |
|---|---|---|---|
| KR | 10-1304928 | B1 | 9/2013 |
| KR | 10-2015-0054272 | A | 5/2015 |
| KR | 10-2019-0039060 | A | 4/2019 |
| KR | 10-2019-0062064 | A | 6/2019 |
| KR | 10-2019-0098529 | A | 8/2019 |
| KR | 10-2048996 | B1 | 11/2019 |
| WO | 2015/068252 | A1 | 5/2015 |
| WO | 2020/090838 | A1 | 5/2020 |

OTHER PUBLICATIONS

Korean Office Action dated May 16, 2024, issued in a Korean Patent Application No. 10-2020-0068649.
Korean Notice of Patent Grant dated Dec. 23, 2024, issued in Korean Patent Application No. 10-2020-0068649.
International Search Report dated Sep. 17, 2021, issued in International Application No. PCT/KR2021/007020.

* cited by examiner

Mutual coupling (LB)

| | |
|---|---|
| Layer 1 | Periodic structure |
| Layer 2 | Second Frequency Band Patch |
| Layer 3 | Second Frequency Band feed |
| Layer 4 | |
| Layer 5 | First Frequency Band patch |
| Layer 6 | First Frequency Band feed |
| Layer 7 | |
| Core | |
| Layer 8 | |
| Layer 9 | ANT GND |
| Layer 10 | Feed line & Filter |
| Layer 11 | GND |
| Layer 12~14 | Logic |

FIG.10B

Realized gain

ELECTRONIC DEVICE COMPRISING ANTENNA

CROSS-REFERENCE TO RELATED APPLICATION(S)

This application is a continuation application, claiming priority under § 365(c), of an International application No. PCT/KR2021/007020, filed on Jun. 4, 2021, which is based on and claims the benefit of a Korean patent application number 10-2020-0068649, filed on Jun. 5, 2020, in the Korean Intellectual Property Office, the disclosure of which is incorporated by reference herein in its entirety.

BACKGROUND

1. Field

The disclosure relates to a technique for an antenna included in an electronic device. More particularly, the disclosure relates an electronic device including an antenna ground path capable of preventing an antenna performance deterioration while making the antenna structure small in size.

2. Description of Related Art

A gradual increase in the number of functions of an electronic device results in an increase in the number of internal parts of the electronic device. In addition thereto, the electronic device includes an antenna capable of transmitting and/or receiving a high-frequency or broadband signal to support a next-generation wireless communication system.

When a size of an antenna ground of the included antenna is increased, feeding paths electrically coupled to the antenna ground may be spaced apart by a sufficient distance.

The above information is presented as background information only to assist with an understanding of the disclosure. No determination has been made, and no assertion is made, as to whether any of the above might be applicable as prior art with regard to the disclosure.

SUMMARY

An increase in the number of functions supported by an electronic device and a decrease in a thickness of the electronic device result in an insufficient space for mounting an antenna structure. A size of the antenna structure may be determined by a size of a patch antenna included in the antenna structure and a size of a ground related to antenna performance.

However, when a ground width which determines a width of the antenna structure is decreased, a feed-to-feed coupling feature of a patch antenna structure may deteriorate. Since the deterioration of the feed-to-feed coupling feature results in the deterioration of antenna performance, there may be a limitation in making the antenna structure small in size.

Aspects of the disclosure are to address at least the above-mentioned problems and/or disadvantages and to provide at least the advantages described below. Accordingly, an aspect of the disclosure is to provide an electronic device including an antenna ground path capable of preventing an antenna performance deterioration while making the antenna structure small in size.

Additional aspects will be set forth in part in the description which follows and, in part, will be apparent from the description, or may be learned by practice of the presented embodiments.

In accordance with an aspect of the disclosure, an electronic device is provided. The electronic device includes a printed circuit board (PCB) including a plurality of layers, a communication circuit electrically coupled to the PCB, and at least one processor electrically coupled to the communication circuit. The PCB may include a first layer in which a plurality of patch antennas are disposed, a first feeding path which feeds directly or indirectly a first point of a first patch antenna so that the first patch antenna disposed to the first layer transmits and/or receives a first polarized signal, wherein the first feeding path includes a via penetrating a first number of layers among the plurality of layers and is electrically coupled to the communication circuit, a second feeding path which feeds directly or indirectly a second point of the first patch antenna so that the first patch antenna disposed to the first layer transmits and/or receives a second polarized signal orthogonal to the first polarized signal, wherein the second feeding path includes a via penetrating the first number of layers among the plurality of layers and is electrically coupled to the communication circuit, a second layer including a ground, a first ground path which electrically couples the ground and a third point adjacent to the first point of the first patch antenna from the outside of the first patch antenna, and a second ground path which electrically couples the ground and a fourth point adjacent to the second point of the first patch antenna from the outside of the first patch antenna.

According to various embodiments disclosed in the disclosure, it is possible to reduce a size of a ground of a printed circuit board (PCB) while maintaining or improving antenna performance.

According to various embodiments disclosed in the disclosure, a PCB with a smaller size may be implemented to provide a smaller electronic device to a user, thereby improving user's convenience of portability.

According to various embodiments disclosed in the disclosure, a ground path of a ground may be disposed at a proper position to improve a feed-to-feed coupling feature of a patch antenna.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10B illustrates a configuration for each layer of a PCB of an antenna module according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
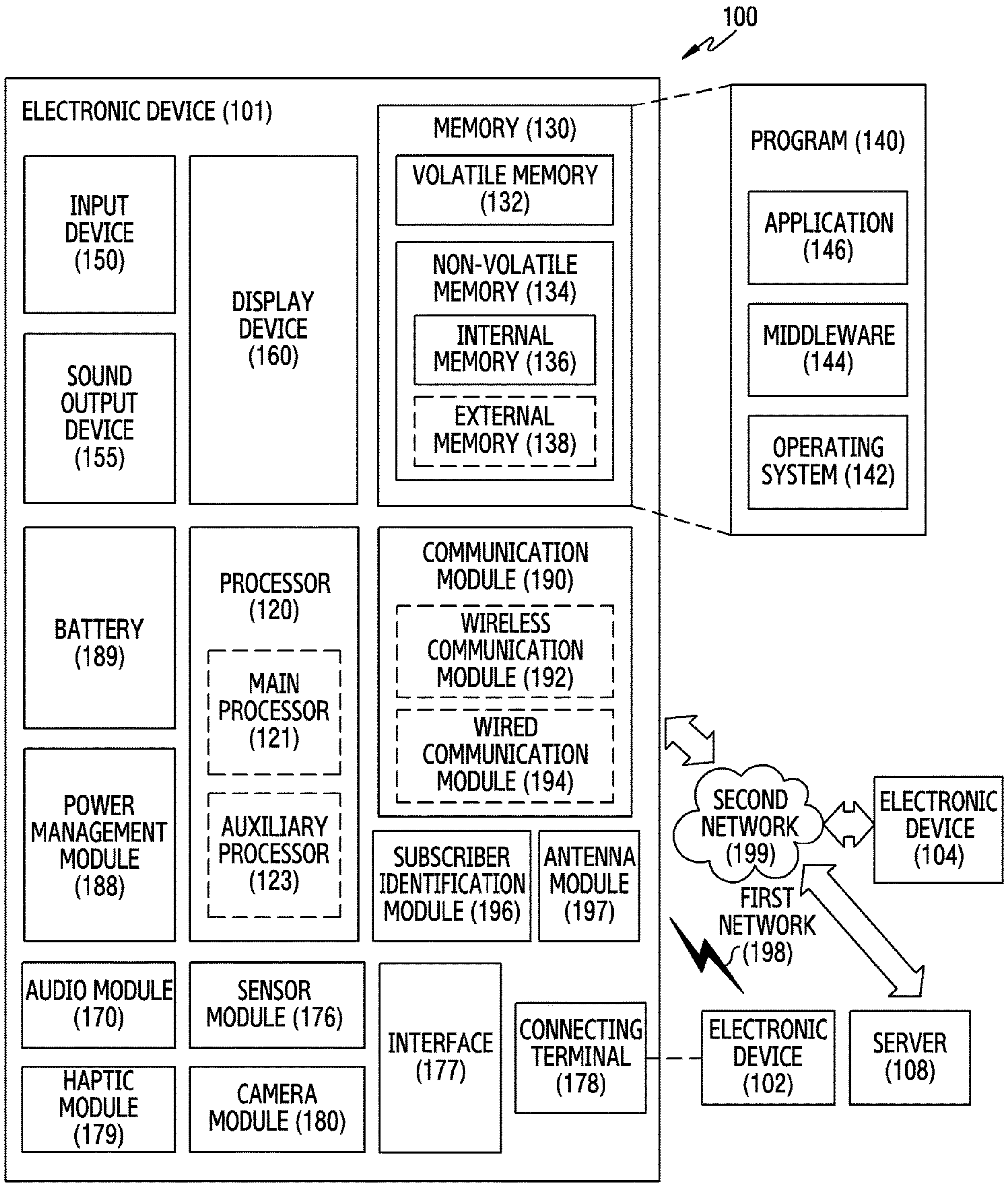
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the displays, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
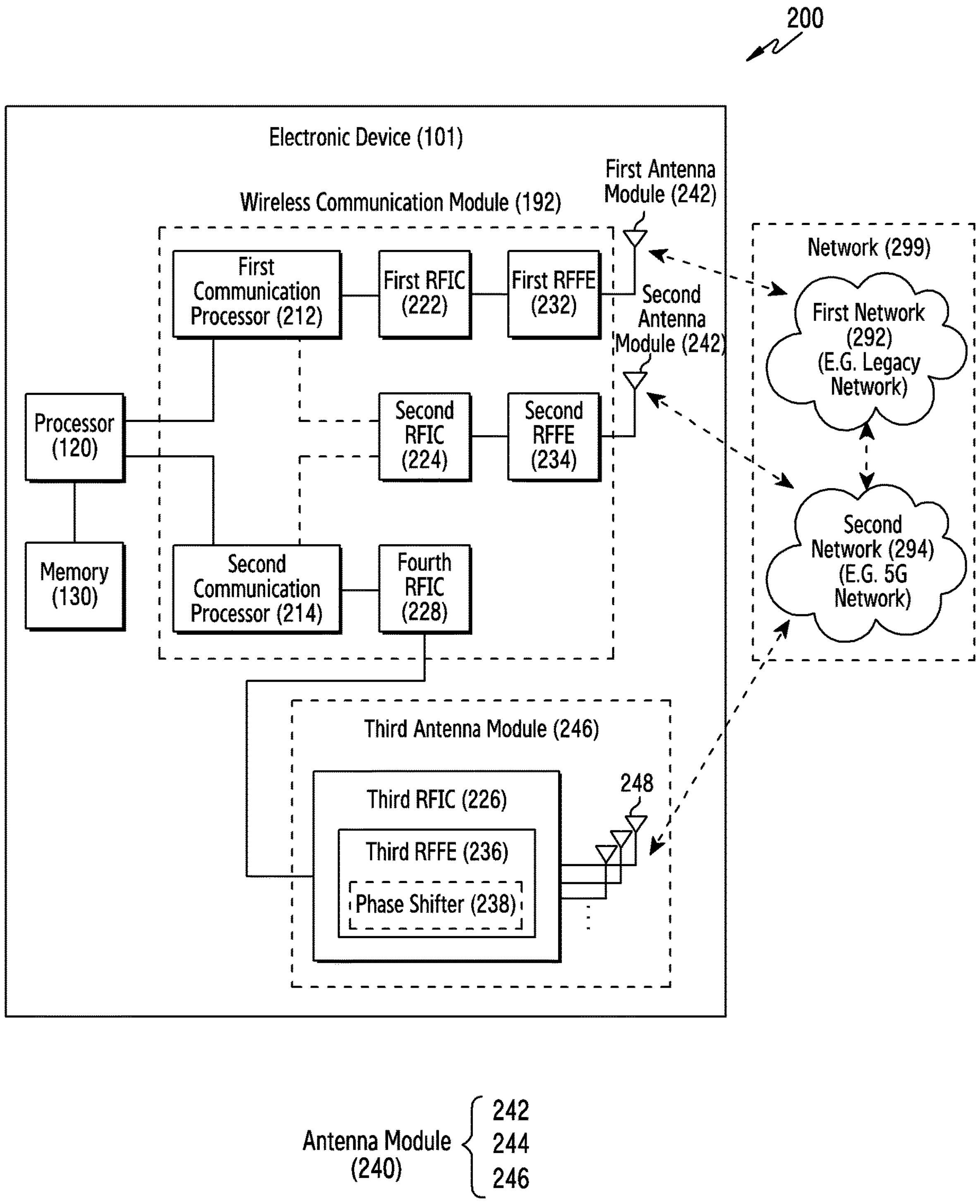
FIG. 2 is a block diagram of an electronic device in a network environment including a plurality of cellular networks according to an embodiment of the disclosure.

FIG. 2 is a block diagram 200 of an electronic device in a network environment including a plurality of cellular networks according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. A network 199 may include a first cellular network 292 and a second cellular network 294. According to another embodiment of the disclosure, the electronic device 101 may further include at least one component among the components of FIG. 1, and the network 299 may further include at least one different network. According to an embodiment of the disclosure, the first communication processor 212, the second communication processor 214, the first RFIC 222, the second RFIC 224, the fourth RFIC 228, the first RFFE 232, and the second RFFE 234 may form at least part of the wireless communication module 192.

According to another embodiment of the disclosure, the fourth RFIC 228 may be omitted, or may be included as part of the third RFIC 226.

The first communication processor 212 may establish a communication channel of a band to be used in wireless communication with the first cellular network 292, and may support legacy network communication through the established communication channel. According to various embodiments of the disclosure, the first cellular network may be a legacy network including 2nd generation (2G), 3rd generation (3G), 4th generation (4G), or long-term evolution (LTE) networks. The second communication processor 214 may establish a communication channel corresponding to a designed band (e.g., about 6 gigahertz (GHz) to about 60 GHz) among bands to be used in wireless communication with the second cellular network 294, and may support 5th generation (5G) network communication through the established communication channel. According to various embodiments of the disclosure, the second cellular network 294 may be a 5G network defined in third generation partnership project (3GPP). In addition, according to an embodiment of the disclosure, the first communication processor 212 or the second communication processor 214 may establish a communication channel corresponding to another designated band (e.g., below about 6 GHz) among bands to be used in wireless communication with the second cellular network 294. According to an embodiment of the disclosure, the first communication processor 212 and the second communication processor 214 may be implemented within a single chip or a single package. According to various embodiments of the disclosure, the first communication processor 212 or the second communication processor 214 may be constructed inside a single chip or a single package, together with the processor 120, the auxiliary processor 123, or the communication module 190. According to an embodiment of the disclosure, the first communication processor 212 and the second communication processor 214 may be directly or indirectly coupled to each other by means of an interface (not shown), so that data or a control signal is provided or received in any one direction or both directions.

In case of transmission, the first RFIC 222 may convert a baseband signal generated by the first communication processor 212 into a Radio Frequency (RF) signal of about 700 MHz to about 3 GHz used in the first cellular network 292 (e.g., the legacy network). In case of reception, the RF signal may be acquired from the first cellular network 292 (e.g., the legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

In case of transmission, the second RFIC 224 may convert a baseband signal generated by the first communication processor 212 or the second communication processor 214 into an RF signal of a Sub6 band (e.g., below about 6 GHz) (hereinafter, a 5G Sub6 RF signal) used in the second cellular network 294 (e.g., the 5G network). In case of reception, the 5G Sub6 RF signal may be acquired from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding communication processor, i.e., either the first communication processor 212 or the second communication processor 214.

The third RFIC 226 may convert a baseband signal generated by the second communication processor 214 into an RF signal of a 5G Above6 band (e.g., about 6 GHz to about 60 GHz) (hereinafter, a 5G Above 6 RF signal) to be used in the second cellular network 295 (e.g., the 5G network). In case of reception, the 5G Above6 RF signal may be acquired from the second cellular network 294 (e.g., the 5G network) through an antenna (e.g., the antenna 248), and may be preprocessed through the third RFFE 236. The third RFIC 226 may convert the preprocessed 5G Above6 RF signal into a baseband signal so as to be processed by the second communication processor 214. According to an embodiment of the disclosure, the third RFFE 236 may be constructed as part of the third RFIC 226.

According to an embodiment of the disclosure, the electronic device 101 may include the fourth RFIC 228, either separately or as part of the third RFIC 226. In this case, the fourth RFIC 228 may convert a baseband signal generated by the second communication processor 214 into an RF signal of an intermediate frequency band (e.g., about 9 GHz to about 11 GHz) (hereinafter, an intermediate frequency (IF) signal), and thereafter may transfer the IF signal to the third RFIC 226. The third RFIC 226 may convert the IF signal into a 5G above 6 RF signal. In case of reception, the 5G Above6 RF signal may be received from the second cellular network 294 (e.g., the 5G network) through an antenna (e.g., the antenna 248), and may be converted into an IF signal by means of the third RFIC 226. The fourth RFIC 228 may convert the IF signal into a baseband signal so as to be processed by the second communication processor 214.

According to an embodiment of the disclosure, the first RFIC 222 and the second RFIC 224 may be implemented as at least part of a single chip or single package. According to an embodiment of the disclosure, the first RFFE 232 and the second RFFE 234 may be implemented as at least part of a single chip or single package. According to an embodiment of the disclosure, at least one antenna module, i.e., either the first antenna module 242 or the second antenna module 244, may be omitted or may be coupled with another antenna module to process RF signals of a plurality of corresponding bands.

According to an embodiment of the disclosure, the third RFIC 226 and the antenna 248 may be disposed to the same substrate to construct the third antenna module 246. For example, the wireless communication module 192 or the processor 120 may be disposed to a first substrate (e.g., a main PCB). In this case, the third antenna module 246 may be constructed by disposing the third RFIC 226 to a portion (e.g., a lower face) of a second substrate (e.g., a sub PCB) separated from the first substrate and by disposing the antenna 248 to another portion (e.g., an upper face). Since the third RFIC 226 and the antenna 248 are disposed to the same substrate, a length of a transmission line between them may be decreased. Therefore, for example, a signal of a high-frequency band (e.g., about 6 GHz to about 60 GHz) used in 5G network communication may be prevented from being lost (e.g., deterioration) by the transmission line. Accordingly, the electronic device 101 may improve quality or speed of communication with the second cellular network 294 (e.g., the 5G network).

According to an embodiment of the disclosure, the antenna 248 may be constructed of an antenna array including a plurality of antenna elements which may be used in beamforming. In this case, the third RFIC 226 may include a plurality of phase shifters 238 corresponding to the plurality of antenna elements, for example, as part of the third RFFE 236. In case of transmission, the plurality of phase shifters 238 may convert phases of 5G Above6 RF signals to be transmitted to the outside (e.g., a base station of the 5G network) of the electronic device 101 through respective corresponding antenna elements. In case of reception, the plurality of phase shifters 238 may convert phases of 5G Above6 RF signals received from the outside through respective corresponding antenna elements into the same or substantially same phase. Accordingly, transmission or reception is possible through beamforming between the electronic device 101 and the outside.

The second cellular network 294 (e.g., the 5G network) may operate independently of the first cellular network 292 (e.g., the legacy network) (e.g., stand-alone (SA)), or may operate in conjunction therewith (e.g., non-stand alone (NSA)). For example, the 5G network may have only an access network (e.g., a 5G radio access network (RAN) or next generation RAN (NG RAN)), and may not have a core network (e.g., a Next Generation Core (NGC)). In this case, the electronic device 101 may access the access network of the 5G network and thereafter may access an external network (e.g., the Internet) under the control of a core network (e.g., an evolved packed core (EPC)) of the legacy network. Protocol information for communication with the legacy network (e.g., LTE protocol information) or protocol information for communication with the 5G network (e.g., new radio (NR) protocol information) may be stored in the memory 130 so as to be accessed by another component (e.g., the processor 120, the first communication processor 212, or the second communication processor 214).

Figure 3:
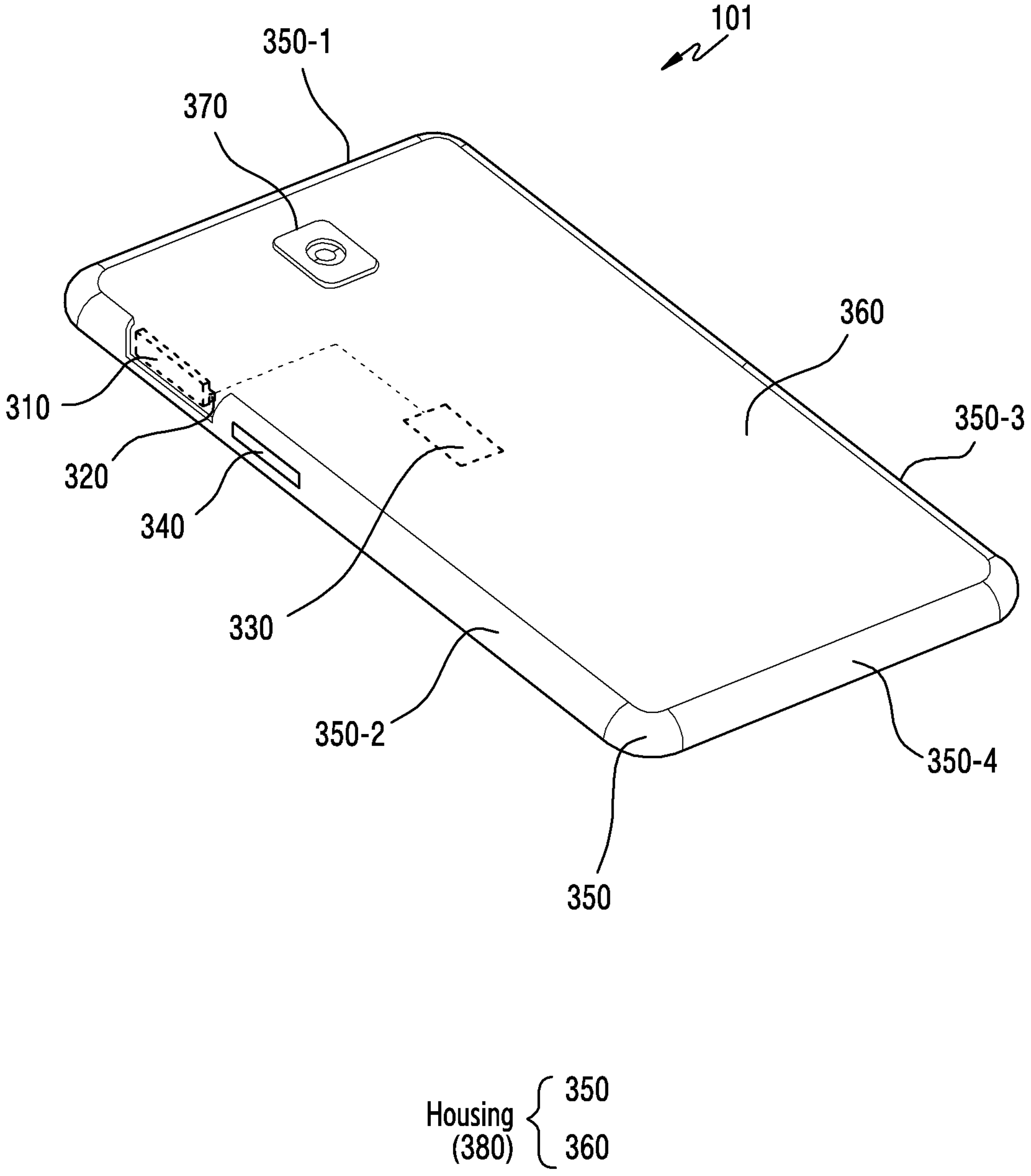
FIG. 3 illustrates an electronic device according to an embodiment of the disclosure.

FIG. 3 illustrates the electronic device according to an embodiment of the disclosure.

Referring to FIG. 3, the electronic device 101 according to an embodiment may include a PCB 310, a communication circuit 320 disposed to one face of the PCB 310, a processor 330 (e.g., the processor 120 of FIG. 1) electrically coupled to the communication circuit 320, a rear cover 360, and a side member 350 surrounding a space between a display and the rear cover 360. In an embodiment of the disclosure, a housing 380 may include the side member 350 or the rear cover 360. The side member 350 may include a first side face 350-1, a second side face 350-2, a third side face 350-3, and/or a fourth side face 350-4. The display may be disposed to at least part of a front face of the electronic device 101 according to an embodiment. In an embodiment of the disclosure, the display may occupy most of the front face of the electronic device 101.

In an embodiment of the disclosure, the PCB 310 may be disposed adjacent to the second side face 350-2 of the electronic device 101. Although it is illustrated in FIG. 3 that the PCB 310 is disposed in an inner direction of the second side face 350-2, the PCB 310 may also be disposed in an inner direction of at least one of the first side face 350-1, the third side face 350-3, and the fourth side face 350-4. According to an embodiment of the disclosure, the electronic device 101 may also include a PCB including a mesh-shaped antenna element in an inner direction of the display.

In an embodiment of the disclosure, the electronic device 101 may additionally include at least one PCB in addition to the PCB 310. For example, the electronic device 101 may include a PCB adjacent to at least one of the first side face 350-1, the third side face 350-3, and the fourth side face 350-4. In an embodiment of the disclosure, a PCB may also be disposed in an inner direction of part of the rear cover 360 of the electronic device 101. The PCB 310 may be electrically coupled to the processor 330.

In an embodiment of the disclosure, a rear camera 370 may be disposed to a rear face of the electronic device 101. The rear camera 370 may be exposed through some regions of the rear cover 360. In an embodiment of the disclosure, the electronic device 101 may include at least one rear camera disposed to some regions.

In an embodiment of the disclosure, a physical key may be disposed to the side member 350 of the electronic device 101. For example, a first function key 340 for powering on/off the display or powering on/off the electronic device 101 may be disposed to the second side face 350-2 of the electronic device 101. In an embodiment of the disclosure, a second function key for controlling volume of the electronic device 101 or controlling screen brightness or the like may be disposed to the third side face 350-3 of the electronic device 101. In addition thereto, the additional button or key may also be disposed to the front face or rear face of the electronic device 101.

The electronic device 101 of FIG. 1 corresponds to only one example, and does not limit a shape of a device to which the technical idea disclosed in the disclosure is applied. For example, the technical idea disclosed in the disclosure may also be applied to a foldable electronic device which is foldable horizontally or vertically by adopting a flexible display and a hinge structure, or an electronic device, tablet, or laptop which is slidable by using the flexible display.

Hereinafter, various embodiments are described, for convenience of explanation, based on the electronic device 101 of FIG. 3.

Figure 4:
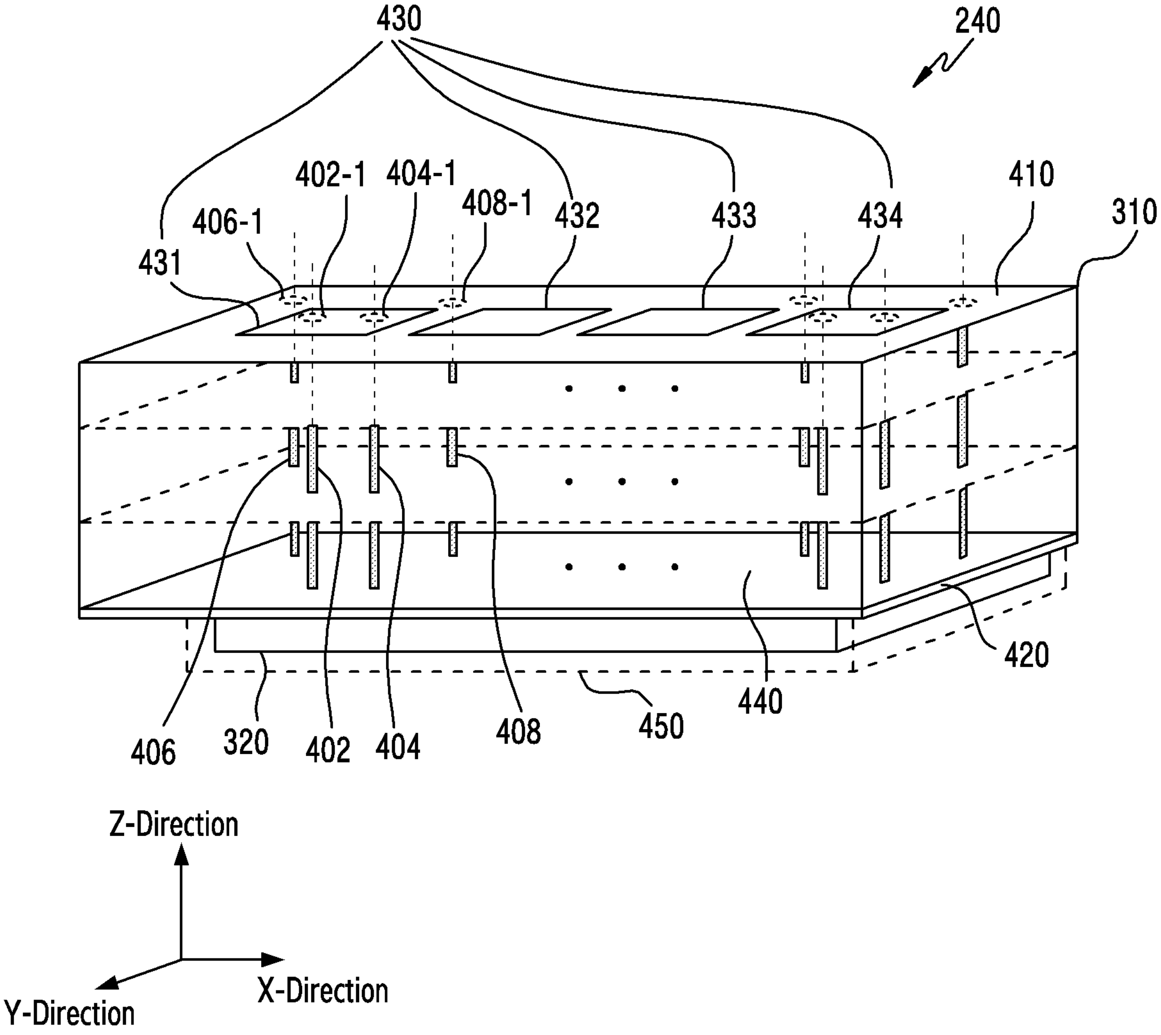
FIG. 4 illustrates a printed circuit board (PCB) included in an antenna module of an electronic device according to an embodiment of the disclosure.

FIG. 4 illustrates a PCB included in an antenna module of an electronic device according to an embodiment of the disclosure.

For example, FIG. 4 is a perspective view of the PCB 310 described with reference to FIG. 3, viewed from one side.

Referring to FIG. 4, in an embodiment of the disclosure, the third antenna module 240 may include the PCB 310, the communication circuit 320, and/or a module interface (not shown). The PCB 310 may include, at least, an antenna array 430 and a ground 440. The communication circuit 320 may include a radio frequency integrated circuit (RFIC). The PCB 310 may further include a power management integrated circuit (PMIC). As another example, the antenna module 240 may further include a shielding member 450. In other embodiments of the disclosure, at least one of the aforementioned components may be omitted, or at least two of the components may be integrally constructed.

In an embodiment of the disclosure, the PCB 310 may include a plurality of layers. For example, the PCB 310 may include a plurality of conductive layers and a plurality of non-conductive layers stacked alternately with the conductive layers. For example, at least one conductive layer and/or at least one non-conductive layer may be constructed between a first layer 410 in which a first patch antenna 431 disposed and a second layer 420 in which the ground 440 disposed. In an example, a layer not including an antenna element may be included between the first layer 410 and the second layer 420.

In an embodiment of the disclosure, the PCB 310 may provide an electrical connection between various electronic components disposed outside and/or another PCB by using wirings and conductive vias constructed on the conductive layer.

In an embodiment of the disclosure, the antenna array 430 may include a plurality of patch antennas 431, 432, 433, and 434 disposed to form a directional beam. For example, the plurality of patch antennas 431, 432, 433, and 434 may construct an antenna array having an M×N array, such as 1×5, 5×1, 1×4, 4×1, or 2×2. For example, the antenna array 430 may be an antenna array for beamforming in a direction including a vertical direction of the first patch antenna 431. In this regard, descriptions related to the antenna 248 of FIG. 2 may be applied to the antenna array 430 of FIG. 4. In an embodiment of the disclosure, the plurality of patch antennas 431, 432, 433, and 434 may operate as patch antennas.

In an embodiment of the disclosure, the patch antennas 431, 432, 433, and 434 may be constructed on the first layer 410 (e.g., the first face) of the PCB 310 as illustrated. According to another embodiment of the disclosure, the antenna array 430 may be constructed inside the PCB 310. According to embodiments of the disclosure, the antenna array 430 may include a plurality of antenna arrays having the same or different shapes or types. For example, the plurality of antenna arrays may include a dipole antenna array and/or a patch antenna array. The plurality of patch antennas 431, 432, 433, and 434 may have, for example, at least any one of a circular shape, an oval shape, and a rectangular shape. In an embodiment of the disclosure, a dielectric layer may be constructed in a +z direction of the plurality of patch antennas 431, 432, 433, and 434.

In an embodiment of the disclosure, the communication circuit 320 (e.g., the third RFIC 226 of FIG. 2) may be disposed to another region (e.g., a second face opposite to the first face) of the PCB 310. The communication circuit 320 may be configured to process a signal of a selected frequency band, transmitted and/or received through an antenna array. According to an embodiment of the disclosure, in case of transmission, the communication circuit 320 may convert a baseband signal acquired from a communication processor into an RF signal of a specified band. In case of reception, the communication circuit 320 may convert an RF signal received through the antenna array into a baseband signal and transmit it to the communication processor.

In an embodiment of the disclosure, in case of transmission, the communication circuit 320 may up-convert an IF signal acquired from an intermediate frequency integrated circuit (IFIC) into an RF signal of a selected band. In an embodiment of the disclosure, the IF signal may correspond to a band of about 9 GHz to about 15 GHz. As another example, the description related to the fourth RFIC 228 of FIG. 2 may be applied to the IFIC. As another example, in case of reception, the communication circuit 320 may down-convert an RF signal acquired through the antenna array 430 into an IF signal and transmit it to the IFIC.

In an embodiment of the disclosure, the PMIC may be disposed to some other regions of the PCB 310. Voltage is supplied from a battery, and the PMIC may provide power required for various components (e.g., the communication circuit 320) included in the antenna module 240.

In an embodiment of the disclosure, the shielding member 450 may be disposed to a portion (e.g., the second face) of the PCB 310 to electrically shield the communication circuit 320. According to an embodiment of the disclosure, the shielding member 450 may include a shield can.

In an embodiment of the disclosure, the PCB 310 may be electrically coupled to a different PCB (e.g., a circuit board on which the processor 330 disposed) through a module interface (not shown). The module interface may include a connection member, for example, a coaxial cable connector, a board to board connector, an interposer, or a flexible printed circuit board (FPCB). Through the connection member, the communication circuit 320 of the antenna module 240 may be electrically coupled to the different PCB.

In an embodiment of the disclosure, a first ground path 406 and/or a second ground path 408 may be disposed inside the PCB 310 to improve a coupling feature between feeding paths. For example, the first ground path 406 and the second ground path 408 may be grounded to the ground 440 and disposed to penetrate some regions of the PCB 310. In an embodiment of the disclosure, the first ground path 406 and/or the second ground path 408 may include a path or pattern constructed through a via process.

In an embodiment of the disclosure, the first patch antenna 431 may include a first point 402-1 and a second point 404-1. As another example, the PCB 310 may include a third point 406-1 and a fourth point 408-1. In an embodiment of the disclosure, the third point 406-1 at which the first ground path 406 is located may be disposed in quadrants of −x and −y directions with respect to a center point of the first patch antenna 431. The first point 402-1 at which a first feeding path 402 is located may be disposed in quadrants of −x and −y directions with respect to the center point of the first patch antenna 431. The fourth point 408-1 at which the second ground path 408 is located may be disposed in quadrants of +x and −y directions with respect to the center point of the first patch antenna 431. The second point 404-1 at which a second feeding path 404 is located may be disposed in quadrants of +x and −y directions with respect to the center point of the first patch antenna 431. Due to the deployment of the first to fourth points 402-1, 404-1, 406-1, and 408-1, the coupling feature between feeding paths may be improved.

The described structure may be equally applied not only to the first patch antenna 431 but also to at least one of the patch antennas 432, 433, and 434 disposed side by side. For example, two ground paths corresponding to a patch antenna included in the antenna array 430 may be disposed.

Although the ground paths and the feeding paths are constructed on the PCB 310 in the described structure, this is only one example. Therefore, the ground paths and/or the feeding paths may be constructed in another hardware configuration which may be referred to as an antenna structure in addition to the PCB 310.

Figure 5:
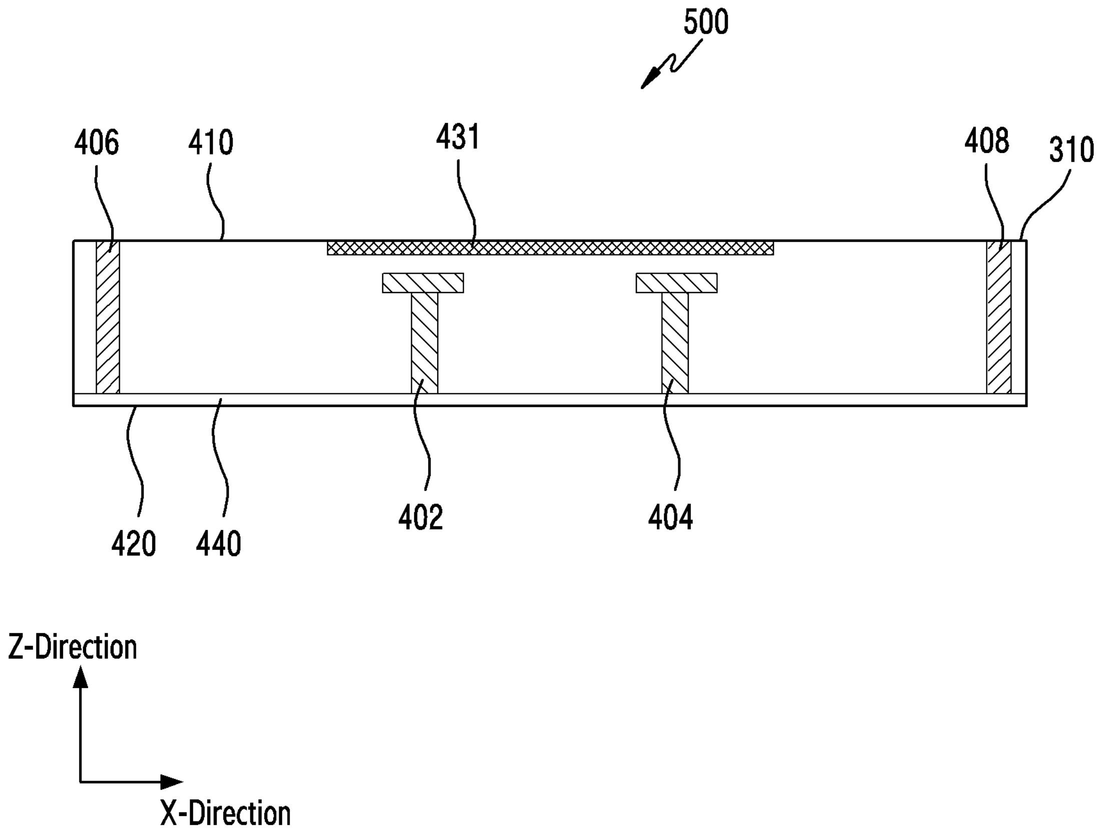
FIG. 5 is a transparent view of a PCB of a single-band dual-polarization antenna module, viewed from a side face, according to an embodiment of the disclosure.

FIG. 5 is a transparent view 500 of a PCB of a single-band dual-polarization antenna module, viewed from a side face, according to an embodiment of the disclosure.

Referring to FIG. 5, the PCB 310 may include the first patch antenna 431 constructed on the first layer 410, the ground 440 constructed on the second layer 420, the first feeding path 402, the second feeding path 404, the first ground path 406, and/or the second ground path 408.

In an embodiment of the disclosure, the antenna module 240 may include a communication circuit (e.g., the communication circuit 320 of FIG. 4) disposed to one face of the PCB 310. The PCB 310 may include the first feeding path 402 electrically coupled to the communication circuit 320, or the second feeding path 404.

In an embodiment of the disclosure, at least one conductive layer or at least one non-conductive layer or a cavity for impedance matching may be included between the ground 440 and the first layer 410 to which the first patch antenna 431 is disposed. Referring to FIG. 5, the first patch antenna 431 disposed to the first layer 410 according to an embodiment may be disposed to be spaced apart from the first feeding path 402, and may be indirectly fed through the first feeding path 402. In another embodiment of the disclosure, the first patch antenna 431 may be directly fed to the first feeding path 402. In an embodiment of the disclosure, the first feeding path 402 and/or the second feeding path 404 may include a via penetrating a first number of layers, and may be electrically coupled to the communication circuit 320. For example, the first number may be 4 to 8. The communication circuit 320 may use the feeding paths 402 and 404 to feed the first patch antenna 431.

According to an embodiment of the disclosure, the first ground path 406 and/or the second ground path 408 may be disposed to the PCB 310 by being spaced apart from the first patch antenna 431. For example, the ground paths 406 and 408 may be disposed by being spaced apart by substantially the same distance from a center point of the first patch antenna 431. In an embodiment of the disclosure, the ground paths 406 and 408 may be substantially parallel to the first feeding path 402 and/or the second feeding path 404.

Figure 6A:
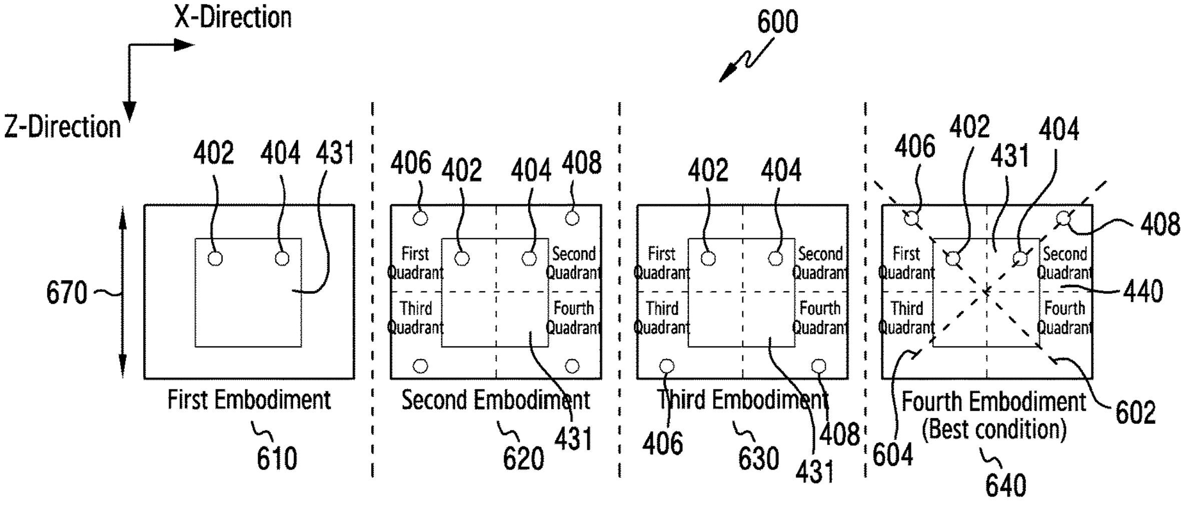
FIG. 6A is a view illustrating a PCB of a single-band dual-polarization antenna module according to an embodiment of the disclosure.
Figure 6B:
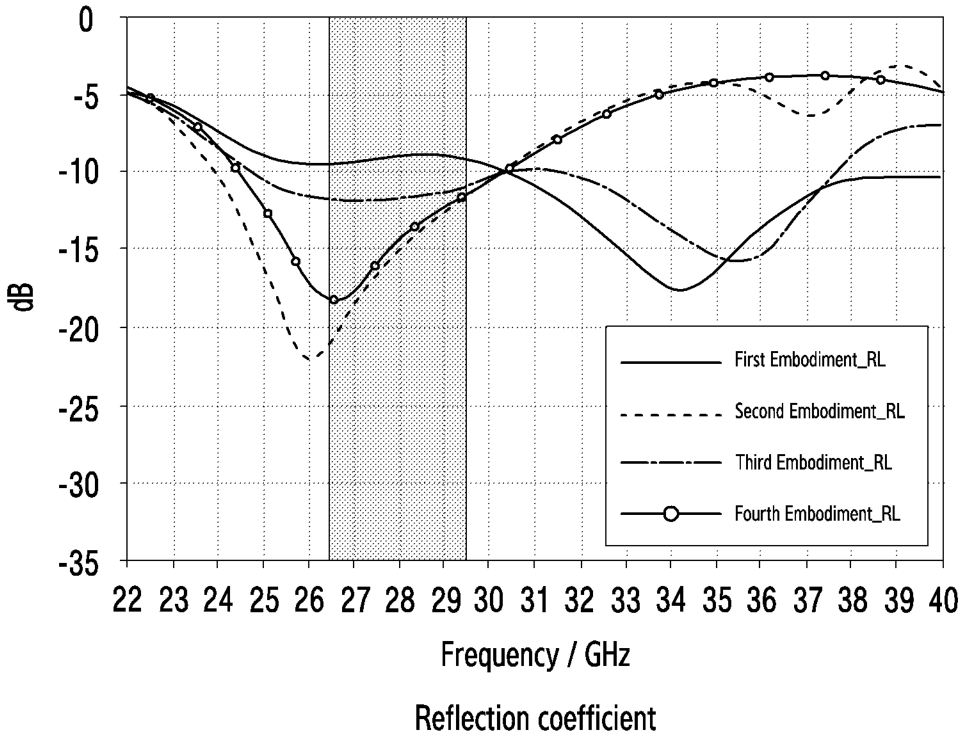
FIG. 6B is a graph illustrating performance of a single-band dual-polarization antenna module according to an embodiment of the disclosure.
Figure 6C:
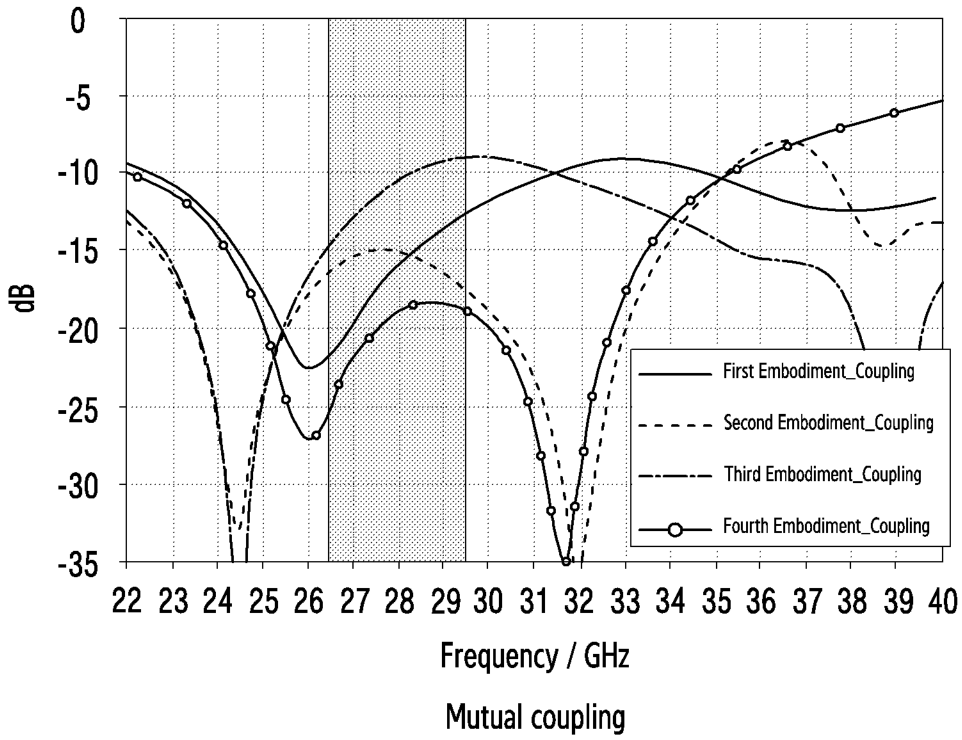
FIG. 6C is a graph illustrating performance of a single-band dual-polarization antenna module according to an embodiment of the disclosure.

FIG. 6A is a view 600 illustrating a PCB of a single-band dual-polarization antenna module according to an embodiment of the disclosure. FIGS. 6B and 6C are graphs illustrating efficiency of an antenna module depending on a deployment of a ground path (e.g., the ground paths 406 and 408 of FIG. 4) according to various embodiments of the disclosure.

Referring to FIGS. 6B and 6C, a graph illustrating a return loss of the antenna module 240 according to a first embodiment 610 to a fourth embodiment 640 and a graph illustrating a mutual coupling feature of the antenna module 240 according to the first embodiment 610 to the fourth embodiment 640 are illustrated. The PCB 310 is illustrated in part in the embodiments 610, 620, 630, and 640 of FIG. 6A.

According to various embodiments of the disclosure, the PCB 310 according to the first embodiment 610 may not have a ground path disposed around the first patch antenna 431.

The PCB 310 according to the second embodiment 620 may include four ground paths disposed to a first quadrant, a second quadrant, a third quadrant, or a fourth quadrant.

The PCB 310 according to the third embodiment 630 may include the first ground path 406 disposed to the third quadrant or the second ground path 408 disposed to the fourth quadrant.

The PCB 310 according to the fourth embodiment 640 may include the first ground path 406 disposed to the first quadrant or the second ground path 408 disposed to the second quadrant.

In the first to fourth embodiments 610, 620, 630, and 640, the first feeding path 402 may be disposed to the first quadrant, and the second feeding path 404 may be disposed to the second quadrant.

Referring to FIG. 6B, it shows that a return loss feature of the second embodiment 620 and the fourth embodiment 640 is excellent at a first targeting band (e.g., 26.5 GHz to 29.5 GHz).

Referring to FIG. 6C, it shows that a coupling feature of the fourth embodiment 640 is relatively excellent at the first targeting band (e.g., 26.5 GHz to 29.5 GHz). The ground paths 406 and 408 may serve, for example, to induce polarization so that feed-to-feed coupling does not easily occur.

In an embodiment of the disclosure, an angle formed by a first virtual line 602 and a second virtual line 604 may be a specified angle between 60° and 120° in order to improve a dual polarization feature of an antenna. The first line 602 may be a line connecting a first point (e.g., the first point 402-1 of FIG. 4) and a third point (e.g., the third point 406-1 of FIG. 4). The second virtual line 604 may be a line connecting a second point (e.g., the second point 404-1 of FIG. 4) and a fourth point (e.g., the fourth point 408-1 of FIG. 4).

In an embodiment of the disclosure, in order to improve the coupling feature of the dual-polarization antenna, the PCB 310 of the antenna module 240 may be implemented as in the fourth embodiment 640 in which the coupling feature is relatively good at the first targeting band.

Figure 7:
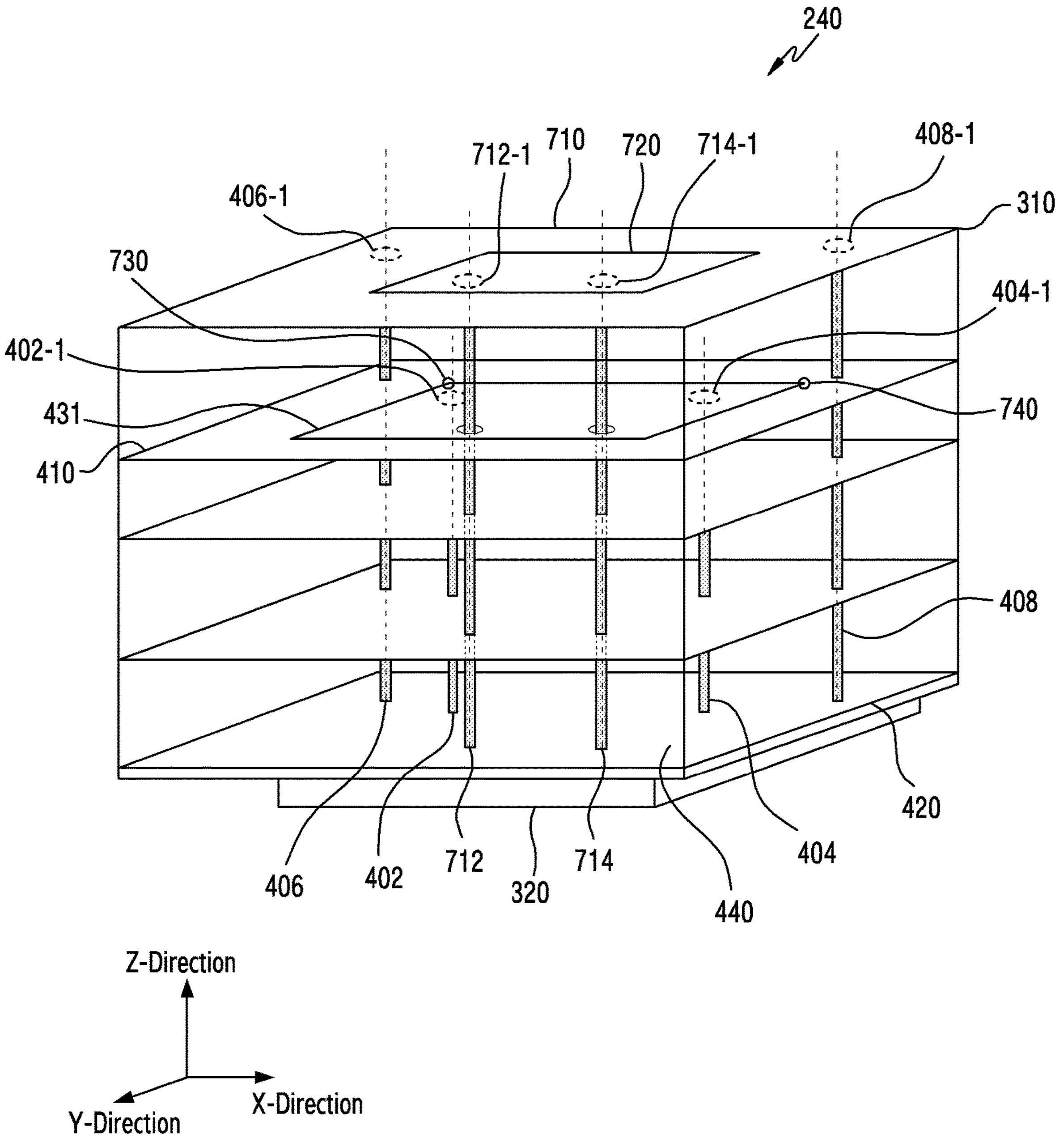
FIG. 7 is a view illustrating, in part, a PCB of an antenna module according to an embodiment of the disclosure.

FIG. 7 is a view 700 illustrating, in part, a PCB of an antenna module according to an embodiment of the disclosure. FIG. 7 illustrates a structure corresponding to a first patch antenna and second patch antenna of an N×M antenna array. For example, the structure illustrated in FIG. 7 may be applied to an antenna array of a 1×4, 1×5, or 2×2 array.

Referring to FIG. 7, at least one conductive layer or at least one non-conductive layer may be constructed between the first layer 410 (e.g., the first layer 410 of FIG. 4) in which a first patch antenna 431 disposed and a third layer 710 in which the second patch antenna 720 disposed. For example, a non-conductive layer not including an antenna element may be included between the first layer 410 in which the first patch antenna 431 disposed and the third layer 710 in which the second patch antenna 720 disposed. According to an embodiment of the disclosure, the third layer 710 may be disposed farther from the ground 440 than the first layer 410. The second patch antenna 720 may be disposed farther from the ground 440 than the first patch antenna 431. The second patch antenna 720 may be disposed to overlap at least in part with the first patch antenna 431 when viewed from above the third layer 710.

According to an embodiment of the disclosure, a size of the second patch antenna 720 may be smaller than a size of the first patch antenna 431. For example, a length of the first patch antenna 431 having a square shape may be about 2.4 mm to about 2.5 mm, and a length of the second patch antenna 720 having a square shape may be about 1.7 mm to about 1.8 mm.

According to an embodiment of the disclosure, the second patch antenna 720 may be configured to transmit and/or receive a signal of a higher frequency band than that of the first patch antenna 431. For example, the first patch antenna 431 may operate to transmit and/or receive a signal of a band of 26.5 GHz to 29.5 GHz, and the second patch antenna 720 may be configured to transmit and/or receive a signal of a band of about 36 GHz to about 40 GHz.

According to an embodiment of the disclosure, the first patch antenna 431 to be disposed to the first layer 410 may be fed through the first feeding path 402 and the second feeding path 404. In an embodiment of the disclosure, the first patch antenna 431 may be fed directly or indirectly through the first feeding path 402 and the second feeding path 404. For example, the feeding paths 402 and 404 may be coupled to the first patch antenna 431 by extending up to the first layer 410, and thus may feed directly the first patch antenna 431. As another example, the feeding paths 402 and 404 may not be coupled to the first patch antenna 431 by extending up to a layer lower than the first layer, and may feed indirectly the first patch antenna 431.

According to an embodiment of the disclosure, the second patch antenna 720 disposed to the third layer 710 may be fed through a third feeding path 712 and a fourth feeding path 714. In an embodiment of the disclosure, the second patch antenna 720 may be fed directly or indirectly through the third feeding path 712 and the fourth feeding path 714. For example, the feeding paths 712 and 714 may be coupled to the second patch antenna 720 by extending up to the third layer 710, and thus may feed directly the second patch antenna 720. As another example, the feeding paths 712 and 714 may not be coupled to the second patch antenna 720 by extending up to a layer (e.g., the first layer) lower than the third layer 710, and may feed indirectly the second patch antenna 720. In an embodiment of the disclosure, the third feeding path 712 and the fourth feeding path 714 may be implemented by penetrating the first patch antenna 431.

In an embodiment of the disclosure, positions where the first ground path 406 and the second ground path 408 are disposed may have effect on a coupling feature of the antenna module 240. In an embodiment of the disclosure, the third point 406-1 at which the first ground path 406 is located and the fourth point 408-1 at which the second ground path 408 is located may be adjacent to the first point 402-1 (e.g., the first point 402-1 of FIG. 4) and the second point 404-1 (e.g., the second point 404-1 of FIG. 4). For example, the first point 402-1 may be located adjacent to a first corner 730, and the third point 406-1 may be located on a virtual line connecting the first corner 730 and the first point 402-1. As another example, the second point 404-1 may be located adjacent to a second corner 740 of the first patch antenna 431, and the fourth point 408-1 may be located on a virtual line connecting the second corner 740 and the second point 404-1. In an embodiment of the disclosure, an angle formed by the virtual line connecting the first point 402-1 and the third point 406-1 and the virtual line connecting the second point 404-1 and the fourth point 408-1 may be an angle specified between about 60° and about 120°.

In an embodiment of the disclosure, the first ground path 406 and the second ground path 408 may be grounded to the ground 440 located in the second layer 420. For example, the ground paths 406 and 408 may penetrate a third number of layers. As another example, the ground paths 406 and 408 may reach a height of at least half of the entire layer of the PCB 310.

In an embodiment of the disclosure, a fifth point 712-1 at which the third feeding path 712 is located and a sixth point 714-1 at which the fourth feeding path 714 is located may be located at one region of the second patch antenna 720. For example, the fifth point 712-1 and the sixth point 714-1 may be located on the same plane as the third point 406-1 and the fourth point 408-1. The fifth point 712-1 and the sixth point 714-1 may be located in a +y direction with respect to a center of the second patch antenna 720, and the third point 406-1 and the fourth point 408-1 may be located in a −y direction with respect to the center of the second patch antenna 720. In an embodiment of the disclosure, the first patch antenna 431 may resonate in a first frequency band, and the second patch antenna 720 may resonate in a second frequency band. A position of the third feeding path 712 which feeds the second patch antenna 720 or a position of the fourth feeding path 714 may be flexible.

Figure 8:
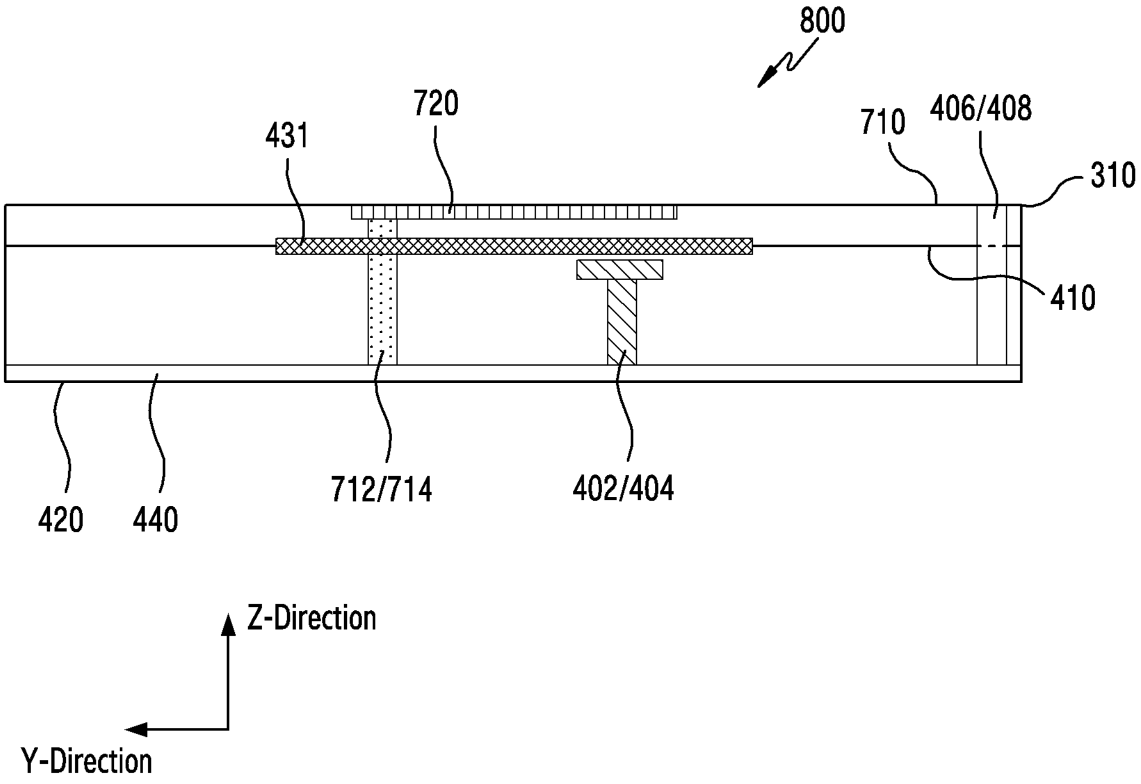
FIG. 8 is a transparent view of a PCB of a dual-band dual-polarization antenna module, viewed from a side face, according to an embodiment of the disclosure.

FIG. 8 is a transparent view 800 of a PCB of a dual-band dual-polarization antenna module, viewed from a side face, according to an embodiment of the disclosure. FIG. 8 may be a transparent view illustrating, in part, the PCB 310, viewed from a side face.

Referring to FIG. 8, the PCB 310 may include the first patch antenna 431 constructed on the first layer 410, the ground 440 constructed on the second layer 420, the second patch antenna 720 constructed on the third layer 710, the first feeding path 402, the fourth feeding path 714, the first ground path 406, and/or the second ground path 408.

In an embodiment of the disclosure, the antenna module 240 may include a communication circuit (not shown) (e.g., the communication circuit 320 of FIG. 4) constructed on one face of the PCB 310. The PCB 310 may include the first feeding path 402, second feeding path 404, third feeding path 712, and/or fourth feeding path 714 electrically coupled to the communication circuit 320.

In an embodiment of the disclosure, the first feeding path 402 and the second feeding path 404 may include a via which penetrates a first number of layers, and may be electrically coupled to the communication circuit 320. For example, the first number may be 4 to 8. The communication circuit 320 may use the feeding paths 402 and 404 to feed the first patch antenna 431. The third feeding path 712 and the fourth feeding path 714 may include a via which penetrates a second number of layers, and may be electrically coupled to the communication circuit 320. For example, the second number may be 6 to 10. The communication circuit 320 may use the feeding paths 712 and 714 to feed the second patch antenna 720. For example, the feeding paths 712 and 714 may be configured to feed the second patch antenna 720 by penetrating the first patch antenna 431, without having to be electrically coupled to the first patch antenna 431.

In an embodiment of the disclosure, the first patch antenna 431 may be spaced apart from the second patch antenna 720, and may be disposed parallel to the second patch antenna 720. The first patch antenna 431 may be disposed closer to the ground 440 than the second patch antenna 720. The electronic device 101 may include a dielectric layer or a non-dielectric layer between the first patch antenna 431 and the second patch antenna 720, or a cavity for impedance matching.

Figure 9A:
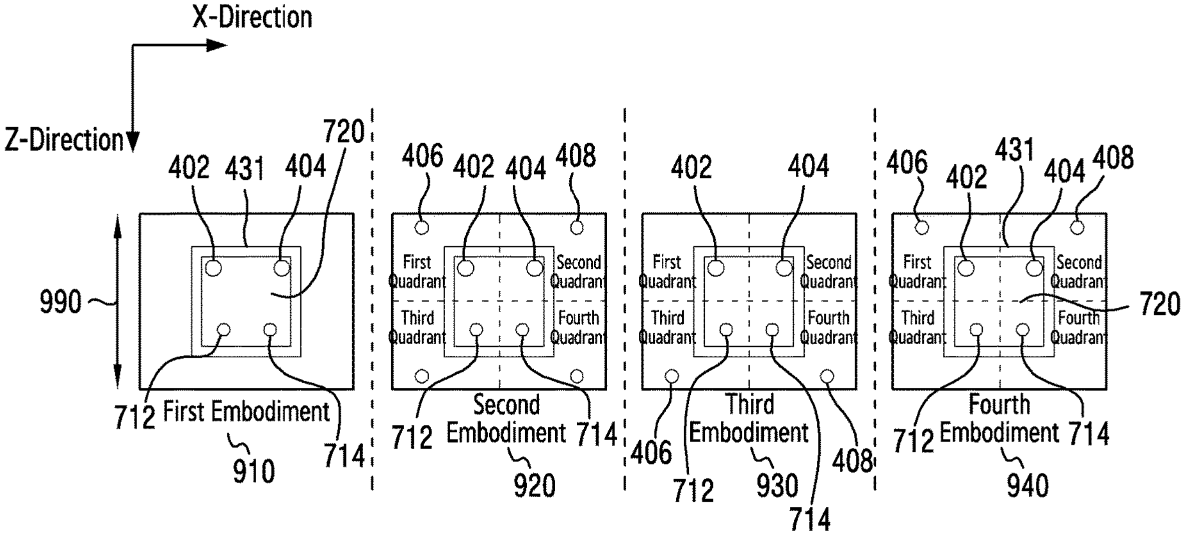
FIG. 9A illustrates, in part, a PCB of a dual-band dual-polarization antenna module according to an embodiment of the disclosure.

FIG. 9A illustrates, in part, a PCB of a dual-band dual-polarization antenna module according to an embodiment of the disclosure. FIGS. 9B to 9E are graphs illustrating efficiency of an antenna module according to a deployment of a ground paths according to various embodiments of the disclosure.

Referring to FIGS. 9B to 9E, a graph illustrating a return loss of the antenna module 240 according to a first embodiment 910, a second embodiment 920, a third embodiment 930, and a fourth embodiment 940 and a graph illustrating a mutual coupling feature of the antenna module 240 according to the first embodiment 910, the second embodiment 920, the third embodiment 930, and the fourth embodiment 940 are illustrated. The PCB is illustrated in part in the embodiments 910, 920, 930, and 940 illustrated in FIG. 9A.

According to various embodiments of the disclosure, the PCB 310 according to the first embodiment 910 may not have a ground path (e.g., the first ground path 406 or second ground path 408 of FIG. 8) disposed around the first patch antenna 431 and the second patch antenna 720.

The PCB 310 according to the second embodiment 920 may include four ground paths disposed to a first quadrant, a second quadrant, a third quadrant, or a fourth quadrant.

The PCB 310 according to the third embodiment 930 may include the first ground path 406 disposed to the third quadrant or the second ground path 408 disposed to the fourth quadrant.

The PCB 310 according to the fourth embodiment 940 may include the first ground path 406 disposed to the first quadrant or the second ground path 408 disposed to the second quadrant.

In the first to fourth embodiments 910, 920, 930, and 940, the first feeding path 402 may be disposed to the first quadrant, and the second feeding path 404 may be disposed to the second quadrant.

Figure 9B:
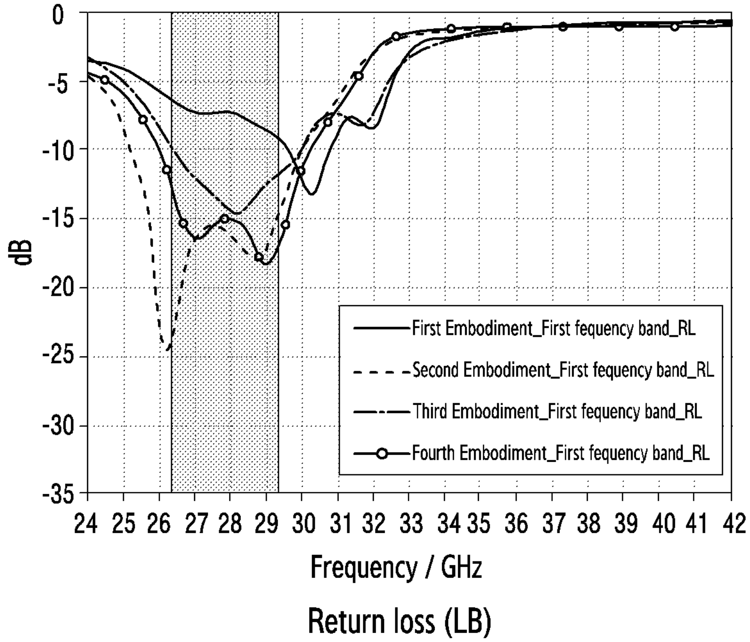
FIG. 9B illustrates a graph illustrating performance of a dual-band dual-polarization antenna module according to an embodiment of the disclosure.

Referring to FIG. 9B, it shows that a return loss feature of the second embodiment 920 and the fourth embodiment 940 is excellent at a first targeting band (e.g., about 26.5 GHz to about 29.5 GHz) of the first patch antenna 431.

Figure 9C:
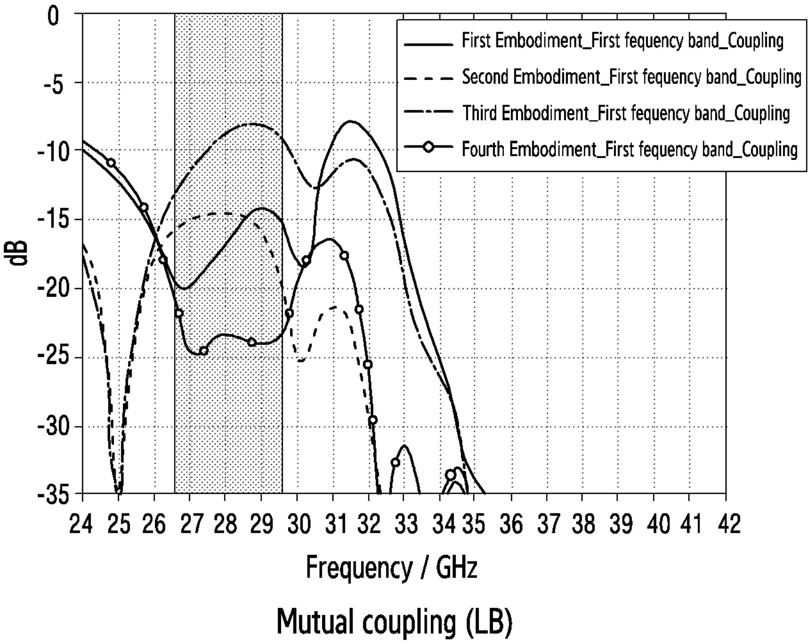
FIG. 9C is a graph illustrating performance of a dual-band dual-polarization antenna module according to an embodiment of the disclosure.

Referring to FIG. 9C, it shows that a coupling feature of the fourth embodiment 940 is relatively excellent at the first targeting band (e.g., about 26.5 GHz to about 29.5 GHz) of the first patch antenna 431. The PCB 310 may have less effect on the second feeding path 404, when a first polarized signal is transmitted and/or received through the first feeding path 402. This may also be substantially equally applied to the opposite case.

Figure 9D:
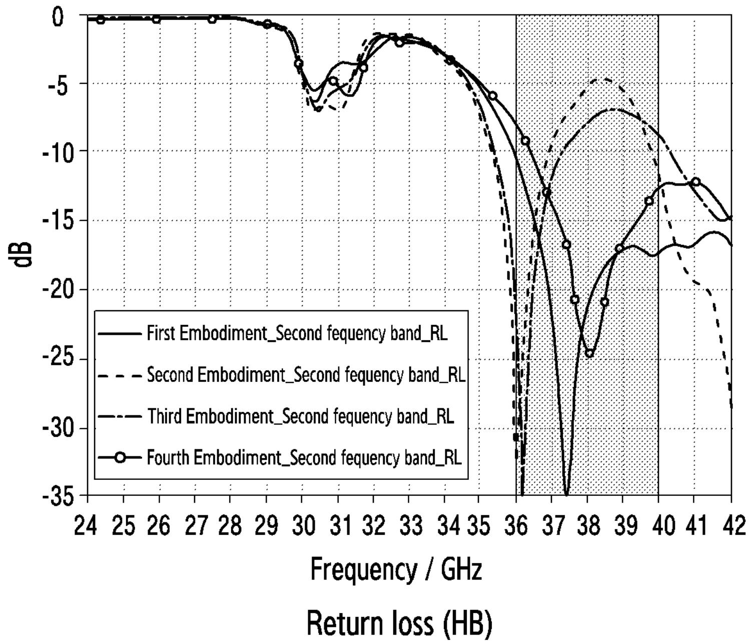
FIG. 9D is a graph illustrating performance of a dual-band dual-polarization antenna module according to an embodiment of the disclosure.

Referring to FIG. 9D, it shows that a return loss feature of the fourth embodiment 940 is excellent at a second targeting band (e.g., about 36 GHz to about 40 GHz) of the second patch antenna 720.

Figure 9E:
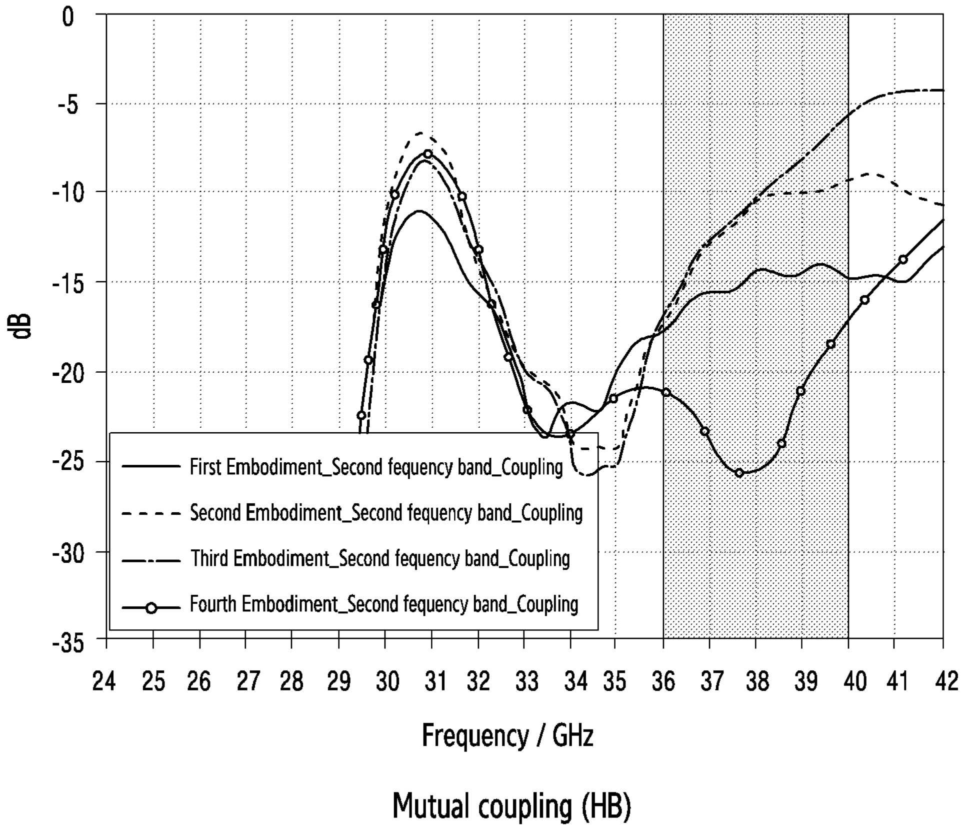
FIG. 9E is a graph illustrating efficiency of an antenna module according to an embodiment of the disclosure.

Referring to FIG. 9E, it shows that a coupling feature of the fourth embodiment 940 is excellent at the second targeting band (e.g., about 36 GHz to about 40 GHz) of the second patch antenna 720. The antenna module 240 may have less effect on the fourth feeding path 714, when a third polarized signal is transmitted and/or received through the third feeding path 712. The same may also be substantially equally applied to the opposite case.

In an embodiment of the disclosure, in order to improve the coupling feature of the dual-polarization antenna, the antenna module 240 of the electronic device 101 may be implemented as in the fourth embodiment 940 in which the coupling feature is relatively good at the second targeting band.

Figure 10A:
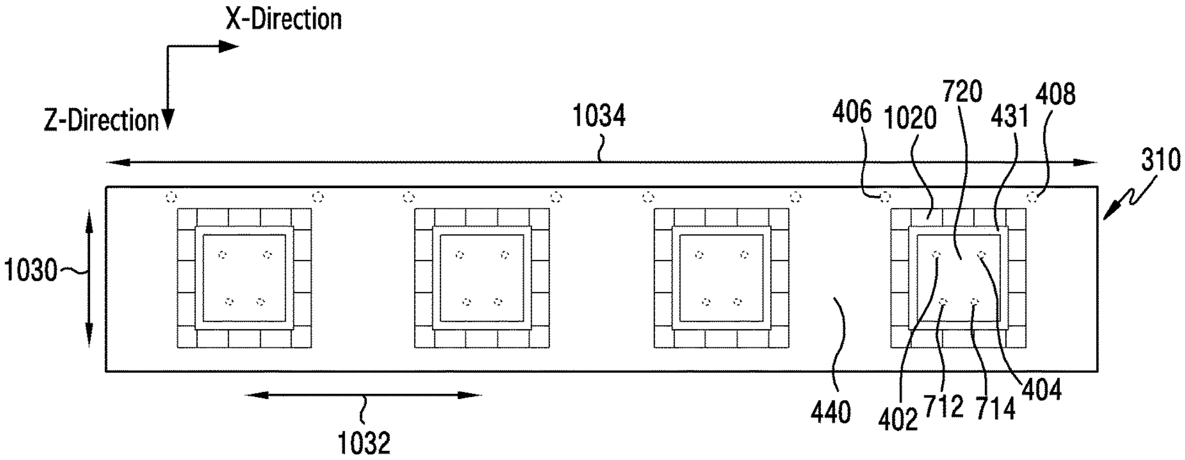
FIG. 10A illustrates a PCB of an antenna module according to an embodiment of the disclosure.
Figure 10C:
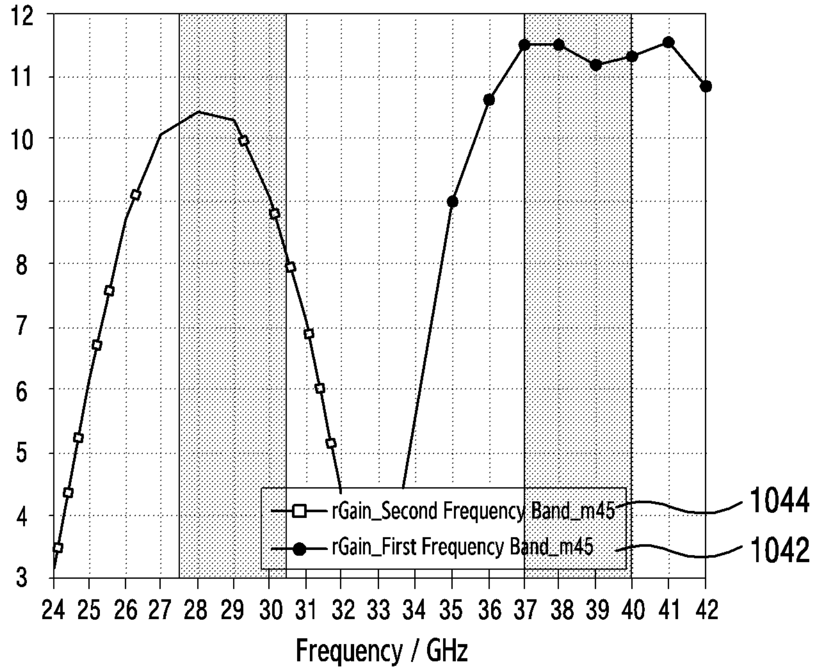
FIG. 10C is a graph illustrating performance of an antenna module according to an embodiment of the disclosure.
Figure 10D:
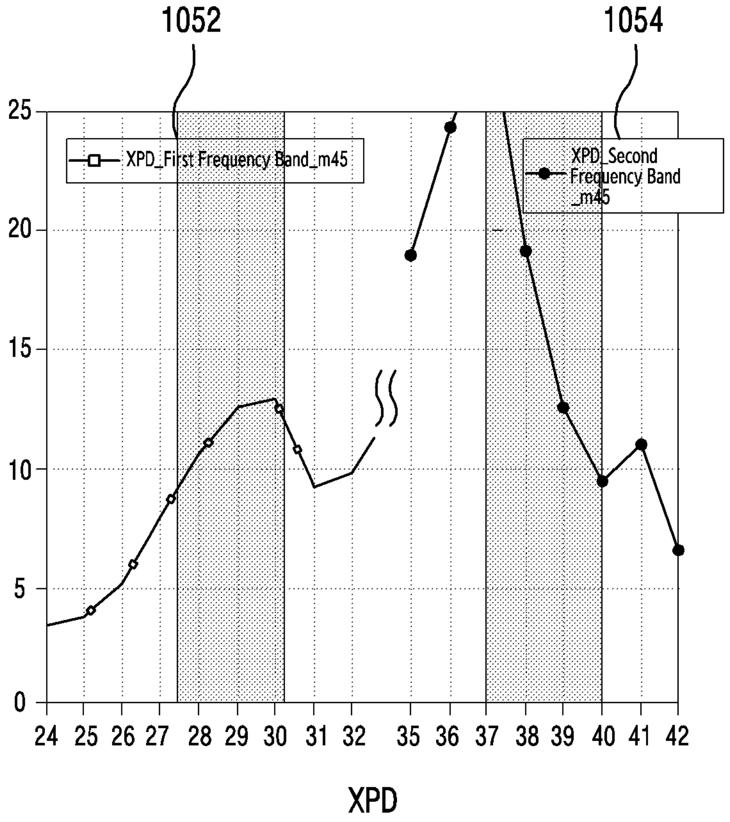
FIG. 10D is a graph illustrating performance of an antenna module according to an embodiment of the disclosure.

FIG. 10A illustrates a PCB of an antenna module according to an embodiment of the disclosure. FIG. 10B illustrates a configuration for each layer of a PCB according to an embodiment of the disclosure. FIG. 10C illustrates performance of an antenna module according to an embodiment of the disclosure. FIG. 10D illustrates performance of an antenna module according to an embodiment of the disclosure.

Referring to FIG. 10A, the PCB 310 may include the first patch antenna 431, the second patch antenna 720, the first feeding path 402, the second feeding path 404, the ground 440, or a periodic structure 1020. For example, the periodic structure 1020 may widen a valid bandwidth of the antenna module 240 including the PCB 310.

In an embodiment of the disclosure, an overall shape of the periodic structure 1020 may be implemented as a shape surrounding the first patch antenna 431 or the second patch antenna 720. The periodic structure 1020 may include at least one element. For example, the periodic structure 1020 may include 16 elements, and may surround the second patch antenna 720. In an embodiment of the disclosure, the element may be a conductive pattern. As another example, the number of elements included in the periodic structure 1020 may be various.

In an embodiment of the disclosure, referring to FIG. 10B, a PCB (e.g., the PCB 310 of FIG. 4) may include a plurality of layers (e.g., 14 layers).

In an embodiment of the disclosure, the periodic structure 1020 may be disposed to a layer 1. In another example, the periodic structure 1020 may be disposed parallel to the same layer (e.g., a layer 2) as a second frequency band patch antenna (e.g., the second patch antenna 720). FIG. 10B illustrates only an embodiment of the disclosure, and the second patch antenna 720 may be disposed to a layer lower or higher than the periodic structure 1020.

In an embodiment of the disclosure, the ground 440 may be disposed to a layer 9 and a layer 11. A logic circuit may be constructed on a layer 12 to a layer 14. A feeding line and a filter may be disposed to a layer 10.

In an embodiment of the disclosure, a second frequency band patch (e.g., the second patch antenna 720 of FIG. 7) may be directly or indirectly fed through feeding paths (e.g., the third feeding path 712 and the fourth feeding path 714 of FIG. 7) for the second frequency band. For example, the feeding paths (e.g., the third feeding path 712 and the fourth feeding path 714 of FIG. 7) may be constructed from the layer 12 to the layer 3, and the second frequency band path (e.g., the second patch antenna 720 of FIG. 7) disposed to the layer 2 may be fed through the feeding paths (e.g., the third feeding path 712 and the fourth feeding path 714 of FIG. 7).

In an embodiment of the disclosure, a first frequency band patch (e.g., the first patch antenna 431 of FIG. 7) may be directly or indirectly fed through feeding paths (e.g., the third feeding path 712 and second feeding path 404 of FIG. 7) for the first frequency band. For example, the feeding paths (e.g., the first feeding path 402 and the second feeding path 404 of FIG. 7) may be constructed from the layer 12 to the layer 6, and the first frequency band path (e.g., the first patch antenna 431 of FIG. 7) disposed to the layer 5 may be fed through the feeding paths (e.g., the first feeding path 402 and the second feeding path 404 of FIG. 7).

In an embodiment of the disclosure, a core layer may be included between the layer 7 and the layer 8. The feeding path (e.g., the first feeding path 402 and second feeding path 404 of FIG. 7) and the ground path (e.g., the first ground path 406 and second ground path 408 of FIG. 7) may be implemented as a cascading path rather than a linear path due to the core layer.

In an embodiment of the disclosure, a width 1030 of the ground 440 may be about 3.5 mm, and a length 1034 of the ground 440 may be about 23.8 mm A center-to-center distance 1032 of patch antennas disposed side by side to the PCB 310 may be about 5.7 mm. The aforementioned numerical value represents only a numerical value for an embodiment of the disclosure, and it may be less or greater than the aforementioned numerical value.

In an embodiment of the disclosure, the first patch antenna 431 and the second patch antenna 720 may have the same center. For example, when viewed from above the second patch antenna 720, the center of the second patch antenna 720 and the center of the first patch antenna 431 may overlap.

In an embodiment of the disclosure, FIG. 10C illustrates a realized gain. 1042 may represent the realized gain when receiving a first polarized signal of the first patch antenna 431, and 1044 may represent the realized gain when receiving a third polarized signal of the second patch antenna 720. For example, the first polarized signal may include −45° polarization, and the third polarized signal may include −45° polarization.

In an embodiment of the disclosure, FIG. 10D illustrates a cross polarization discrimination. 1052 may represent the cross polarization discrimination when receiving the first polarized signal of the first patch antenna 431, and 1054 may represent the cross polarization discrimination when receiving the third polarized signal of the second patch antenna 720.

An embodiment illustrated in FIG. 10A includes an antenna array including the first patch antenna 431 and an antenna array including the second patch antenna 720, but there may be an embodiment in which the antenna array including the second patch antenna 720 is omitted.

Figure 11A:
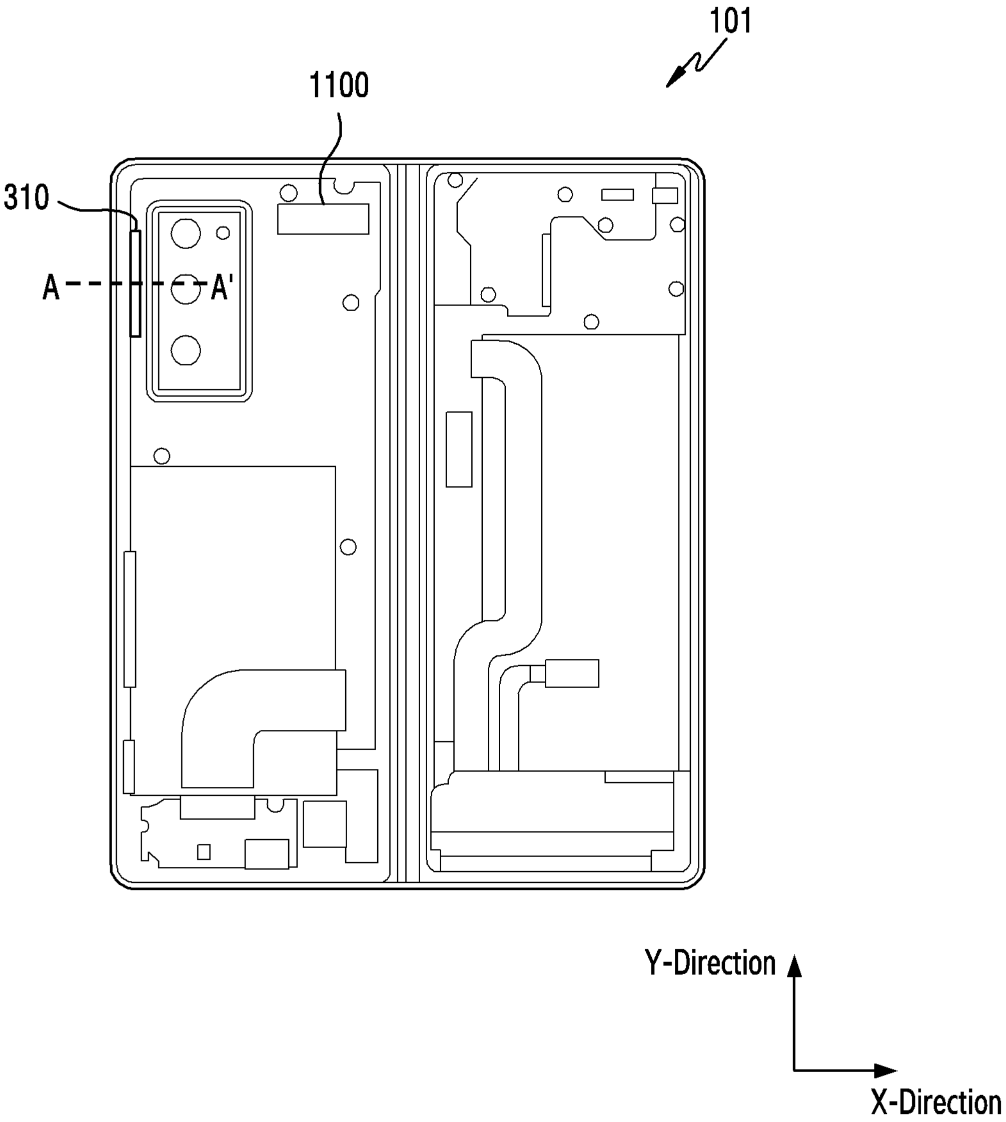
FIG. 11A is a cross-sectional view of an electronic device, viewed from a side face, according to an embodiment of the disclosure.
Figure 11B:
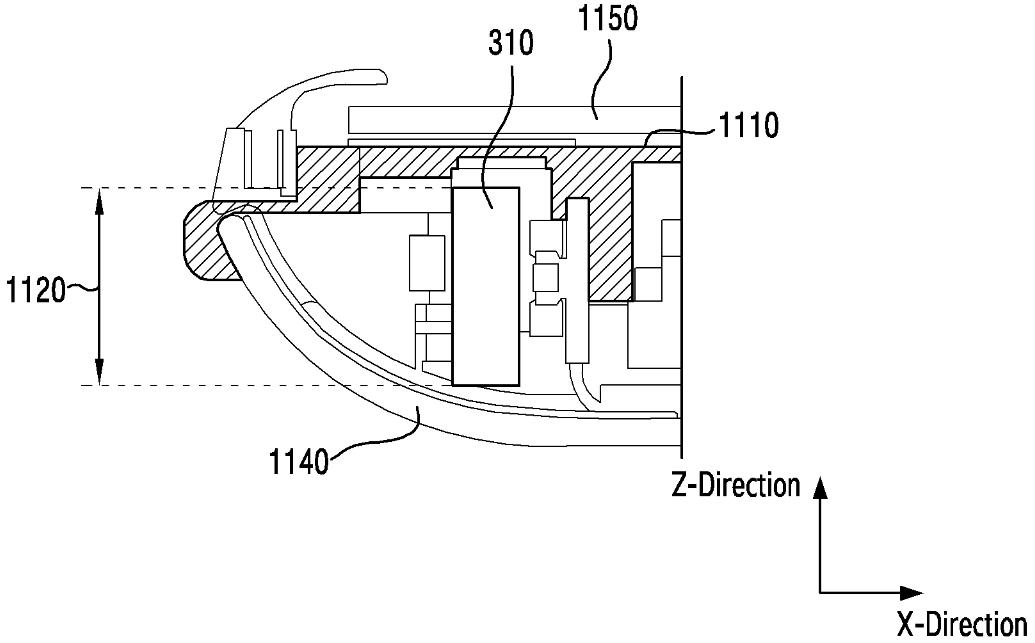
FIG. 11B is a cross-sectional view of an electronic device, viewed from a side face, according to an embodiment of the disclosure.
Figure 11C:
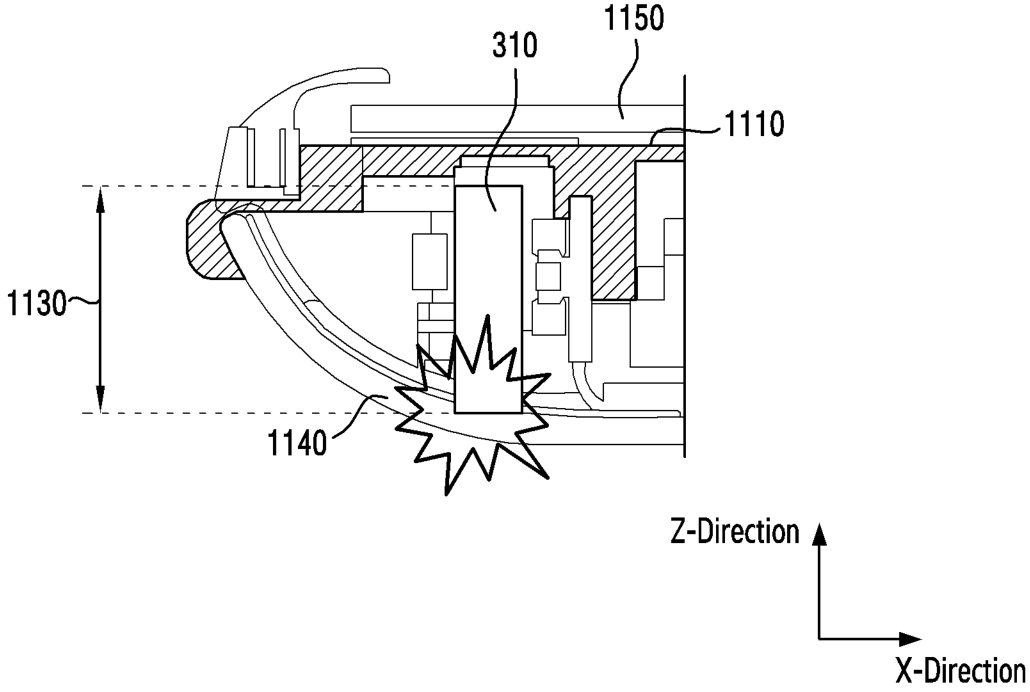
FIG. 11C is a cross-sectional view of an electronic device, viewed from a side face, according to an embodiment of the disclosure.

FIGS. 11A to 11C are cross-sectional views of an electronic device, viewed from a side face, according to various embodiments of the disclosure. FIGS. 11B and 11C may illustrate cross-sections of an electronic device, cut in a direction A-A', according to various embodiments of the disclosure.

Referring to FIG. 11A, the electronic device 101 may include the PCB 310 located adjacent to a side member (e.g., the side member 350 of FIG. 3) of the electronic device 101. For example, the PCB 310 may be disposed inside a housing adjacent to a side face (e.g., the second side face 350-2 or third side face 350-3 of FIG. 3). The PCB 310 may be disposed to a side face of the electronic device 101 to transmit and/or receive a radio signal in a −x direction.

In an embodiment of the disclosure, a PCB 1100 may be disposed adjacent to a side face located on a +y axis of the electronic device 101, and may be disposed close to an opposite face (e.g., a rear face) of a face where a display is disposed. For example, the PCB 1100 may be disposed to transmit and/or receive a radio signal in a rear direction of the electronic device 101. Various embodiments of the PCB 310 described in various embodiments of the specification may be equally or similarly applied to the PCB 1100.

Referring to FIGS. 11B and 11C, a rear case 1140 may be disposed to a rear face of the electronic device 101, and may construct at least part of a side face. For example, the rear case 1140 may include a non-conductive material, such as plastic. A support member 1110 including a conductive member may be disposed between a front display 1150 and the rear case 1140. The support member 1110 may construct at least part of the side face of the electronic device 101, and may support various components included in the electronic device 101.

Referring to FIG. 11B, in an embodiment of the disclosure, when a width 1120 of the PCB 310 is about 3.5 mm, it may be disposed without being in touch with a housing (e.g., the housing 380 of FIG. 3) of the electronic device 101. For example, an overall size (e.g., thickness) of the electronic device 101 may be reduced based on the width 1120 when the width 1120 is about 3.5 mm.

Referring to FIG. 11C, in an embodiment of the disclosure, when a width 1130 of the PCB 310 is about 4.2 mm, it may be in touch with a housing (e.g., the housing 380 of FIG. 3) of the electronic device 101. For example, an overall size (e.g., thickness) of the electronic device 101 may be reduced based on the width 1130 when the width 1130 is about 4.2 mm.

In an embodiment of the disclosure, the support member 1110 of the electronic device 101 may include a conductive material, and at least part of the conductive material may construct at least part of a side face of the electronic device 101.

In an embodiment of the disclosure, a positional relationship between the support member 1110 and ground paths included in the PCB 310 may have effect on performance of the antenna module 240 including the PCB 310. Hereinafter, performance of the antenna module 240 according to positions of the ground paths and the support member 1110 is illustrated.

Figure 12A:
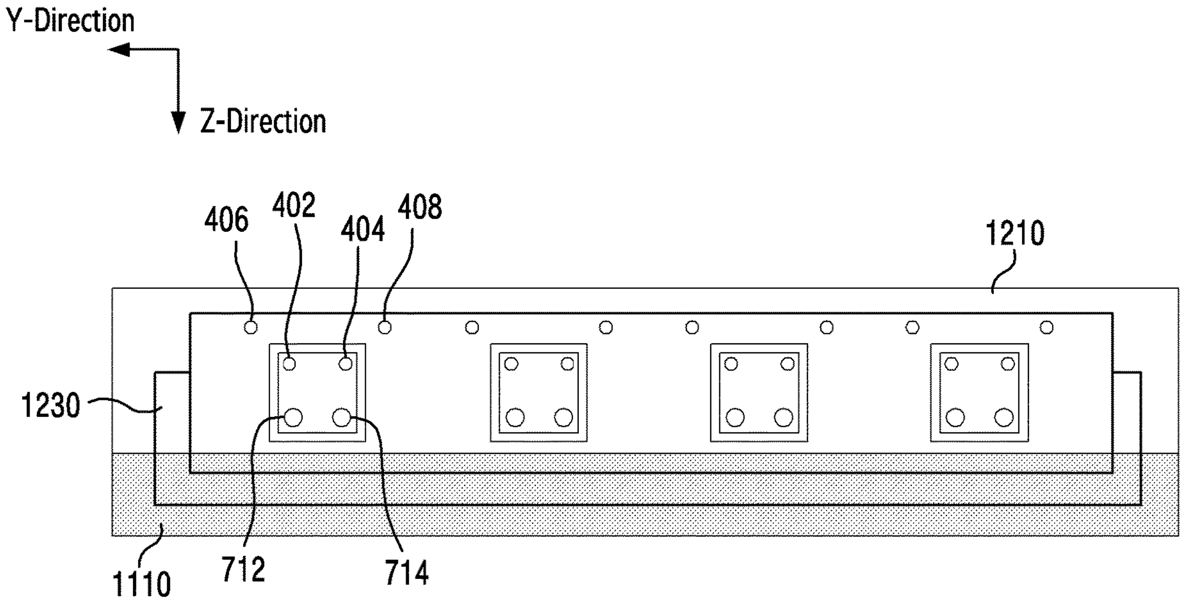
FIG. 12A illustrates a PCB and a frame, viewed from a side face of an electronic device, according to an embodiment of the disclosure.
Figure 12B:
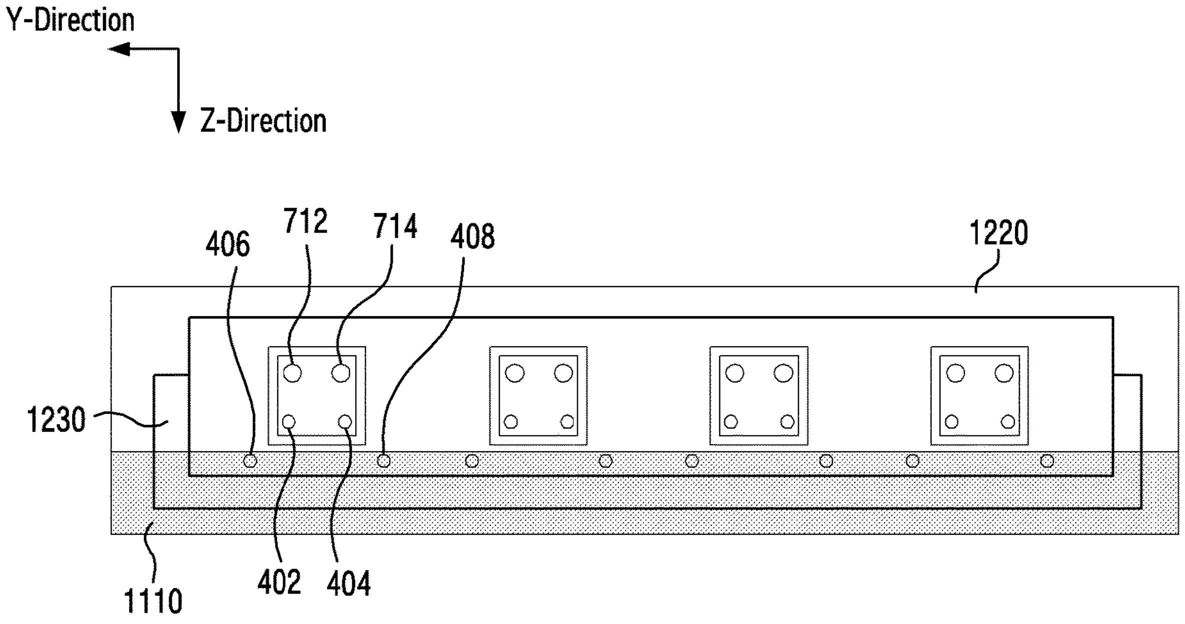
FIG. 12B illustrates a PCB and a frame, viewed from a side face of an electronic device, according to an embodiment of the disclosure.
Figure 12C:
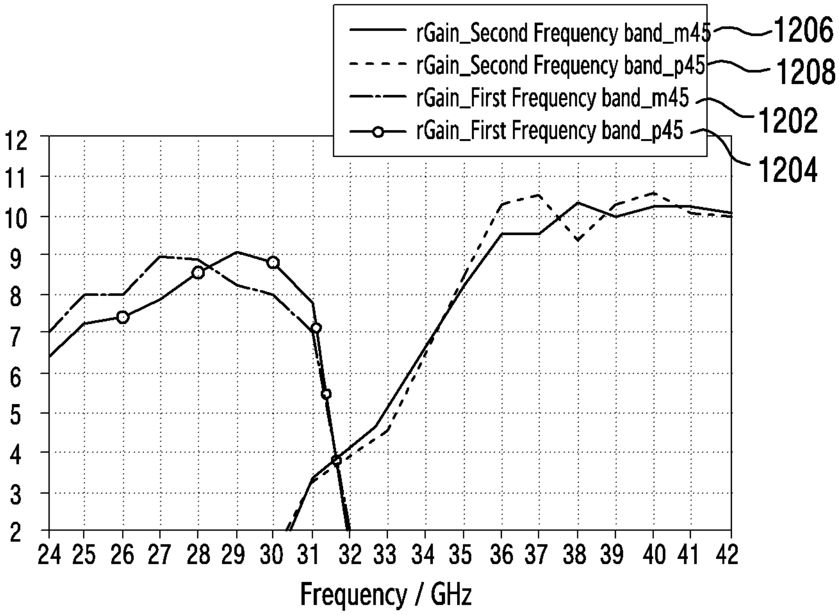
FIG. 12C is a graph illustrating performance of an antenna module according to an embodiment of the disclosure.
Figure 12D:
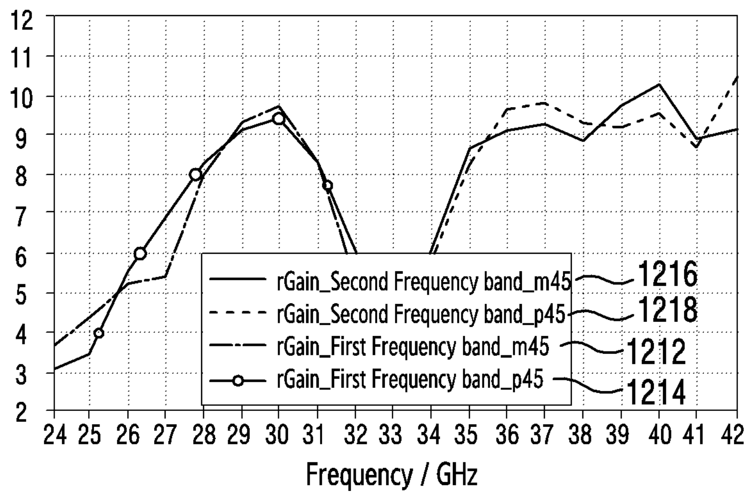
FIG. 12D is a graph illustrating performance of an antenna module according to an embodiment of the disclosure.

FIGS. 12A and 12B illustrate a PCB and a frame, viewed from a side face of an electronic device, according to various embodiments of the disclosure. FIG. 12C is a graph illustrating performance of an antenna module according to an embodiment of the disclosure. FIG. 12D is a graph illustrating performance of an antenna module according to an embodiment of the disclosure.

Referring to FIG. 12A, the first ground path 406 may be disposed in quadrants of +y and −z directions with respect to the first feeding path 402. The second ground path 408 may be disposed in quadrants of −y and −z directions with respect to the second feed path 404. In an embodiment 1210, the first grounding path 406 and the second grounding path 408 may be disposed spaced apart in the −z direction from the support member 1110 and/or a metal support member (e.g., a metal bracket) 1230.

Referring to FIG. 12B, the first ground path 406 may be disposed in quadrants of +y and +z directions with respect to the first feeding path 402. The second ground path 408 may be disposed in quadrants of −y and +z directions with respect to the second feed path 404. The first ground path 406 and the second ground path 408 may be disposed to overlap the support member 1110 and/or the metal support member 1230 when viewed from above the first patch antenna 431 as shown in FIG. 12B.

Referring to FIG. 12C, a graph according to an embodiment 1210 may represent a realized gain 1202 when receiving a first polarized signal of the first patch antenna 431, a realized gain 1204 when receiving a second polarized signal of the first patch antenna 431, a realized gain 1206 when receiving a third polarized signal of the second patch antenna 720, and a realized gain 1208 when receiving a fourth polarized signal of the second patch antenna 720. For example, the first polarized signal may include −45° polarization, the second polarized signal may include+45° polarization, the third polarized signal may include −45° polarization, and the fourth polarized signal may include+45° polarization. This may also be substantially equally applied to the embodiment 1220.

Referring to FIG. 12D, a graph according to an embodiment 1220 may represent a realized gain 1212 when receiving a first polarized signal of the first patch antenna 431, a realized gain 1214 when receiving a second polarized signal of the first patch antenna 431, a realized gain 1216 when receiving a third polarized signal of the second patch antenna 720, and a realized gain 1218 when receiving a fourth polarized signal of the second patch antenna 720.

Comparing FIGS. 12C and 12D, it shows that, at a first targeting band (e.g., about 26.5 GHz to about 29.5 GHz), the realized gain of the embodiment 1210 is higher than the realized gain of the embodiment 1220. It also shows that, at a second targeting band (e.g., about 36 GHz to about 40 GHz), the realized gain of the embodiment 1210 is higher than the realized gain of the embodiment 1220.

According to an embodiment of the disclosure, when the first ground path 406 and the second ground path 408 are disposed adjacent to the first feeding path 402 and the second feeding path 404, and when the first ground path 406 and the second ground path 408 are disposed as far apart as possible from the third feeding path 712, the fourth feeding path 714, the support member 1110, and/or the metal support member 1230, a realized gain of an antenna for the first polarized signal to the fourth polarized signal may be high.

Figure 13:
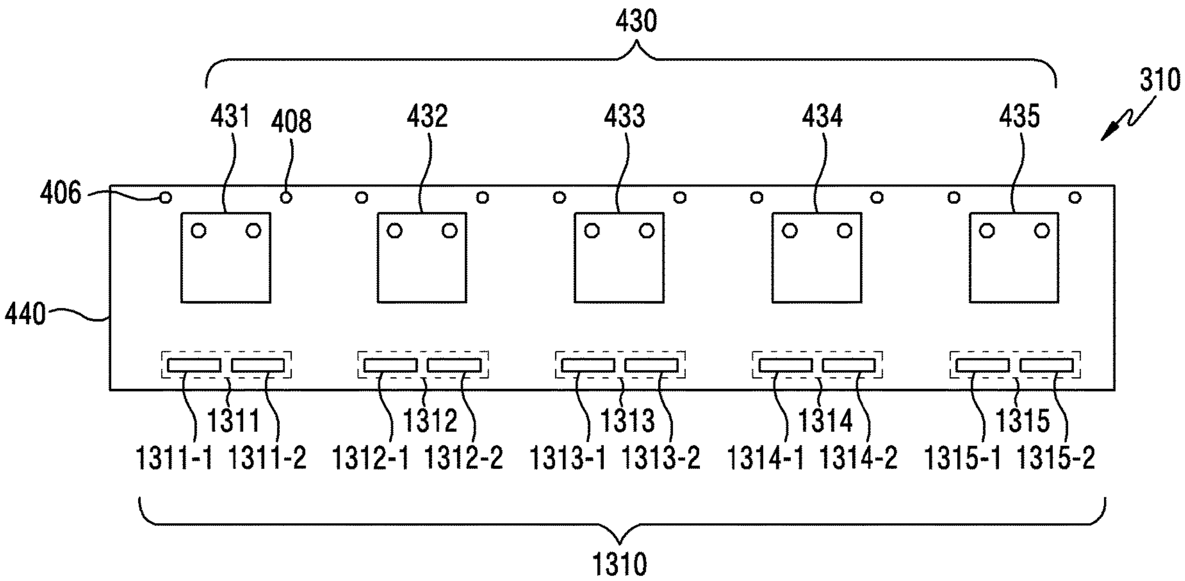
FIG. 13 illustrates a PCB including a dipole antenna in an electronic device according to an embodiment of the disclosure.

FIG. 13 illustrates a PCB including a patch antenna and a dipole antenna in an electronic device according to an embodiment of the disclosure.

Referring to FIG. 13, according to an embodiment of the disclosure, the PCB 310 may include the patch antenna array 430 or a dipole antenna array 1310. For example, the dipole antenna array 1310 may include a plurality of dipole antennas 1311, 1312, 1313, 1314, and 1315, and the plurality of dipole antennas 1311, 1312, 1313, 1314, and 1315 may be disposed in a pattern of a 1×k array pattern (e.g., 1×4 array or 1×5 array) at positions corresponding to the plurality of patch antennas 431, 432, 433, 434, and 435. Although a case where the plurality of dipole antennas have the 1×4 array or the 1×5 array is exemplified in FIG. 13, the plurality of dipole antennas may be disposed in various forms in addition thereto. Although a case where the plurality of patch antennas have the 1×4 array or the 1×5 array is exemplified in FIG. 13, the plurality of patch antennas may be disposed in various forms in addition thereto.

According to an embodiment of the disclosure, the dipole antenna may have (+) and (−) polarities. For example, antenna elements 1311-1, 1312-1, 1313-1, 1314-1, and 1315-1 may have the (+) polarity and antenna elements 1311-2, 1312-2, 1313-2, 1314-2, and 1315-2 may have the (−) polarity. The (+) polarity may be a feeding path for electrically coupling the plurality of dipole antennas 1311, 1312, 1313, 1314, and 1315. The plurality of dipole antennas 1311, 1312, 1313, 1314 and 1315 may be coupled to the ground 440 and a communication circuit (e.g., the communication circuit 320 of FIG. 3). The feeding path may include a connection point which couples the plurality of dipole antennas 1311, 1312, 1313, 1314, and 1315 and the communication circuit 320.

According to an embodiment of the disclosure, the dipole antenna array 1310 may be an antenna array for a direction perpendicular to a direction in which the patch antenna array 430 performs transmission and/or reception. For example, the electronic device 101 may transmit and/or receive a radio signal to a side face of the electronic device 101 through the patch antenna array 430, and may transmit and/or receive a radio signal in a front or rear direction of the electronic device through the dipole antenna array 1310.

According to an embodiment of the disclosure, a fill-cut region may be present between the patch antenna array 430 and the dipole antenna array 1310.

Figure 14A:
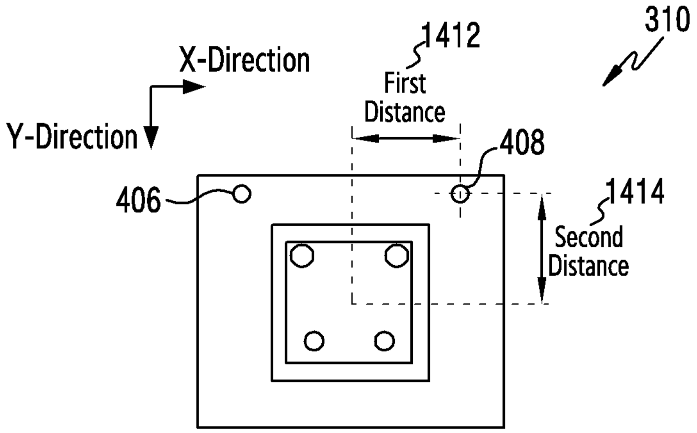
FIG. 14A illustrates a PCB, viewed from above according to an embodiment of the disclosure.
Figure 14B:
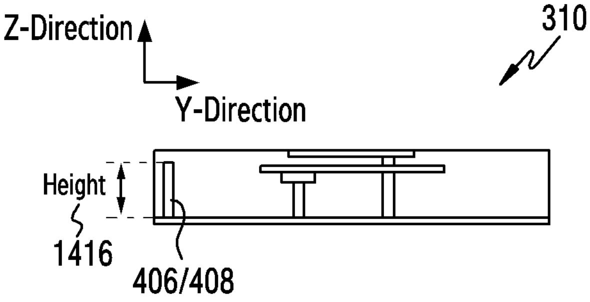
FIG. 14B is a transparent view of a PCB, viewed from a side face, according to an embodiment of the disclosure.
Figure 14C:
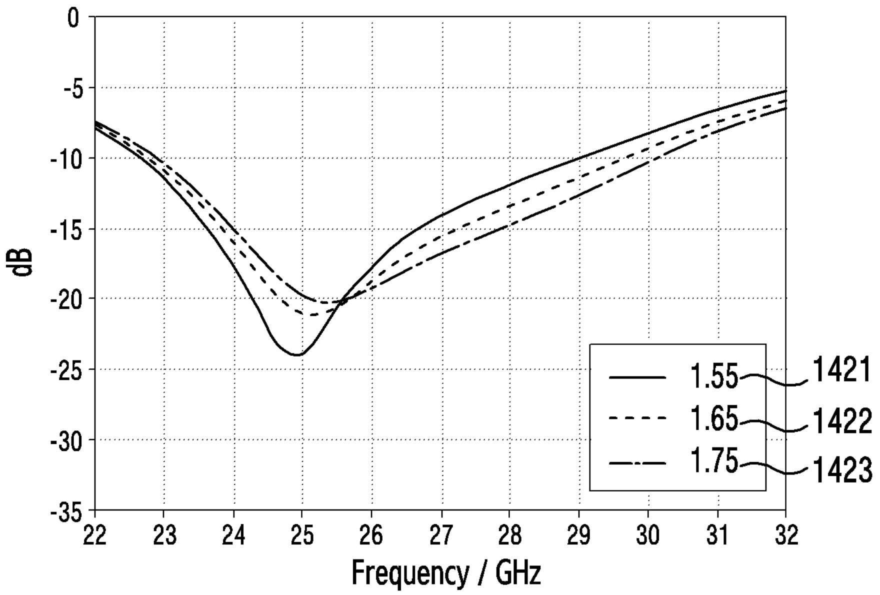
FIG. 14C illustrates antenna performance depending on a distance between a patch antenna and a ground path in a PCB according to an embodiment of the disclosure.
Figure 14D:
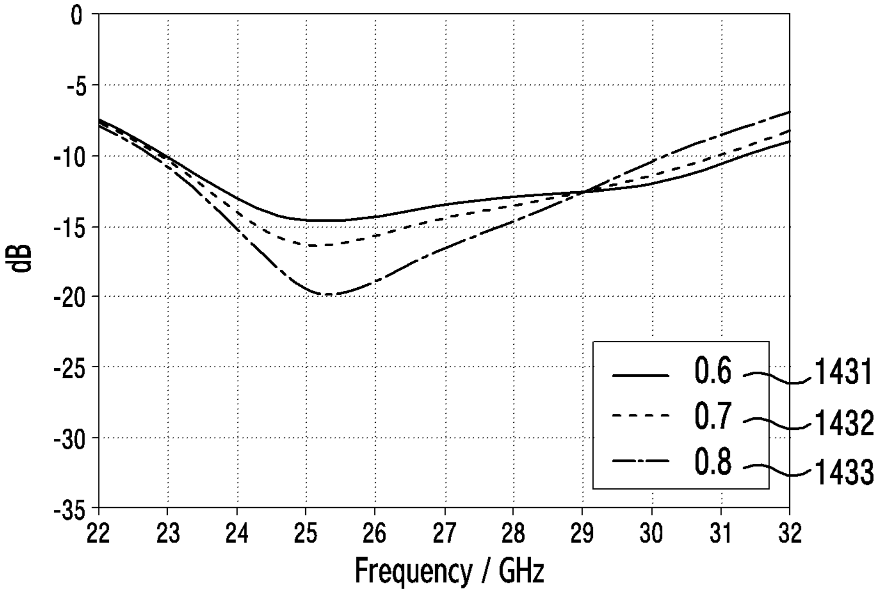
FIG. 14D illustrates antenna performance depending on a height of a ground path in a PCB according to an embodiment of the disclosure.
Figure 14E:
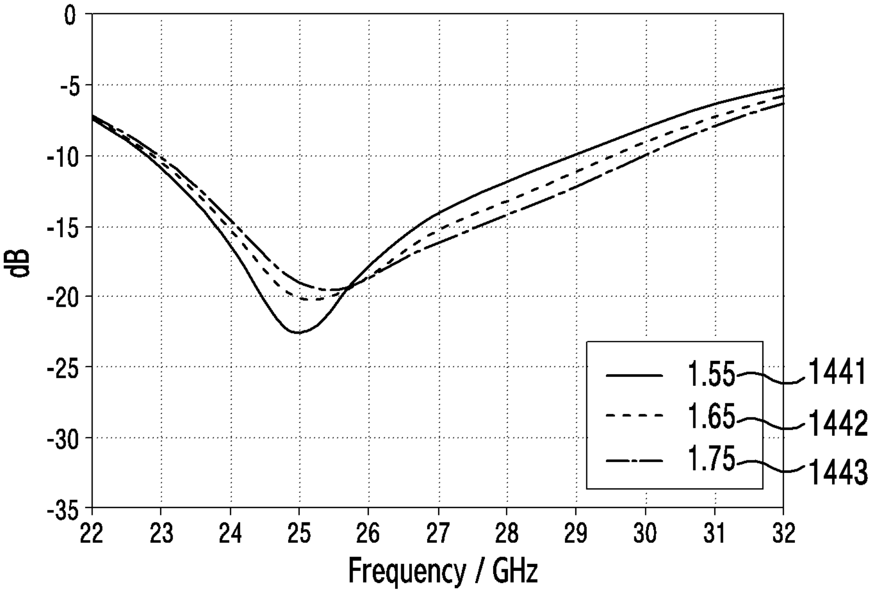
FIG. 14E illustrates antenna performance depending on a distance between a patch antenna and a ground path in a PCB according to an embodiment of the disclosure.

FIG. 14A illustrates a PCB, viewed from above, according to an embodiment of the disclosure. FIG. 14B is a transparent view of a PCB, viewed from a side face, according to an embodiment of the disclosure. FIG. 14C illustrates antenna performance depending on a distance between a patch antenna and a ground path in a PCB according to an embodiment of the disclosure. FIG. 14D illustrates antenna performance depending on a height of a ground path in a PCB according to an embodiment of the disclosure. FIG. 14E illustrates antenna performance depending on a distance between a patch antenna and a ground path in a PCB according to an embodiment of the disclosure.

FIGS. 14C and 14D may illustrate antenna performance depending on a distance in directions of a +x axis and a −y axis from a center of the first patch antenna 431 of the ground paths 406 and 408. FIG. 14D may illustrate antenna performance depending on a height of the ground paths 406 and 408.

Referring to FIGS. 14A and 14B, the distance may be represented by a first distance 1412 and a second distance 1414. The first distance 1412 may represent a linear distance in the x-axis direction of the first ground path 406 or the second ground path 408 from the center of the first patch antenna 431. The second distance 1414 may represent a linear distance in the y-axis direction of the first ground path 406 or the second ground path 408 from the center of the first patch antenna 431.

Referring to FIG. 14C, it shows that a return loss feature of the feeding paths 402 and 404 varies depending on the first distance 1412 at a first targeting band (e.g., about 26.5 GHz to about 29.5 GHz). It shows that a case 1422 where the first distance 1412 is about 1.65 mm has a better return loss feature of the first feeding path 402 and second feeding path 404 than a case 1421 where the first distance 1412 is about 1.55 mm. It shows that a case 1423 where the first distance 1412 is about 1.75 mm has a better return loss feature of the first feeding path 402 and second feeding path 404 than the case 1422 where the first distance 1412 is about 1.65 mm. For example, an increase in the first distance 1412 to up to a specific level (e.g., 1.75 mm) may result in improvement of an impedance matching feature and an increase in a bandwidth.

Referring to FIG. 14D, it shows that a return loss feature of the feeding paths 402 and 404 varies depending on a height 1416 of the ground paths 406 and 408 at the first targeting band (e.g., about 26.5 GHz to about 29.5 GHz). For example, the height may be a length of a ground path from the ground 440. It shows that a case 1432 where the height 1416 is about 0.7 mm has a better return loss feature of the first feeding path 402 and second feeding path 404 than a case 1431 where the height 1416 is about 0.6 mm. It shows that a case 1433 where the height 1416 is about 0.8 mm has a better return loss feature of the first feeding path 402 and second feeding path 404 than the case 1432 where the height 1416 is about 0.7 mm. For example, an increase in the height 1416 to up to a specific level (e.g., 0.8 mm) may result in improvement of an impedance matching feature and an increase in a bandwidth at the first targeting band (e.g., about 26.5 GHz to about 29.5 GHz).

Referring to FIG. 14E, it shows that a return loss feature of the feeding paths 402 and 404 varies depending on the second distance 1414 at the first targeting band (e.g., about 26.5 GHz to about 29.5 GHz). It shows that a case 1442 where the second distance 1414 is about 1.65 mm has a better return loss feature of the first feeding path 402 and second feeding path 404 than a case 1441 where the second distance 1414 is about 1.55 mm. It shows that a case 1443 where the second distance 1414 is about 1.75 mm has a better return loss feature of the first feeding path 402 and second feeding path 404 than the case 1442 where the second distance 1414 is about 1.65 mm. For example, an increase in the second distance 1414 to up to a specific level (e.g., 1.75 mm) may result in improvement of an impedance matching feature and an increase in a bandwidth.

Figure 15A:
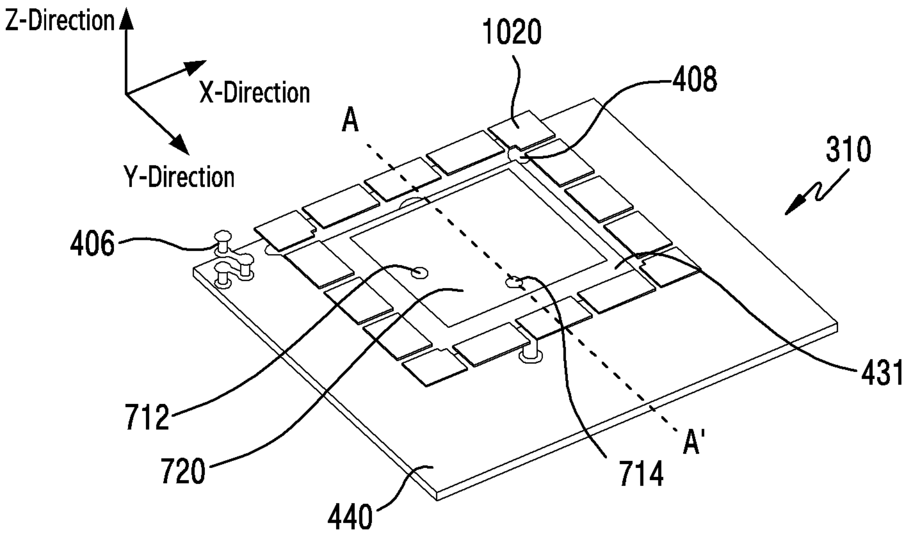
FIG. 15A illustrates a PCB of an antenna module according to an embodiment of the disclosure.
Figure 15B:
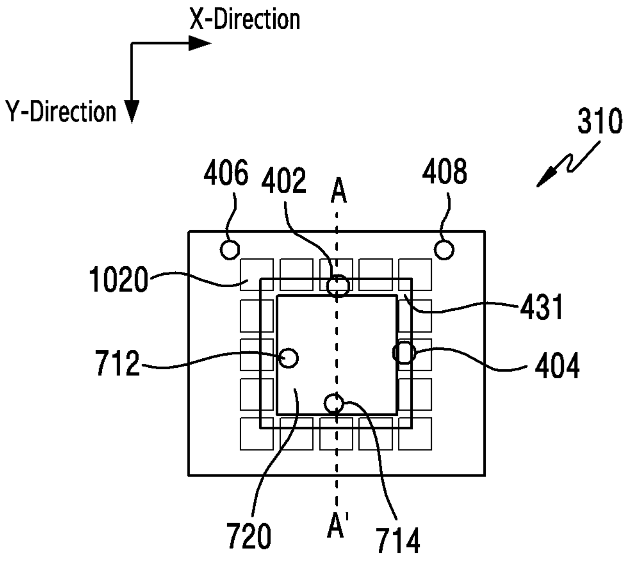
FIG. 15B is a transparent view of a PCB, viewed from above according to an embodiment of the disclosure.
Figure 15C:
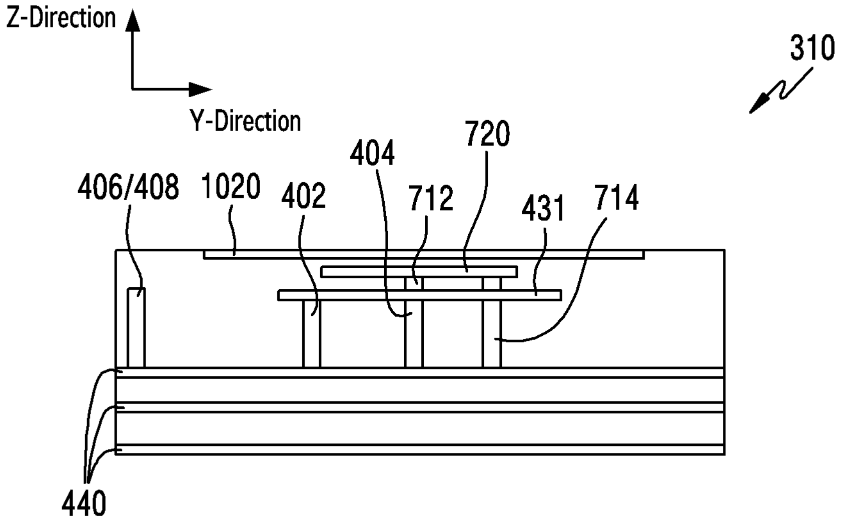
FIG. 15C is a transparent view of a PCB, viewed from a side face according to an embodiment of the disclosure.

FIG. 15A illustrates a PCB of an antenna module according to an embodiment of the disclosure. FIG. 15B is a transparent view of a PCB, viewed from above, according to an embodiment of the disclosure. FIG. 15C is a transparent view of a PCB, viewed from a side face, according to an embodiment of the disclosure.

FIG. 15A is a perspective view briefly illustrating the PCB 310 according to an embodiment. Referring to FIG. 15A, at least part of the first ground path 406 and second ground path 408 may be implemented through a via process. The first ground path 406 and the second ground path 408 may include various shapes. For example, the first ground path 406 or the second ground path 408 may be constructed in a linear shape or may be constructed in a cascading shape.

In an embodiment of the disclosure, when viewed from above the first patch antenna 431, an overall shape of the periodic structure 1020 may be implemented as a shape surrounding the first patch antenna 431 or the second patch antenna 720. The periodic structure 1020 may include at least one element. For example, the periodic structure 1020 may include 16 elements, and may surround the second patch antenna 720. In an embodiment of the disclosure, the element may be a conductive pattern. As another example, the number of elements included in the periodic structure 1020 may be various.

In an embodiment of the disclosure, the periodic structure 1020 may be disposed parallel to the same layer (e.g., the layer 1 of FIG. 10A) as a first frequency band patch antenna (e.g., the first patch antenna 431) or a second frequency band patch antenna (e.g., the second patch antenna 720). As another example, the first patch antenna 431 or the second patch antenna 720 may be disposed to a layer lower or higher than the periodic structure 1020.

FIG. 15B illustrates, in part, the PCB 310, viewed from above, according to an embodiment. Referring to FIG. 15B, the first feeding path 402 may be disposed in a −y direction with respect to a center of the first patch antenna 431. The second feeding path 404 may be disposed to a +x direction with respect to the center of the first patch antenna 431. The third feeding path 712 may be disposed in a −x direction with respect to a center of the second patch antenna 720. The fourth feeding path 714 may be disposed in a +y direction with respect to the center of the second patch antenna 720.

In an embodiment of the disclosure, the first ground path 406 may be disposed in quadrants of −x and −y directions with respect to the center of the first patch antenna 431. The second ground path 408 may be disposed in quadrants of +x and −y directions with respect to the center of the first patch antenna 431.

FIG. 15C is a transparent view of the PCB 310, viewed from a side face, according to an embodiment.

In an embodiment of the disclosure, the first feeding path 402 and/or the second feeding path 404 may be configured to feed directly or indirectly the first patch antenna 431.

In an embodiment of the disclosure, the third feeding path 712 and the fourth feeding path 714 may be configured to feed directly or indirectly the second patch antenna 720 by penetrating the first patch antenna 431, without being electrically coupled to the first patch antenna 431.

In an embodiment of the disclosure, the feeding paths 402, 404, 712, and 714 may be electrically coupled to a logic circuit (or a logic layer) or a feeding line without being in contact with the ground 440. For example, the feeding lines 402, 404, 712, and 714 may be electrically coupled to a feed network and the logical circuit (or the logic layer) disposed between the ground 440 by penetrating the ground 440.

Figure 16A:
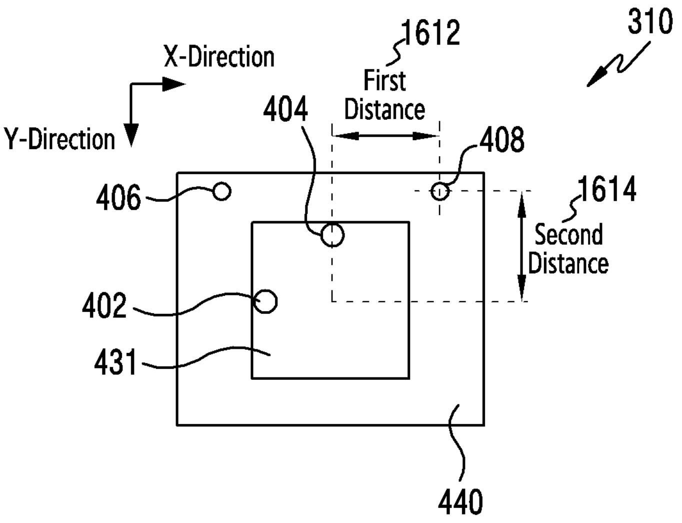
FIG. 16A illustrates a PCB, viewed from above according to an embodiment of the disclosure.
Figure 16B:
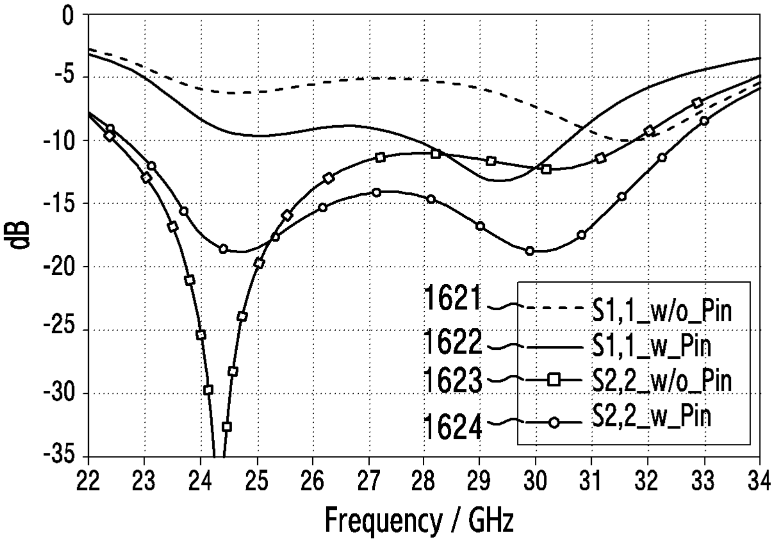
FIG. 16B illustrates antenna performance depending on a presence/absence of a ground path in a PCB according to an embodiment of the disclosure.
Figure 16C:
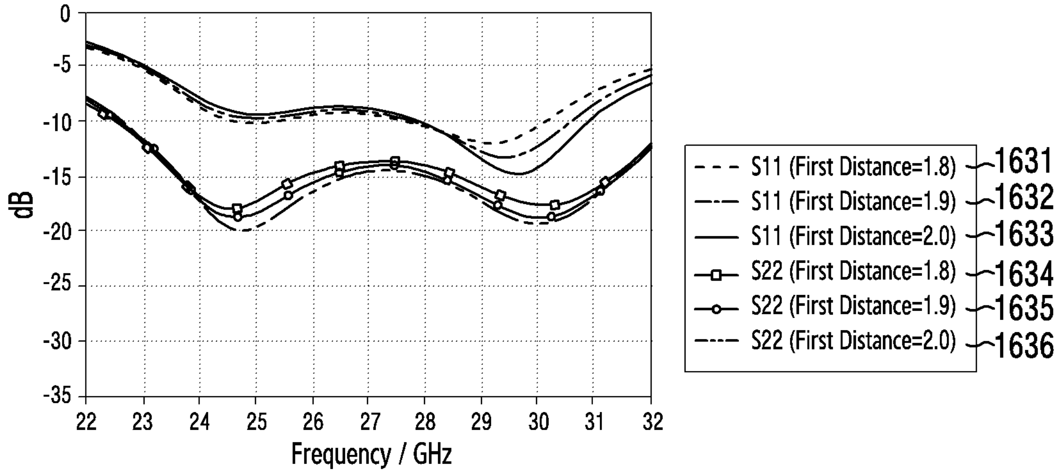
FIG. 16C illustrates antenna performance depending on a distance between a patch antenna and a ground path in a PCB according to an embodiment of the disclosure.
Figure 16D:
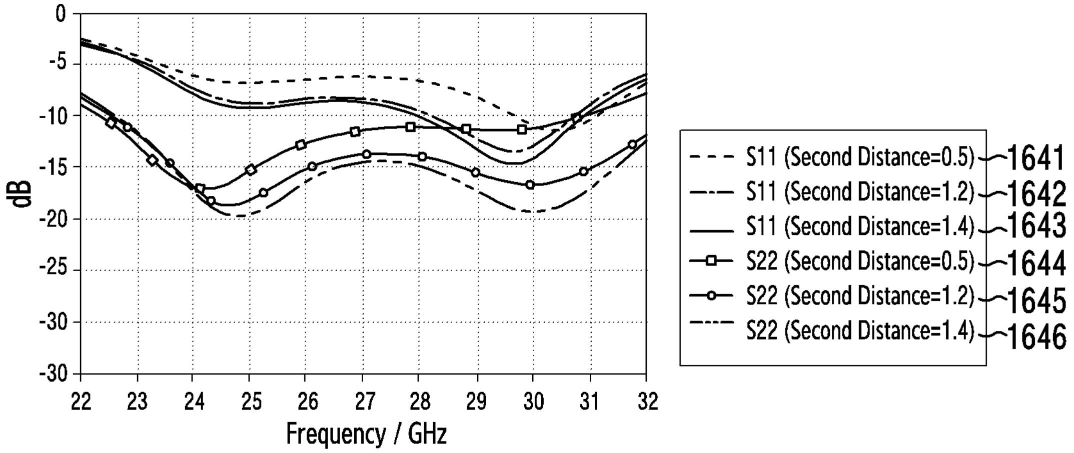
FIG. 16D illustrates antenna performance depending on a distance between a patch antenna and a ground path in a PCB according to an embodiment of the disclosure.

FIG. 16A illustrates a PCB, viewed from above, according to an embodiment of the disclosure. FIG. 16B illustrates antenna performance depending on a presence/absence of a ground path in a PCB according to an embodiment of the disclosure. FIGS. 16C and 16D illustrate antenna performance depending on a distance between a patch antenna and a ground path in a PCB according to various embodiments of the disclosure.

FIGS. 16C and 16D illustrate antenna performance depending on a positional change of a ground path in the PCB 310 according to various embodiments of the disclosure. FIGS. 16C and 16D may illustrate antenna performance depending on a distance of directions of an x axis and a −y axis from a center of the first patch antenna 431 of the ground paths 406 and 408.

Referring to FIG. 16A, the distance may be represented by a first distance 1612 and a second distance 1614. The first distance 1612 may represent a linear distance in the x-axis direction of the first ground path 406 or the second ground path 408 from the center of the first patch antenna 431. The second distance 1614 may represent a linear distance in the y-axis direction of the first ground path 406 or the second ground path 408 from the center of the first patch antenna 431.

Referring to FIG. 16B, it shows that a case 1622 where the ground paths 406 and 408 are present has a better return loss feature of the second feeding path 404 than a case 1621 where the ground paths 406 and 408 are absent at a first targeting band (e.g., about 26.5 GHz to about 29.5 GHz). It shows that a case 1624 where the ground paths 406 and 408 are present has a better return loss feature of the first feeding path 402 than a case 1623 where the ground paths 406 and 408 are absent at the first targeting band (e.g., about 26.5 GHz to about 29.5 GHz).

Referring to FIG. 16C, it shows that a return loss feature of the feeding paths 402 and 404 varies depending on the first distance 1612. It shows that cases 1632 and 1635 where the first distance 1612 is about 1.9 mm has a better return loss feature of the first feeding path 402 and second feeding path 404 than cases 1631 and 1634 where the first distance 1612 is about 1.8 mm. It shows that cases 1633 and 1636 where the first distance 1612 is about 2.0 mm has a better return loss feature of the first feeding path 402 and second feeding path 404 than the cases 1632 and 1635 where the first distance 1612 is about 1.9 mm. For example, an increase in the first distance 1612 to up to a specific level (e.g., 2.0 mm) may result in improvement of an impedance matching feature and an increase in a bandwidth.

Referring to FIG. 16D, it shows that a return loss feature of the feeding paths 402 and 404 varies depending on the second distance 1614. It shows that cases 1642 and 1645 where the second distance 1614 is about 1.2 mm has a better return loss feature of the first feeding path 402 and second feeding path 404 than the cases 1641 and 1644 where the second distance 1614 is about 0.5 mm. It shows that cases 1643 and 1646 where the second distance 1614 is about 1.4 mm has a better return loss feature of the first feeding path 402 and second feeding path 404 than the cases 1642 and 1645 where the second distance 1614 is about 1.2 mm. For example, an increase in the second distance 1614 to up to a specific level (e.g., 1.4 mm) may result in improvement of an impedance matching feature and an increase in a bandwidth. The first distance 1612 or second distance 1614 of which the return loss feature or the impedance matching feature is improved may vary depending on a targeting frequency band.

Figure 17A:
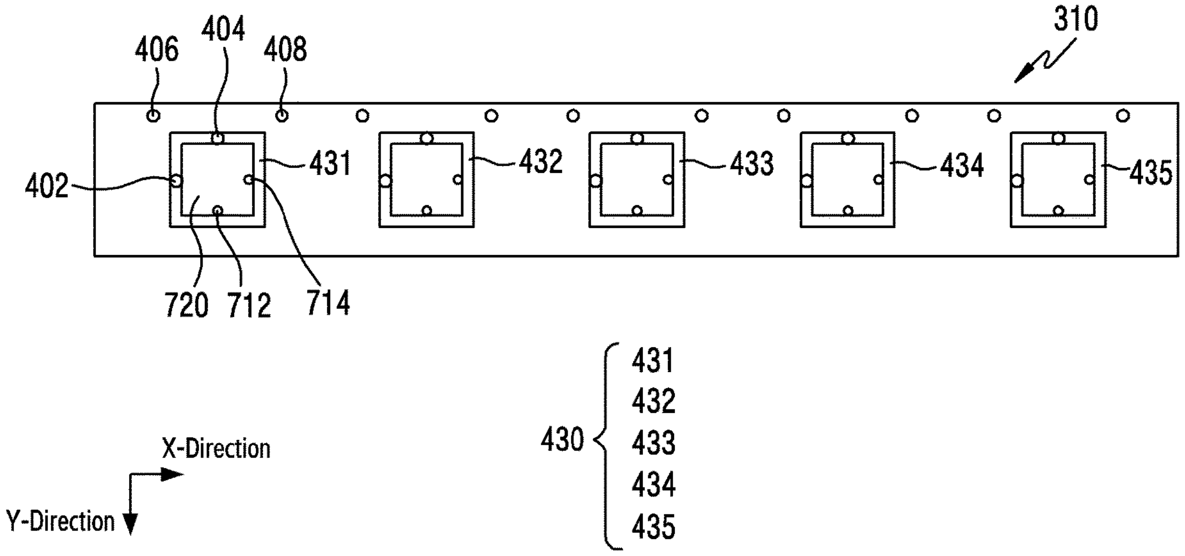
FIG. 17A illustrates a PCB, viewed from above according to an embodiment of the disclosure.
Figure 17B:
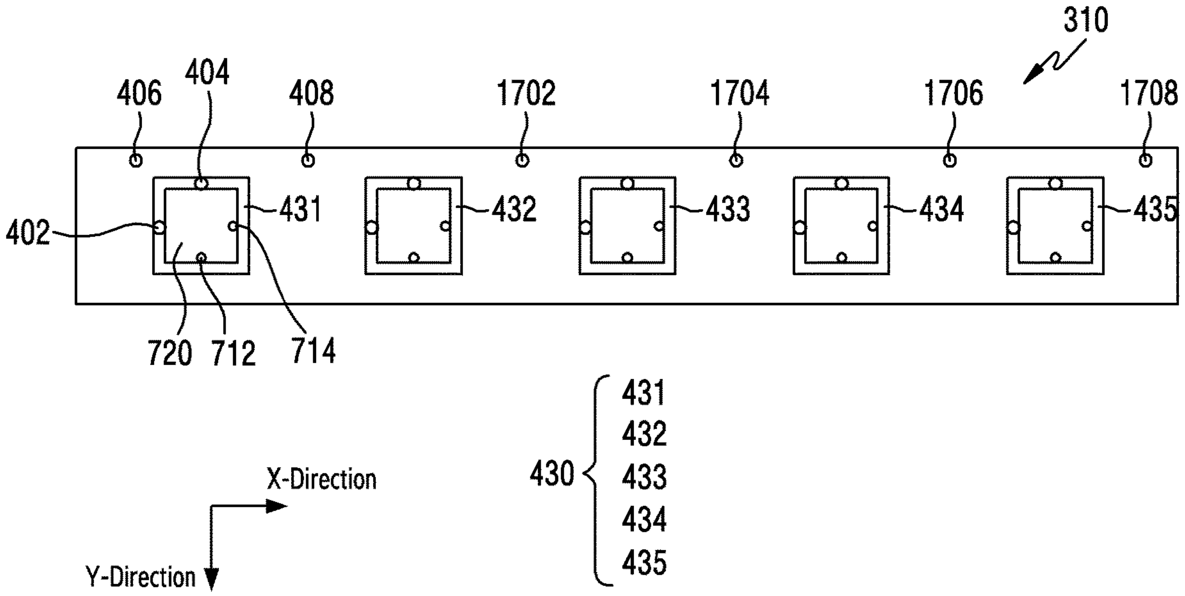
FIG. 17B illustrates a PCB, viewed from above according to an embodiment of the disclosure.

FIGS. 17A and 17B illustrate a PCB, viewed from above, according to various embodiments of the disclosure. FIGS. 17A and 17B illustrate positions of ground paths of a PCB according to various embodiments of the disclosure.

In an embodiment of the disclosure, the positions of the ground paths 406 and 408 described in FIGS. 15A, 15B, and 15C may be applied to a patch antenna included in the PCB 310 of FIG. 17A.

Referring to FIG. 17B, two ground paths (e.g., the first ground path 406 and the second ground path 408) may be disposed one by one between patch antennas, instead of corresponding to one patch antenna 431. For example, the second ground path 408 may be located at an intermediate point between the first patch antenna 431 and the second patch antenna 432. A third ground path 1702 may be located at an intermediate point between the second patch antenna 432 and the third patch antenna 433. A fourth ground path 1704 may be located at an intermediate point between the third patch antenna 433 and the fourth patch antenna 434. A fifth ground path 1706 may be located at an intermediate point between the fourth patch antenna 434 and the fifth patch antenna 435. A sixth ground path 1708 may be located in +x and −y directions with respect to a center of the fifth patch antenna 435. In an embodiment of the disclosure, the first ground path 406 may be located at a distance substantially the same as a distance between the first patch antenna 431 and the second ground path 408. As another example, according to a structure of the PCB 310, the first ground path 406 or sixth ground path 1708 located at both edges may have a distance to the patch antenna, different from that of other ground paths.

FIGS. 18A to 18E illustrate a ground path and a patch antenna shape according to various embodiments of the disclosure.

Figure 18A:
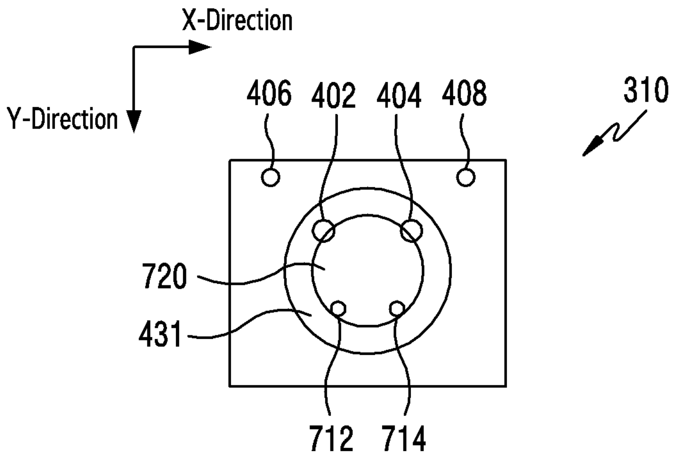
FIG. 18A illustrates a ground path and a patch antenna shape according to an embodiment of the disclosure.
Figure 18B:
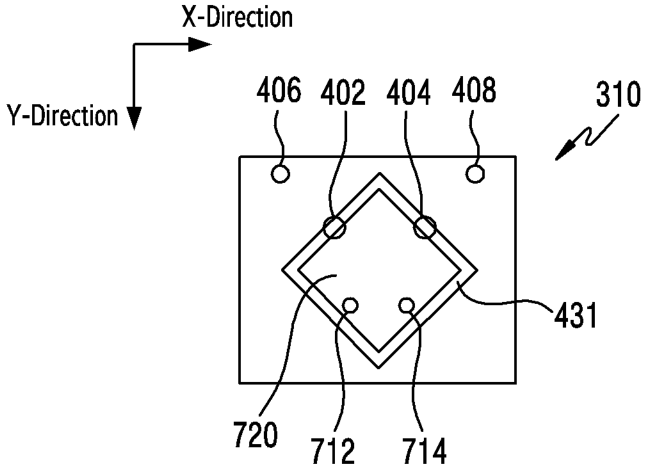
FIG. 18B illustrates a ground path and a patch antenna shape according to an embodiment of the disclosure.
Figure 18C:
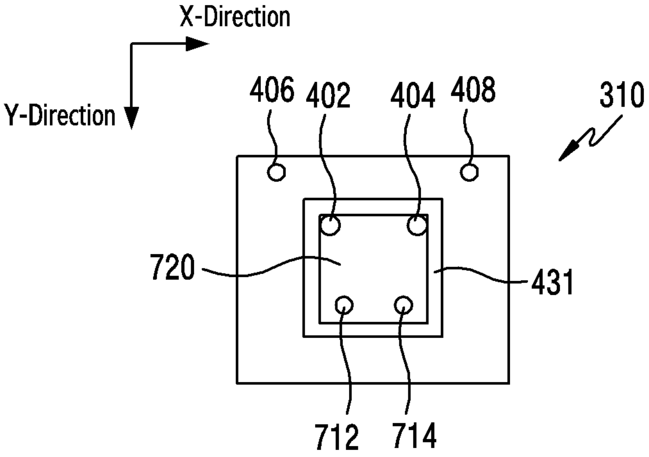
FIG. 18C illustrates a ground path and a patch antenna shape according to an embodiment of the disclosure.
Figure 18D:
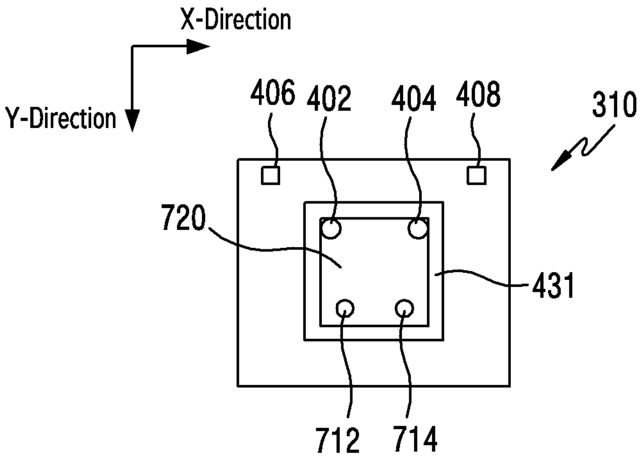
FIG. 18D illustrates a ground path and a patch antenna shape according to an embodiment of the disclosure.
Figure 18E:
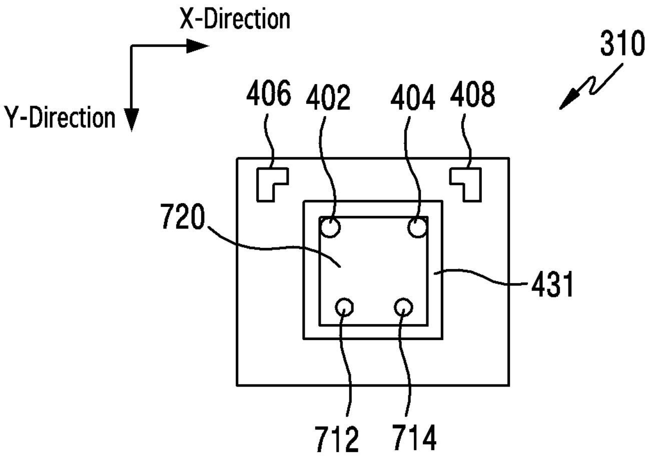
FIG. 18E illustrates a ground path and a patch antenna shape according to an embodiment of the disclosure.

Referring to FIG. 18A, the first patch antenna 431 and/or the second patch antenna 720 may have a circular shape. Referring to FIG. 18A, the first patch antenna 431 and/or the second patch antenna 720 may have a rhombic shape. For example, the first patch antenna 431 and the second patch antenna 720 may be disposed in such a manner that the patch antennas 431 and 720 of FIG. 18C are rotated by 45 degrees to the left or 45 degrees to the right. Referring to FIG. 18C, the structure described with reference to FIGS. 7, 8, and 9A to 9E may be illustrated. Referring to FIG. 18D, the ground paths 406 and 408 may have a rectangle shape, not the circular shape. Referring to FIG. 18E, the first ground path 406 may have a '┏' shape, and the second ground path 408 may have a '┓' shape. The above description is only an example, and a shape of the patch antenna or a shape of the ground path are not limited to those described above. For example, the shapes may be implemented in various shapes, such as a triangular shape or an oval shape.

FIGS. 19A to 19D may illustrate a patch antenna disposed in a 2×2 form in a PCB according to various embodiments of the disclosure. The deployment of ground paths in the PCB 310 may be illustrated in FIGS. 19A to 19D according to various embodiments of the disclosure.

Figure 19A:
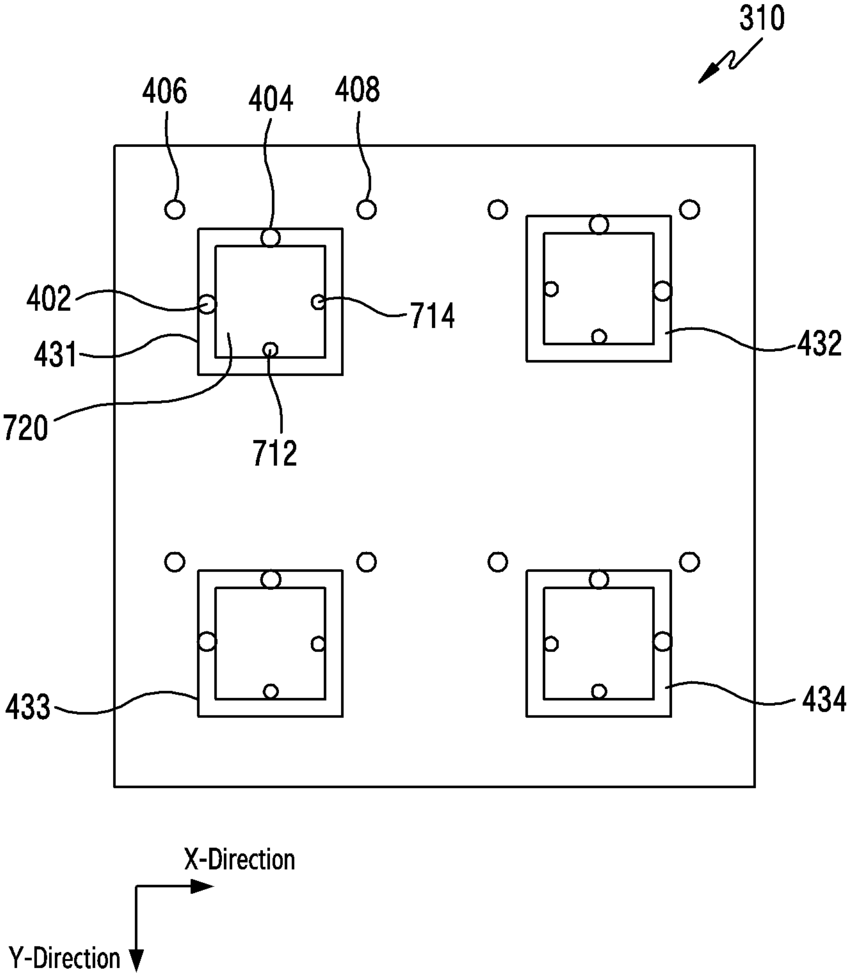
FIG. 19A illustrates a patch antenna disposed in a 2×2 form in a PCB according to an embodiment of the disclosure.

According to an embodiment of the disclosure, as shown in FIG. 19A, the PCB 310 may include the first patch antenna 431 supporting a first frequency band, the second patch antenna 720 supporting a second frequency band, the first feeding path 402, the second feeding path 404, the third feeding path 712, or the fourth feeding path 714. When the first feeding path 402 and the fourth feeding path 714 support horizontal polarization and the second feeding path 404 and the third feeding path 712 support vertical polarization, the first ground path 406 or the second ground path 408 may be disposed further adjacent to a feeding path supporting a lower frequency band between the first frequency band and the second frequency band.

Referring to FIG. 19A, the first feeding path 402 may be disposed in a −x direction with respect to a center of the first patch antenna 431. The second feeding path 404 may be disposed in a −y direction with respect to the center of the first patch antenna 431. The third feeding path 712 may be disposed in a +y direction with respect to a center of the second patch antenna 720. The fourth feeding path 714 may be disposed in a +x direction with respect to the center of the second patch antenna 720. In an embodiment of the disclosure, the patch antennas 431 and 720 and the feeding paths 402, 404, 712, and 714 may be disposed in a 2×2 form as a single set. For example, components (e.g., the feeding paths 402, 404, 712, and 714 or the ground paths 406 and 408) applied to the patch antennas 431 and 720 may be included in the PCB 310, and may also be applied substantially equally to other patch antennas disposed in the 2×2 form. In an embodiment of the disclosure, the single set may have the 2×2 form in the same direction or the 2×2 form in a different direction. For example, referring to FIG. 19A, when the patch antennas included in the PCB 310 are disposed in the 2×2 form, feeding paths applied to the patch antennas may be applied by being shifted by 90 degrees in a clockwise direction. The same or similar deployment of FIGS. 19B to 19D may be applied to the patch antennas 431 and 720 and the feeding paths 402, 404, 712, 714 described in FIG. 19A.

In an embodiment of the disclosure, the first ground path 406 may be disposed in quadrants of −x and −y directions with respect to the center of the first patch antenna 431. The second ground path 408 may be disposed in quadrants of +x and −y directions with respect to the center of the first patch antenna 431. For example, the first ground path 406 may be disposed in a 10:30 direction with respect to the center of the first patch antenna 431, and the second ground path 408 may be disposed in a 1:30 direction with respect to the first patch antenna 431. The deployment of the ground paths may be substantially equally applied to the different patch antennas 432, 433, and 434.

Figure 19B:
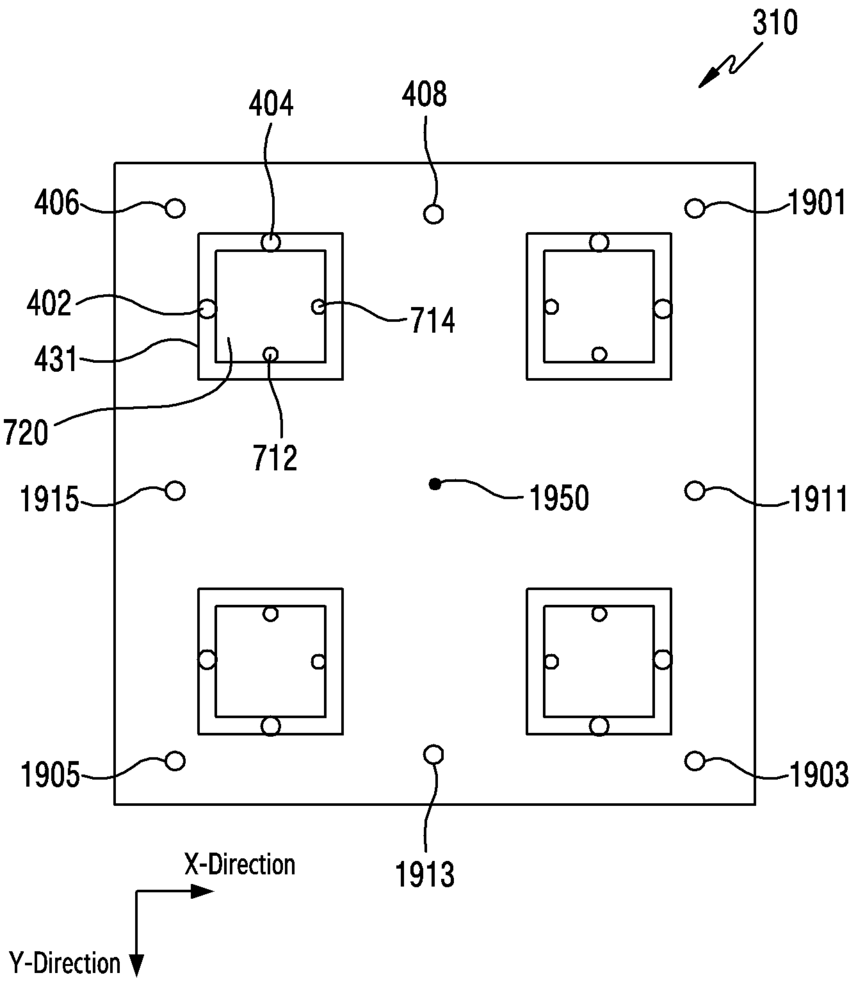
FIG. 19B illustrates a patch antenna disposed in a 2×2 form in a PCB according to an embodiment of the disclosure.

Referring to FIG. 19B, with respect to a center 1950 of the PCB 310, the first ground path 406, the second ground path 408, a ground path 1901, a ground path 1911, a ground path 1903, a ground path 1913, a ground path 1905, and a ground path 1915 may be disposed respectively in a 10:30 direction, a 12 o'clock direction, a 1:30 direction, a 3 o'clock direction, a 4:30 direction, a 6 o'clock direction, a 7:30 direction, and a 9 o'clock direction.

Figure 19C:
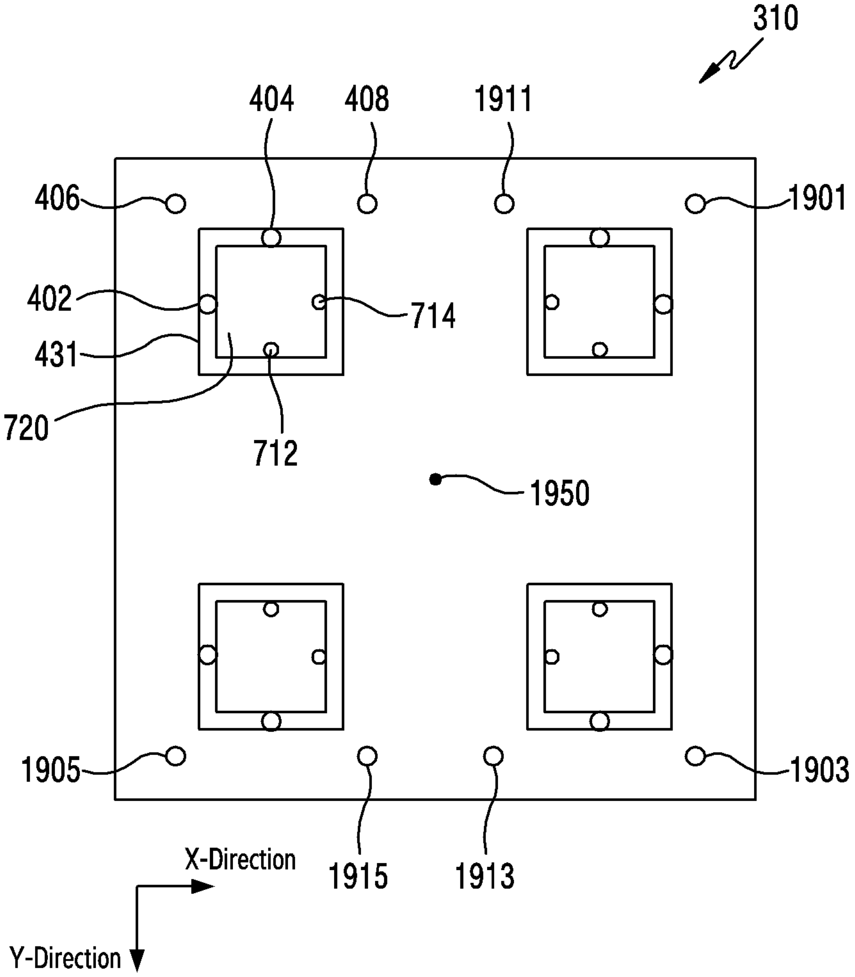
FIG. 19C illustrates a patch antenna disposed in a 2×2 form in a PCB according to an embodiment of the disclosure.

Referring to FIG. 19C, the ground paths 406, 408, 1901, and 1911 may be located further adjacent to a ground path supporting a lower frequency band. For example, the ground paths 406, 408, 1901, and 1911 may be disposed close to a first edge of the PCB 310. The ground paths 1903, 1913, 1905, and 1915 may be disposed close to a second edge located opposite to the first edge.

Figure 19D:
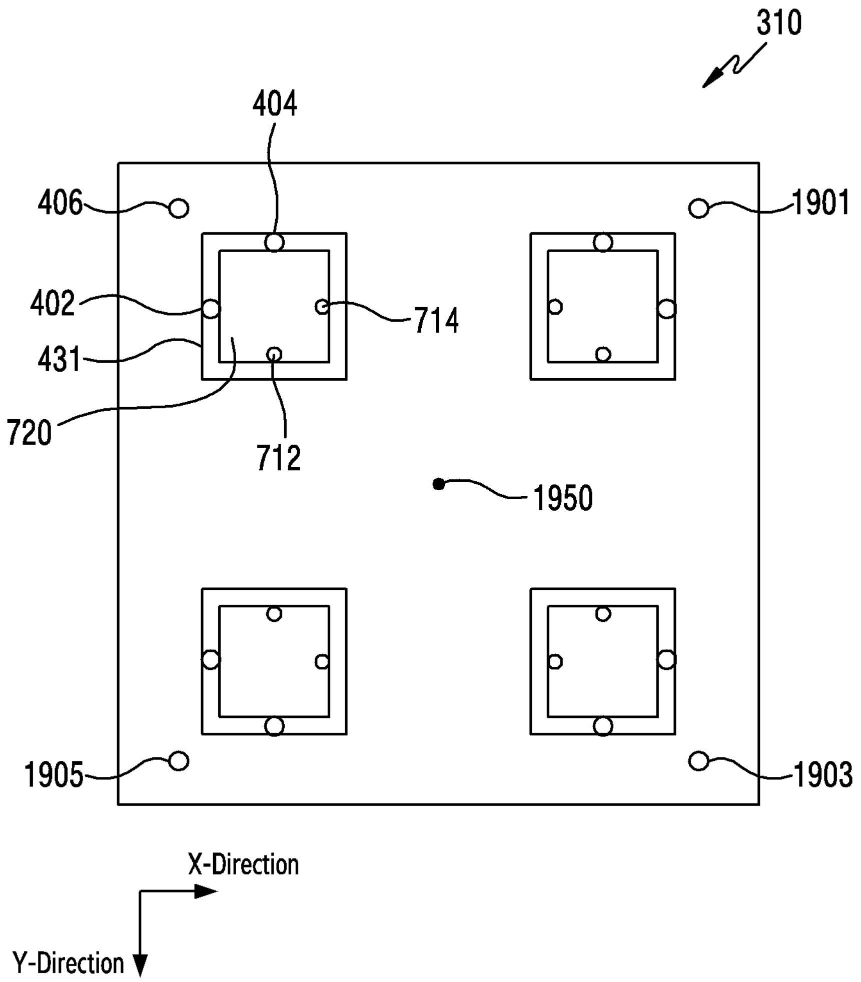
FIG. 19D illustrates a patch antenna disposed in a 2×2 form in a PCB according to an embodiment of the disclosure.

Referring to FIG. 19D, with respect to the center 1950 of the PCB 310, the first ground path 406, the ground path 1901, the ground path 1903, and the ground path 1905 may be disposed respectively in a 10:30 direction, a 1:30 direction, a 4:30 direction, and a 7:30 direction. In an embodiment of the disclosure, the ground paths 406, 1901, 1903, and 1905 may be disposed close to a corner of the PCB 310 in the aforementioned direction.

The structure described as one patch antenna in the disclosure may be applied to another patch antenna included in the patch antenna array.

FIGS. 20A to 20D may illustrate a PCB including a 1×4 antenna array according to various embodiments of the disclosure.

Figure 20A:
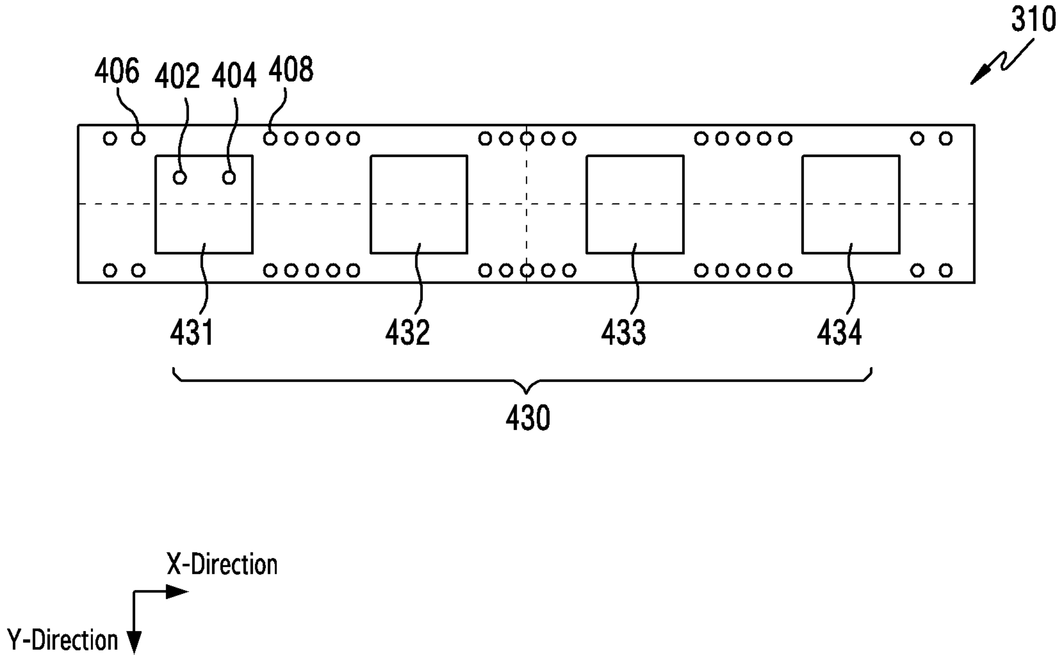
FIG. 20A illustrates a PCB including a 1×4 antenna array according to an embodiment of the disclosure.
Figure 20B:
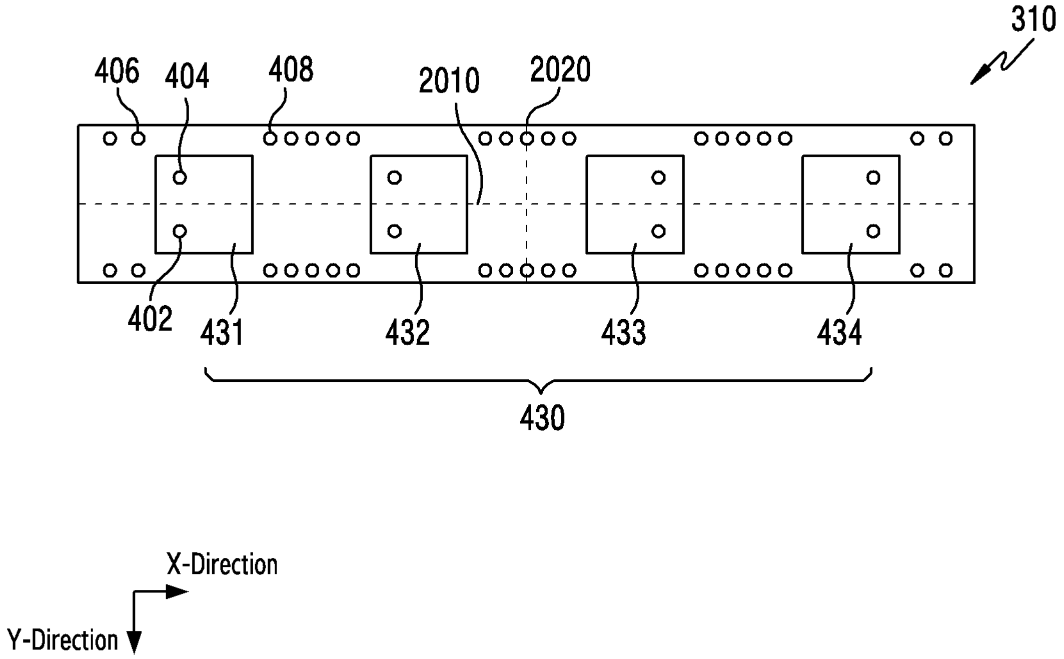
FIG. 20B illustrates a PCB including a 1×4 antenna array according to an embodiment of the disclosure.

The antenna array 430, ground paths 406 and 408, and feeding paths 402 and 404 described in FIG. 4 may also be applied equally or similarly to FIGS. 20A and 20B.

Referring to FIG. 20A, a plurality of ground paths may be disposed between patch antennas. For example, the ground path 408 may be disposed in quadrants of +x and −y directions with respect to a center of the first patch antenna 431, and a plurality of (e.g., 5) ground paths may be disposed in a +x direction of the ground path 408. The ground path 406 may be disposed in quadrants in −x and −y directions with respect to a center of the first patch antenna 431, and a plurality (e.g., 2) of the ground paths 406 may be disposed in a −x direction of the ground path 406. For example, the ground paths 406 and 408 may be constructed by using multiple vias. The deployment of the ground paths 406 and 408 may be substantially equally applied to the other patch antennas 432, 433, and 434. In an embodiment of the disclosure, the ground path 406 or the ground path 408 may be disposed to one edge or another edge of the PCB.

In an embodiment of the disclosure, a plurality of ground paths may be disposed between the first patch antenna 431 and the second patch antenna 432. This may be substantially equally applied to other patch antennas. For example, the number of the plurality of ground paths is not limited, and may be 2 to n.

In an embodiment of the disclosure, the plurality of ground paths disposed at one edge of the PCB 310 may be disposed additionally at another edge of the PCB 310 so as to be symmetrical with respect to a virtual center line 2010 drawn in +x and −x directions from a center of the PCB 310. This may also be equally applied to FIGS. 20B to 20D and 21A to 21D.

In an embodiment of the disclosure, similarly to the structure of the PCB 310 of FIG. 7, when viewed from above the PCB 310, patch antennas (e.g., the second patch antenna 720 of FIG. 7) may be additionally disposed to overlap with the antenna array 430. This may also be substantially equally applied to FIGS. 20B to 20D.

Referring to FIG. 20B, positions of the feeding paths described in FIG. 20A may be changed. For example, the feeding paths 402 and 404 corresponding to the first patch antenna 431 may be disposed such that the feeding paths are rotated by 90 degrees to the left with respect to the center of the first patch antenna 431. Feeding paths corresponding to the second patch antenna 431 may be disposed such that the feeding paths are rotated by 90 degrees to the left with respect to the center of the second patch antenna 432. For example, the feeding path of the first patch antenna 431 or second patch antenna 432 may be disposed adjacent to an edge located in the −x direction. Feeding paths corresponding to the third patch antenna 433 may be disposed such that the feeding paths are rotated by 90 degrees to the right with respect to the center of the third patch antenna 433. Feeding paths corresponding to the fourth patch antenna 434 may be disposed such that the feeding paths are rotated by 90 degrees to the right with respect to the center of the fourth patch antenna 434. For example, the feeding path of the third patch antenna 433 or fourth patch antenna 434 may be disposed adjacent to an edge located in the +x direction. The deployment of the ground paths described in FIG. 20A may be substantially equally applied to the deployment of the ground paths.

Figure 20C:
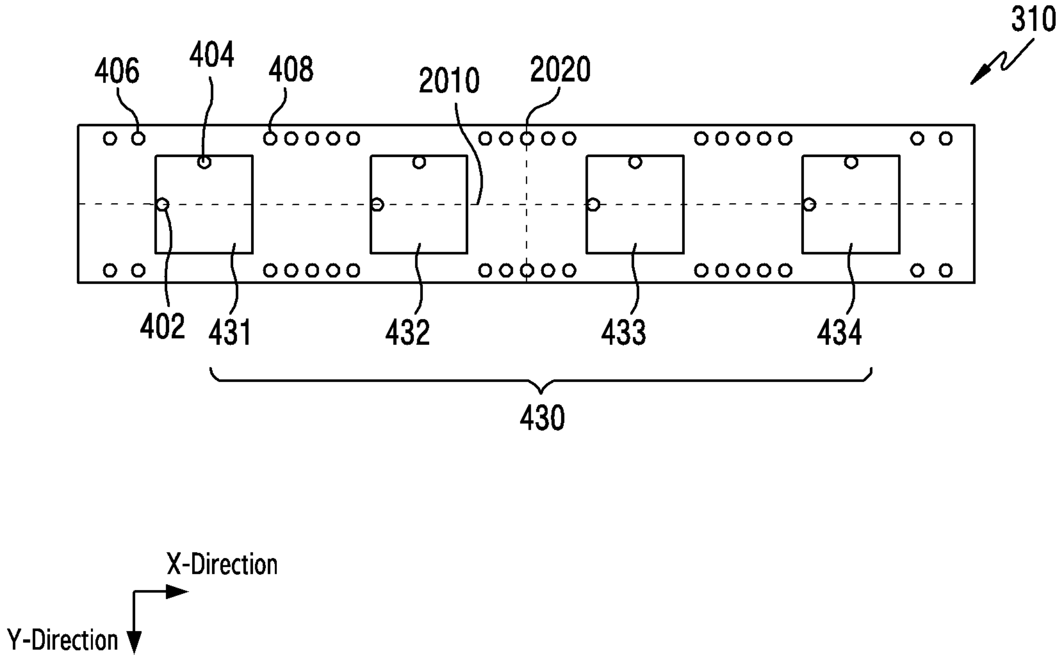
FIG. 20C illustrates a PCB including a 1×4 antenna array according to an embodiment of the disclosure.

Referring to FIG. 20C, when viewed from above the PCB 310, the first feeding path 402 may be disposed adjacent to an edge located in the −x direction with respect to the center of the first patch antenna 431. The second feeding path 404 may be disposed adjacent to an edge located in the −y direction with respect to the center of the first patch antenna 431. The feeding path of the first patch antenna 431 may be substantially equally applied to the feeding paths of the patch antennas 432, 433, and 434. The deployment of the ground paths described in FIG. 20A may be substantially equally applied to the deployment of the ground paths.

Figure 20D:
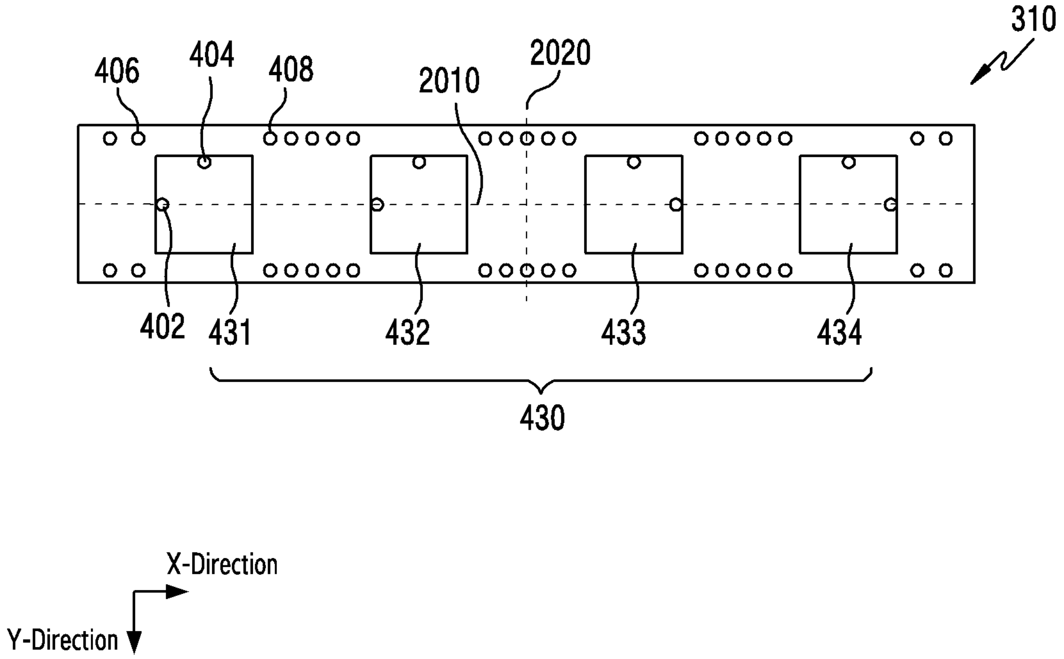
FIG. 20D illustrates a PCB including a 1×4 antenna array according to an embodiment of the disclosure.

Referring to FIG. 20D, positions of the feeding paths described in FIG. 20C may be changed. For example, feeding paths corresponding to the third patch antenna 433 may be disposed such that the feeding paths are rotated by 90 degrees to the right with respect to the center of the third patch antenna 433. Feeding paths corresponding to the fourth patch antenna 434 may be disposed such that the feeding paths are rotated by 90 degrees to the right with respect to the center of the fourth patch antenna 434. For example, when viewed from above the PCB 310, the first feeding path of the third patch antenna 433 may be disposed adjacent to an edge located in the +x direction with respect to the center of the third patch antenna 433. The second feeding path of the third patch antenna 433 may be disposed adjacent to an edge located in the −y direction with respect to the center of the third patch antenna 433. As another example, when viewed from above the PCB 310, for example, the first feeding path of the fourth patch antenna 434 may be disposed adjacent to an edge located in the +x direction with respect to the center of the fourth patch antenna 434. The second feeding path of the fourth patch antenna 434 may be disposed adjacent to an edge located in the −y direction with respect to the center of the fourth patch antenna 434. The deployment of the ground paths described in FIG. 20A may be substantially equally applied to the deployment of the ground paths.

FIGS. 21A to 21D may illustrate a PCB including a 1×5 antenna array according to various embodiments of the disclosure.

Figure 21A:
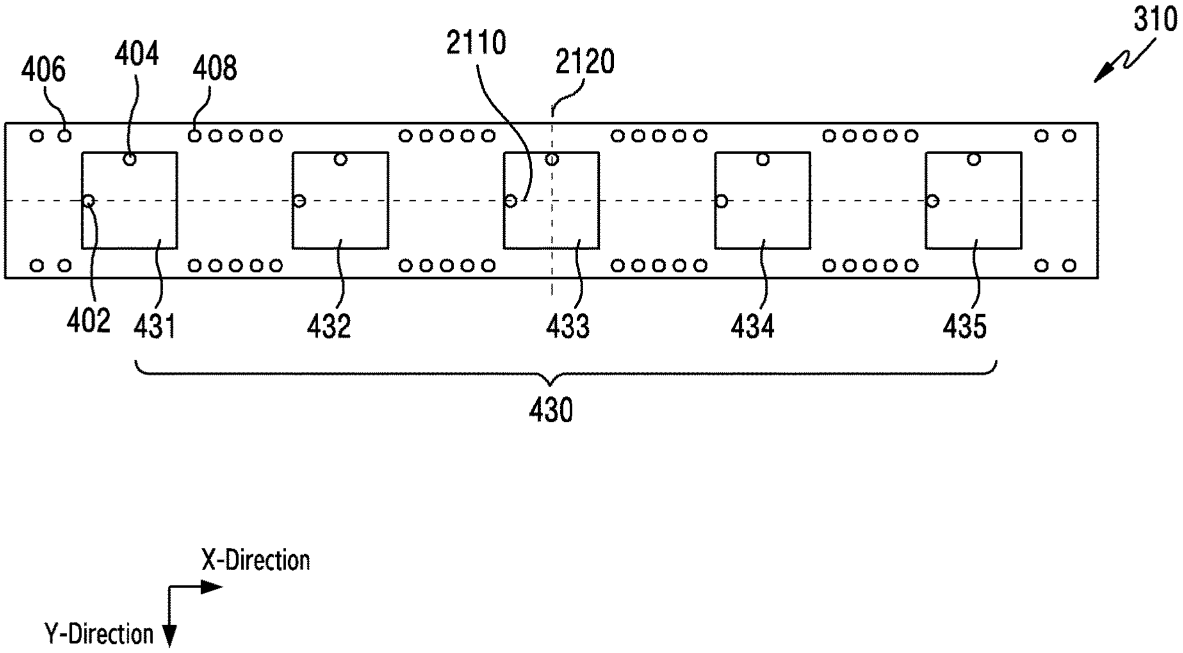
FIG. 21A illustrates a PCB including a 1×5 antenna array according to an embodiment of the disclosure.

Referring to FIG. 21A, when viewed from above the PCB 310, the first feeding path 402 may be disposed adjacent to an edge located in the −x direction with respect to the center of the first patch antenna 431. The second feeding path 404 may be disposed adjacent to an edge located in the −y direction with respect to the center of the first patch antenna 431. The feeding path of the first patch antenna 431 may be substantially equally applied to the feeding paths of the patch antennas 432, 433, 434, and 435.

Referring to FIG. 21A, a plurality of ground paths may be disposed between patch antennas 431, 432, 433, 434, and 435. For example, the ground path 408 may be disposed in quadrants of +x and −y directions with respect to a center of the first patch antenna 431, and a plurality of (e.g., 5) ground paths may be disposed in a +x direction of the ground path 408. The ground path 406 may be disposed in quadrants in −x and −y directions with respect to a center of the first patch antenna 431, and a plurality (e.g., 2) of the ground paths 406 may be disposed in a −x direction of the ground path 406. For example, the ground paths 406 and 408 may be constructed by using multiple vias. The deployment of the ground paths 406 and 408 may be substantially equally applied to other patch antennas 432, 433, 434, and 435. For example, as shown in FIG. 20A, a plurality of ground paths may be disposed between the antenna arrays 430. The number of the plurality of ground paths is not limited, and may be 2 to n.

In an embodiment of the disclosure, the plurality of ground paths disposed at one edge of the PCB 310 may be disposed additionally at another edge of the PCB 310 so as to be symmetrical with respect to a virtual center line 2010 drawn in +x and −x directions from a center of the PCB 310.

Figure 21B:
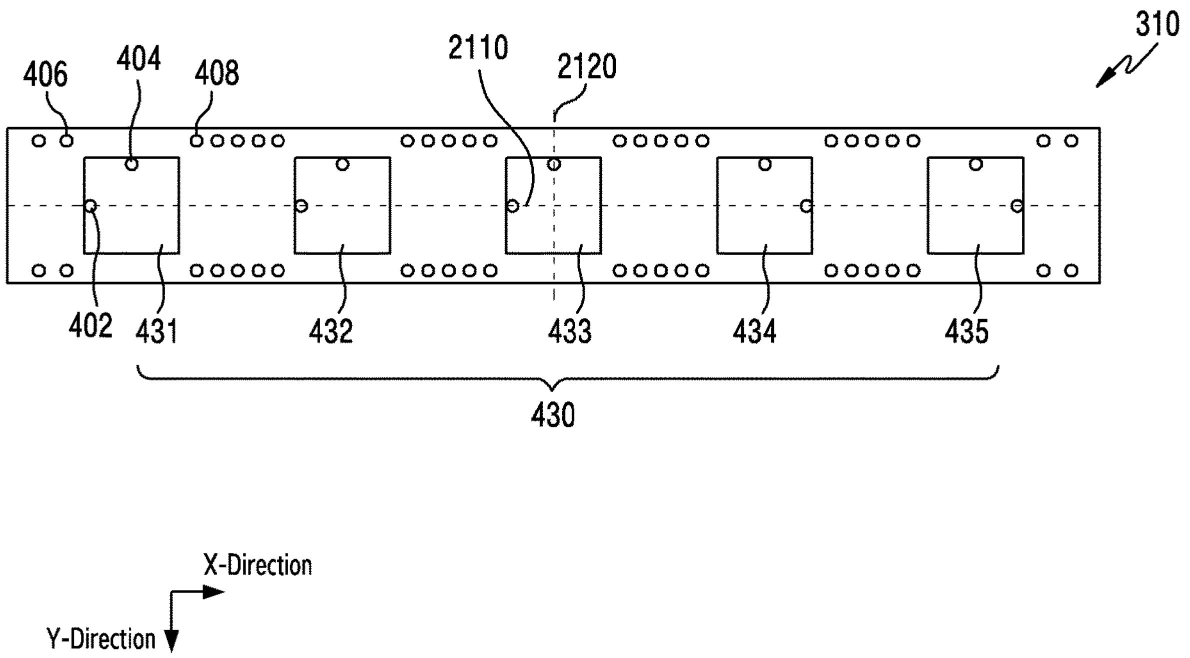
FIG. 21B illustrates a PCB including a 1×5 antenna array according to an embodiment of the disclosure.
Figure 21C:
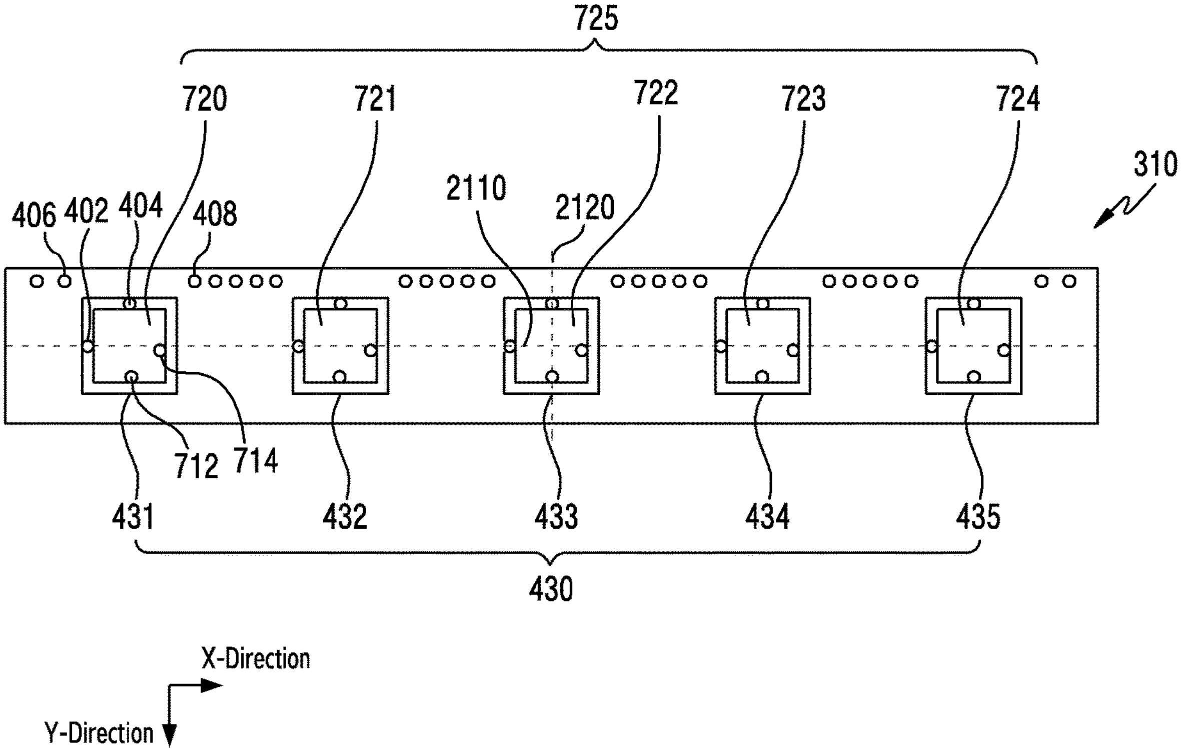
FIG. 21C illustrates a PCB including a 1×5 antenna array according to an embodiment of the disclosure.
Figure 21D:
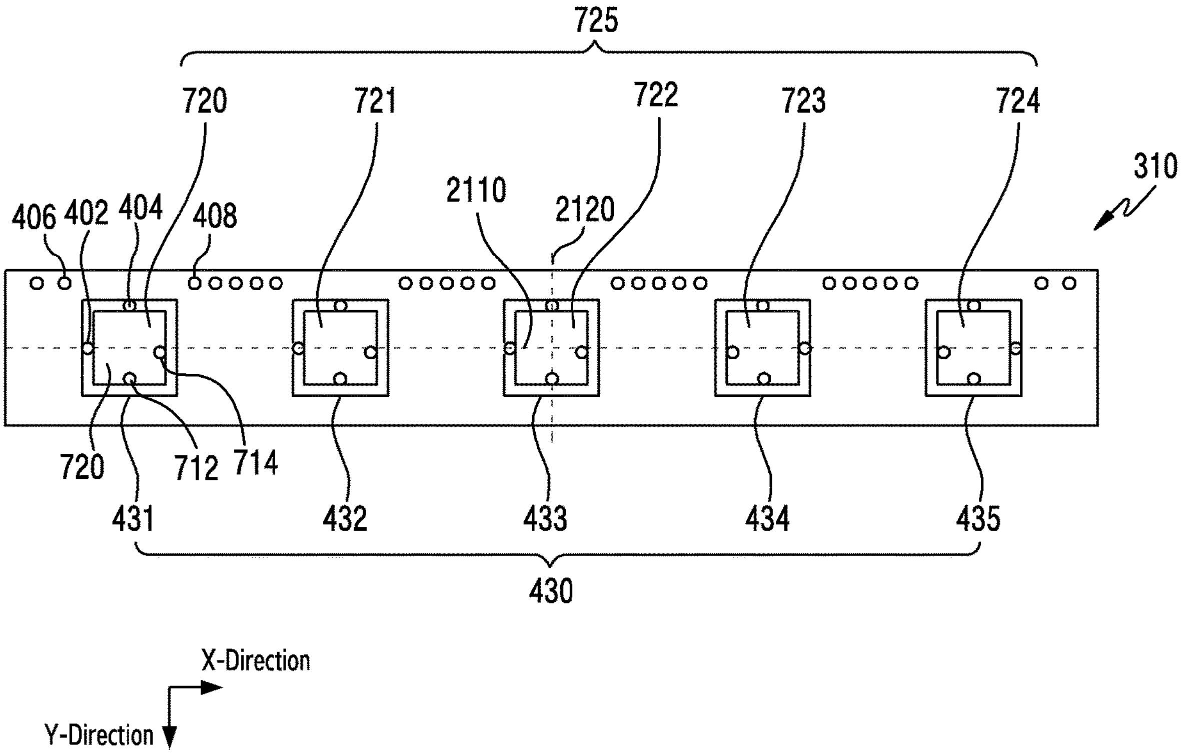
FIG. 21D illustrates a PCB including a 1×5 antenna array according to an embodiment of the disclosure.

The deployment of the ground paths described above may also be substantially equally applied to FIGS. 21B to 21D.

Referring to FIG. 21B, feeding paths of the patch antennas 431, 432, and 433 may be located in the substantially same positions as those of the patch antennas 431, 432, and 433 of FIG. 21A. In an embodiment of the disclosure, feeding paths corresponding to the fourth patch antenna 434 and the fifth patch antenna 435 may be disposed such that feeding paths corresponding to the first patch antenna 431 and the second patch antenna 432 are symmetrical to a virtual center line 2120 drawn in +y and −y directions from a center of the PCB 310. For example, when viewed from above the PCB 310, the first feeding path of the fourth patch antenna 434 may be disposed adjacent to an edge located in the +x direction with respect to a center of the fourth patch antenna 434. The second feeding path of the fourth patch antenna 434 may be disposed adjacent to an edge located in the −y direction with respect to the center of the fourth patch antenna 434. As another example, when viewed from above the PCB 310, for example, the first feeding path of the fifth patch antenna 435 may be disposed adjacent to an edge located in the +x direction with respect to the center of the fifth patch antenna 435. The second feeding path of the fifth patch antenna 435 may be disposed adjacent to an edge located in the −y direction with respect to the center of the fifth patch antenna 435.

Referring to FIG. 21C, when viewed from above the PCB 310, the first feeding path 402 may be disposed adjacent to an edge located in the −x direction with respect to the center of the first patch antenna 431. The second feeding path 404 may be disposed adjacent to an edge located in the −y direction with respect to the center of the first patch antenna 431. The third feeding path 712 may be disposed adjacent to an edge located in the +y direction with respect to the center of the patch antenna 720. The fourth feeding path 714 may be disposed adjacent to an edge located in the +x direction with respect to the center of the patch antenna 720. The feeding path of the first patch antenna 431 may be substantially equally applied to the feeding paths of the patch antennas 432, 433, 434, and 435. The feeding path of the patch antenna 721 may be substantially equally applied to the feeding paths of the patch antennas 722, 723, 724, and 725.

Referring to FIG. 21C, in an embodiment of the disclosure, the plurality of ground paths described in FIG. 20A may be disposed to be symmetrical to a first edge (e.g., an edge located in the −y direction) and second edge (an edge located in a +y direction) of the PCB 310. In another example, the plurality of ground paths may be disposed to the first edge (e.g., the edge located in the −y direction) to reduce a width of the PCB 310.

Referring to FIG. 21D, feeding paths of the patch antennas 431, 432, and 433 may be located in the substantially same positions as those of the patch antennas 431, 432, and 433 of FIG. 21C. Feeding paths of the patch antennas 720, 721, and 722 may be located in the substantially same positions as those of the patch antennas 720, 721, and 722 of FIG. 21C. In an embodiment of the disclosure, feeding paths corresponding to the fourth patch antenna 434 and the fifth patch antenna 435 may be disposed such that feeding paths corresponding to the first patch antenna 431 and the second patch antenna 432 are symmetrical to a virtual center line 2120 drawn in +y and −y directions from a center of the PCB 310. For example, when viewed from above the PCB 310, the first feeding path of the fourth patch antenna 434 may be disposed adjacent to an edge located in the +x direction with respect to a center of the fourth patch antenna 434. The second feeding path of the fourth patch antenna 434 may be disposed adjacent to an edge located in the −y direction with respect to the center of the fourth patch antenna 434. As another example, when viewed from above the PCB 310, for example, the first feeding path of the fifth patch antenna 435 may be disposed adjacent to an edge located in the +x direction with respect to the center of the fifth patch antenna 435. The second feeding path of the fifth patch antenna 435 may be disposed adjacent to an edge located in the −y direction with respect to the center of the fifth patch antenna 435. For example, when viewed from above the PCB 310, the first feeding path of the patch antenna 724 may be disposed adjacent to an edge located in the +x direction with respect to the center of the patch antenna 724. The second feeding path of the patch antenna 724 may be located adjacent to an edge located in the −y direction with respect to the center of the patch antenna 724. As another example, when viewed from above the PCB 310, for example, the first feeding path of the patch antenna 725 may be disposed adjacent to an edge located in the +x direction with respect to the center of the patch antenna 725. The second feeding path of the patch antenna 725 may be disposed adjacent to an edge located in the −y direction with respect to the center of the patch antenna 725.

Referring to FIG. 21D, in an embodiment of the disclosure, the plurality of ground paths described in FIG. 20A may be disposed to be symmetrical to a first edge (e.g., an edge located in the −y direction) and second edge (an edge located in a +y direction) of the PCB 310. In another example, the plurality of ground paths may be disposed to the first edge (e.g., the edge located in the −y direction) to reduce a width of the PCB 310.

In an embodiment of the disclosure, the electronic device 101 may include the PCB 310 including a plurality of layers, the communication circuit 320 disposed to one face of the PCB 310, and the at least one processor 330 electrically coupled to the communication circuit 320. The PCB 310 may include the first layer 410 on which a plurality of patch antennas (e.g., 431, 432, 433, and 434) disposed, the first feeding path 402 which feeds directly or indirectly a first point 402-1 of the first patch antenna 431 so that the first patch antenna 431 disposed to the first layer 410 receives a first polarized signal, the second feeding path 404 which feeds directly or indirectly the second point 404-1 of the first patch antenna 431 so that the first patch antenna 431 receives a second polarized signal orthogonal to the first polarized signal, the second layer 420 corresponding to the ground 440 of the PCB 310, the first ground path 406 which electrically couples the second layer 420 and the third point 406-1 adjacent to the first point 402-1 of the first patch antenna 431 from the outside of the first patch antenna 431, and the second ground path 408 which electrically couples the second layer 420 and the fourth point 408-1 adjacent to the second point 404-1 of the first patch antenna 431 from the outside of the first patch antenna 431.

In the electronic device 101 according to an embodiment of the disclosure, the PCB 310 may include the third layer 710 on which a plurality of patch antennas disposed, the third feeding path 712 which feeds directly or indirectly the fifth point 712-1 of the second patch antenna 720 so that the second patch antenna 720 disposed to the third layer 710 receives a third polarized signal, and the fourth feeding path 714 which feeds directly or indirectly the sixth point 714-1 of the second patch antenna 720 to receive a fourth polarized signal orthogonal to the third polarized signal.

In the electronic device 101 according to an embodiment of the disclosure, the third feeding path 712 may include a via penetrating a second number of layers among the plurality of layers and may be electrically coupled to the communication circuit 320. The fourth feeding path 714 may include a via penetrating the second number of layers among the plurality of layers and may be electrically coupled to the communication circuit 320.

In the electronic device 101 according to an embodiment of the disclosure, the first layer 410 may be vertically disposed to an inner side than the third layer 710.

In the electronic device 101 according to an embodiment of the disclosure, the first patch antenna 431 may vertically overlap with the second patch antenna 720, and a size of the first patch antenna 431 may be greater than a size of the second patch antenna 720.

In the electronic device 101 according to an embodiment of the disclosure, a width of the ground 440 may be 3.5 mm.

In the electronic device 101 according to an embodiment of the disclosure, the first virtual line 602 connecting the first point 402-1 and the third point 406-1 may be orthogonal to the second virtual line 604 connecting the second point 404-1 and the fourth point 408-1.

In the electronic device 101 according to an embodiment of the disclosure, the first ground path 406 and the second ground path 408 may be located spaced apart from the metal frame 1110 of the electronic device 101.

In the electronic device 101 according to an embodiment of the disclosure, the number of the plurality of patch antennas may be k, and the plurality of patch antennas may be disposed in a pattern of 1×k arrays.

In the electronic device 101 according to an embodiment of the disclosure, the plurality of patch antennas 431, 432, 433, 434, and 435 may have, for example, at least any one of a circular shape, an oval shape, and a rectangular shape.

In the electronic device 101 according to an embodiment of the disclosure, the first patch antenna 431 and the second patch antenna 720 may operate to transmit/receive a radio frequency (RF) signal of a specified frequency band, and the specified frequency band may include a millimeter wave (mm Wave) band.

In the electronic device 101 according to an embodiment of the disclosure, the first patch antenna 431 may operate to transmit/receive a signal of a frequency band of 24 GHz to 29.5 GHz, and the second patch antenna 720 may operate to transmit/receive a signal of a frequency band of 37 GHz to 40 GHz.

In the electronic device 101 according to an embodiment of the disclosure, the first ground path 406 and the second ground path 408 may penetrate a third number of layers.

In the electronic device 101 according to an embodiment of the disclosure, the PCB 310 may further include the plurality of dipole antennas 1311, 1312, 1313, 1314, and 1315.

In the electronic device 101 according to an embodiment of the disclosure, the plurality of dipole antennas 1311, 1312, 1313, 1314, and 1315 may be disposed in a pattern of a 1×k array at positions corresponding to the plurality of patch antennas 431, 432, 433, 434, and 435.

In an embodiment of the disclosure, the electronic device 101 may include the PCB 310 including a plurality of layers, and the communication circuit 320 electrically coupled to the PCB. The PCB 310 may include the first layer 410 on which the plurality of patch antennas 431, 432, 433, 434, and 435 disposed, the first feeding path 402 which feeds directly or indirectly the first point 402-1 of the first patch antenna 431 so that the first patch antenna 431 disposed to the first layer 410 receives a first polarized signal, wherein the first feeding path 402 includes a via penetrating a first number of layers among the plurality of layers and is electrically coupled to the communication circuit 320, the second feeding path 404 which feeds directly or indirectly the second point 404-1 of the first patch antenna 431 so that the first patch antenna 431 disposed to the first layer 410 receives a second polarized signal orthogonal to the first polarized signal, wherein the second feeding path 404 includes a via penetrating the first number of layers among the plurality of layers and is electrically coupled to the communication circuit 320, the second layer 420 corresponding to the ground 440 of the PCB 310, the first ground path 406 which electrically couples the second layer 420 and the third point 406-1 adjacent to the first point 402-1 of the first patch antenna 431 from the outside of the first patch antenna 431, and the second ground path 408 which electrically couples the second layer 420 and the fourth point 408-1 adjacent to the second point 404-1 of the first patch antenna 431 from the outside of the first patch antenna 431.

The PCB 310 according to an embodiment may include the third layer 710 on which a plurality of patch antennas disposed, the third feeding path 712 which feeds directly or indirectly the fifth point 712-1 of the second patch antenna 720 so that the second patch antenna 720 disposed to the third layer 710 receives a third polarized signal, and the fourth feeding path 714 which feeds directly or indirectly the sixth point 714-1 of the second patch antenna 720 to receive a fourth polarized signal orthogonal to the third polarized signal.

In the PCB 310 according to an embodiment of the disclosure, the first patch antenna 431 may be vertically disposed to an inner side than the second patch antenna 720*a*. A size of the first patch antenna 431 may be greater than a size of the second patch antenna 720.

In the PCB 310 according to an embodiment of the disclosure, the first ground path 406 and the second ground path 408 may penetrate a third number of layers, and a width of the ground 440 may be 3.5 mm.

In an embodiment of the disclosure, the PCB 310 may further include the plurality of dipole antennas 1311, 1312, 1313, 1314, and 1315.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims.

What is claimed is:

1. An electronic device comprising:

a printed circuit board (PCB) including a plurality of layers including a first layer and a second layer;

a plurality of patch antennas including a first patch antenna;

a communication circuit electrically coupled to the PCB; and at least one processor electrically coupled to the communication circuit, wherein the PCB includes:

the first layer in which the plurality of patch antennas are disposed, a first feeding path which feeds power directly or indirectly to a first point of the first patch antenna such that the first patch antenna disposed in the first layer transmits and/or receives a first polarized signal, wherein the first feeding path includes a via penetrating a first number of layers among the plurality of layers and is electrically coupled to the communication circuit, a second feeding path which feeds power directly or indirectly to a second point of the first patch antenna such that the first patch antenna disposed in the first layer transmits and/or receives a second polarized signal orthogonal to the first polarized signal, wherein the second feeding path includes a via penetrating the first number of layers among the plurality of layers and is electrically coupled to the communication circuit, the second layer including a ground, a first ground path which electrically connects the ground and a third point adjacent to the first point of the first patch antenna, wherein the third point is disposed from the outside of the first patch antenna, and a second ground path which electrically connects the ground and a fourth point adjacent to the second point of the first patch antenna, wherein the fourth point is disposed from the outside of the first patch antenna.

2. The electronic device of claim 1, wherein the PCB includes:

a third layer in which a plurality of patch antennas including a second patch antenna are disposed;

a third feeding path which feeds power directly or indirectly to a fifth point of the second patch antenna such that the second patch antenna disposed in the third layer receives a third polarized signal; and a fourth feeding path which feeds power directly or indirectly to a sixth point of the second patch antenna such that the second patch antenna receives a fourth polarized signal orthogonal to the third polarized signal.

3. The electronic device of claim 2, wherein the third feeding path includes a via penetrating a second number of layers among the plurality of layers and is electrically coupled to the communication circuit, and wherein the fourth feeding path includes a via penetrating the second number of layers among the plurality of layers and is electrically coupled to the communication circuit.

4. The electronic device of claim 2, wherein the first layer is disposed between the third layer and the second layer.

5. The electronic device of claim 2, wherein, when viewed from above the PCB, the first patch antenna is disposed such that at least two regions of the first patch antenna overlap with at least two regions of the second patch antenna, and wherein a size of the first patch antenna is greater than a size of the second patch antenna.

6. The electronic device of claim 1, wherein a width of the ground is 3 mm to 4 mm.

7. The electronic device of claim 1, wherein a first virtual line connecting the first point and the third point is orthogonal to a second virtual line connecting the second point and the fourth point.

8. The electronic device of claim 1, wherein the first ground path and the second ground path are disposed not to overlap with a metal frame included in the electronic device, when viewed from a side face of the electronic device.

9. The electronic device of claim 1, wherein the total number of the plurality of patch antennas is n×m, wherein the plurality of patch antennas are arranged in a rectangular grid, and disposed as an antenna array of an n×m array, and wherein n and m integers are equal to or greater than one.

10. The electronic device of claim 1, wherein the plurality of patch antennas have at least any one of a circular shape, an oval shape, or a rectangular shape.

11. The electronic device of claim 2, wherein the first patch antenna and the second patch antenna transmit and/or receive a radio frequency (RF) signal of a specified frequency band, and wherein the specified frequency band includes a mm wave band.

12. The electronic device of claim 11, wherein the first patch antenna transmits and/or receives a signal of a frequency band of 24 to 29.5 GHZ, and wherein the second patch antenna transmits and/or receives a signal of a frequency band of 37 to 40 GHz.

13. The electronic device of claim 1, wherein the first ground path and the second ground path penetrate a third number of layers.

14. The electronic device of claim 1, wherein the PCB further includes a plurality of dipole antennas.

15. The electronic device of claim 14, wherein the plurality of dipole antennas are disposed as an antenna array of an n×m array at positions corresponding to the plurality of patch antennas, and wherein n and m integers are equal to or greater than one.

16. An antenna circuit comprising:

a printed circuit board (PCB) including a plurality of layers including a first layer and a second layer;

a plurality of patch antennas including a first patch antenna; and a communication circuit disposed on a first surface of the PCB, wherein the PCB includes:

the first layer in which the plurality of patch antennas are disposed;

a first feeding path configured to feed power directly or indirectly to a first point of the first patch antenna such that the first patch antenna disposed in the first layer receives a first polarized signal, wherein the first feeding path includes a via penetrating a first number of layers among the plurality of layers and is electrically connected to the communication circuit;

a second feeding path configured to feed power directly or indirectly to a second point of the first patch antenna such that the first patch antenna disposed in the first layer receives a second polarized signal orthogonal to the first polarized signal, wherein the second feeding path includes a via penetrating the first number of layers among the plurality of layers and is electrically connected to the communication circuit;

the second layer corresponding to a ground of the PCB;

a first ground path which electrically connects the second layer and a third point adjacent to the first point of the first patch antenna, wherein the third point is disposed outside of the first patch antenna; and a second ground path which electrically connects the second layer and a fourth point adjacent to the second point of the first patch antenna, wherein the fourth point is disposed outside of the first patch antenna.

17. The antenna circuit of claim 16, further comprising:

a third layer in which a plurality of patch antennas including a second patch antenna are disposed; a third feeding path which feeds power directly or indirectly to a fifth point of the second patch antenna such that the second patch antenna disposed to the third layer receives a third polarized signal; and a fourth feeding path which feeds power directly or indirectly to a sixth point of the second patch antenna such that the second patch antenna receives a fourth polarized signal orthogonal to the third polarized signal.

18. The antenna circuit of claim 17, wherein the third feeding path includes a via penetrating a second number of layers among the plurality of layers and is electrically coupled to the communication circuit, and wherein the fourth feeding path includes a via penetrating the second number of layers among the plurality of layers and is electrically coupled to the communication circuit.

19. The antenna circuit of claim 17, wherein the first layer is disposed between the third layer and the second layer.

20. The antenna circuit of claim 16, wherein a width of the ground is 3 mm to 4 mm.

* * * * *